United States Patent
Rose Charvet et al.

(10) Patent No.: US 9,269,273 B1
(45) Date of Patent: Feb. 23, 2016

(54) SYSTEMS, METHODS AND COMPUTER PROGRAM PRODUCTS FOR BUILDING A DATABASE ASSOCIATING N-GRAMS WITH COGNITIVE MOTIVATION ORIENTATIONS

(71) Applicant: Weongozi Inc., Burlington, Ontario (CA)

(72) Inventors: Shelle Rose Charvet, Burlington (CA); Michael Horst Tschichholz, Berlin (DE); Stephan Busemann, Saarbrucken (DE); Jorg Steffen, Saarbrucken (DE); Jonathan Scott Rose, Toronto (CA)

(73) Assignee: Weongozi Inc. (CA)

( * ) Notice: Subject to any disclaimer, the term of this patent is extended or adjusted under 35 U.S.C. 154(b) by 373 days.

(21) Appl. No.: 13/865,996

(22) Filed: Apr. 18, 2013

Related U.S. Application Data

(60) Provisional application No. 61/677,074, filed on Jul. 30, 2012.

(51) Int. Cl.
*G06F 17/27* (2006.01)
*G09B 5/00* (2006.01)

(52) U.S. Cl.
CPC ............... *G09B 5/00* (2013.01); *G06F 17/274* (2013.01); *G06F 17/2785* (2013.01)

(58) Field of Classification Search
CPC . G06F 17/27; G06F 17/2735; G06F 17/2845; G06F 17/30; G06F 17/2785
See application file for complete search history.

(56) References Cited

U.S. PATENT DOCUMENTS

| | | | |
|---|---|---|---|
| 5,182,708 A | | 1/1993 | Ejiri |
| 5,696,981 A | | 12/1997 | Shovers |
| 5,880,971 A | * | 3/1999 | Dangelo et al. ............... 716/105 |
| 6,622,140 B1 | | 9/2003 | Kantrowitz |

(Continued)

FOREIGN PATENT DOCUMENTS

| | | |
|---|---|---|
| EP | 1909223 | 4/2008 |
| EP | 2234045 | 11/2010 |

(Continued)

OTHER PUBLICATIONS

Shelle Rose Charvet; Words That Change Minds; Kendall/Hunt Publishing Company; 1995; pp. 15-31, 33-74, and 77-147.

(Continued)

*Primary Examiner* — Eric Yen
(74) *Attorney, Agent, or Firm* — Steven M. Greenberg; CRGO Law

(57) ABSTRACT

Computer-implemented methods can transform a corpus of meaningful text sequences into a generalized computer-usable repository of neurolinguistic information that can be applied by one or more computer systems. The computer system(s) can use the neurolinguistic information to neurolinguistically analyze meaningful text sequences to derive statistical information and identify dominant cognitive motivation orientations expressed in those text sequences. The identified dominant cognitive motivation orientations can be used to improve the efficacy of both human-generated and machine-generated communications. The computer system(s) thereby transform a meaningful text sequence into actionable information about the dominant cognitive motivation orientation(s) of the author of that text sequence within the context in which the text sequence was composed. Computer systems and computer-program products for implementing the methods are also described.

18 Claims, 13 Drawing Sheets

(56) References Cited

U.S. PATENT DOCUMENTS

| | | |
|---|---|---|
| 6,865,528 B1 | 3/2005 | Huang et al. |
| 6,999,914 B1 | 2/2006 | Boerner et al. |
| 7,136,877 B2 | 11/2006 | Volcani et al. |
| 7,289,949 B2 | 10/2007 | Warner et al. |
| 7,343,624 B1 | 3/2008 | Rihn et al. |
| 7,346,492 B2 | 3/2008 | Shaw |
| 7,369,985 B2 | 5/2008 | Polanyi et al. |
| 7,475,010 B2 | 1/2009 | Chao |
| 7,555,523 B1 | 6/2009 | Hartmann |
| 8,099,182 B1 * | 1/2012 | Kasten ............. 700/91 |
| 8,160,867 B1 | 4/2012 | Shaw |
| 2003/0149562 A1 | 8/2003 | Walther |
| 2003/0203343 A1 * | 10/2003 | Milner .............. 434/157 |
| 2005/0080611 A1 | 4/2005 | Huang et al. |
| 2005/0108001 A1 | 5/2005 | Aarskog |
| 2005/0120004 A1 | 6/2005 | Stata et al. |
| 2005/0251382 A1 | 11/2005 | Chang et al. |
| 2005/0267738 A1 | 12/2005 | Wilkinson et al. |
| 2005/0283384 A1 * | 12/2005 | Hunkeler et al. ............ 705/2 |
| 2006/0253685 A1 * | 11/2006 | Wong et al. ............ 712/25 |
| 2007/0017531 A1 * | 1/2007 | Large ............. 128/898 |
| 2007/0260448 A1 | 11/2007 | Lorenzen et al. |
| 2008/0169914 A1 * | 7/2008 | Albertson et al. ............ 340/438 |
| 2008/0240010 A1 * | 10/2008 | Vasudevan et al. ............ 370/312 |
| 2009/0076917 A1 | 3/2009 | Jablokov et al. |
| 2009/0176520 A1 * | 7/2009 | B. S. et al. ............ 455/466 |
| 2009/0198488 A1 | 8/2009 | Vigen |
| 2009/0271765 A1 * | 10/2009 | Hugunin et al. ............ 717/116 |
| 2010/0106677 A1 | 4/2010 | Yu |
| 2010/0114562 A1 | 5/2010 | Hutchinson et al. |
| 2010/0241698 A1 | 9/2010 | Hillerbrand |
| 2010/0312545 A1 | 12/2010 | Sites |
| 2011/0119048 A1 | 5/2011 | Shaw |
| 2011/0276408 A1 | 11/2011 | Toole |
| 2012/0004905 A1 | 1/2012 | Bobick et al. |
| 2012/0084282 A1 * | 4/2012 | Chiang et al. ............ 707/725 |
| 2012/0198005 A1 | 8/2012 | DeLuca |
| 2013/0046762 A1 * | 2/2013 | Tan et al. ............ 707/737 |
| 2013/0159981 A1 * | 6/2013 | Klemenz et al. ............ 717/143 |
| 2013/0283168 A1 * | 10/2013 | Brown et al. ............ 715/728 |
| 2014/0287398 A1 * | 9/2014 | Singh ............ 434/350 |
| 2014/0288704 A1 * | 9/2014 | Baurmann et al. ............ 700/245 |

FOREIGN PATENT DOCUMENTS

| | | |
|---|---|---|
| WO | 9716796 | 5/1997 |
| WO | 0075779 A2 | 12/2000 |
| WO | 2005043338 A2 | 5/2005 |
| WO | 2005101193 A2 | 10/2005 |
| WO | 2008036957 A2 | 3/2008 |
| WO | 2011062718 A2 | 5/2011 |
| WO | 2011063035 A1 | 5/2011 |
| WO | 2012031239 A2 | 3/2012 |

OTHER PUBLICATIONS

Shelle Rose Charvet; The Customer is Bothering Me: How to Change Attitudes, Improve Results and Grow Your Bottom Line; Kendall/Hunt Publishing Company; 2010; pp. 11-32.

L Michael Hall and Shelle Rose Charvet; Innovations in NLP for Challenging Times; Crown House Publishin Ltd.; 2011; pp. 29-43.

Tracy Joy; Below Conscious Behavioural Research Group: People figuring out people; http://belowconscious.com/about.html; last accessed on Feb. 24, 2014.

* cited by examiner

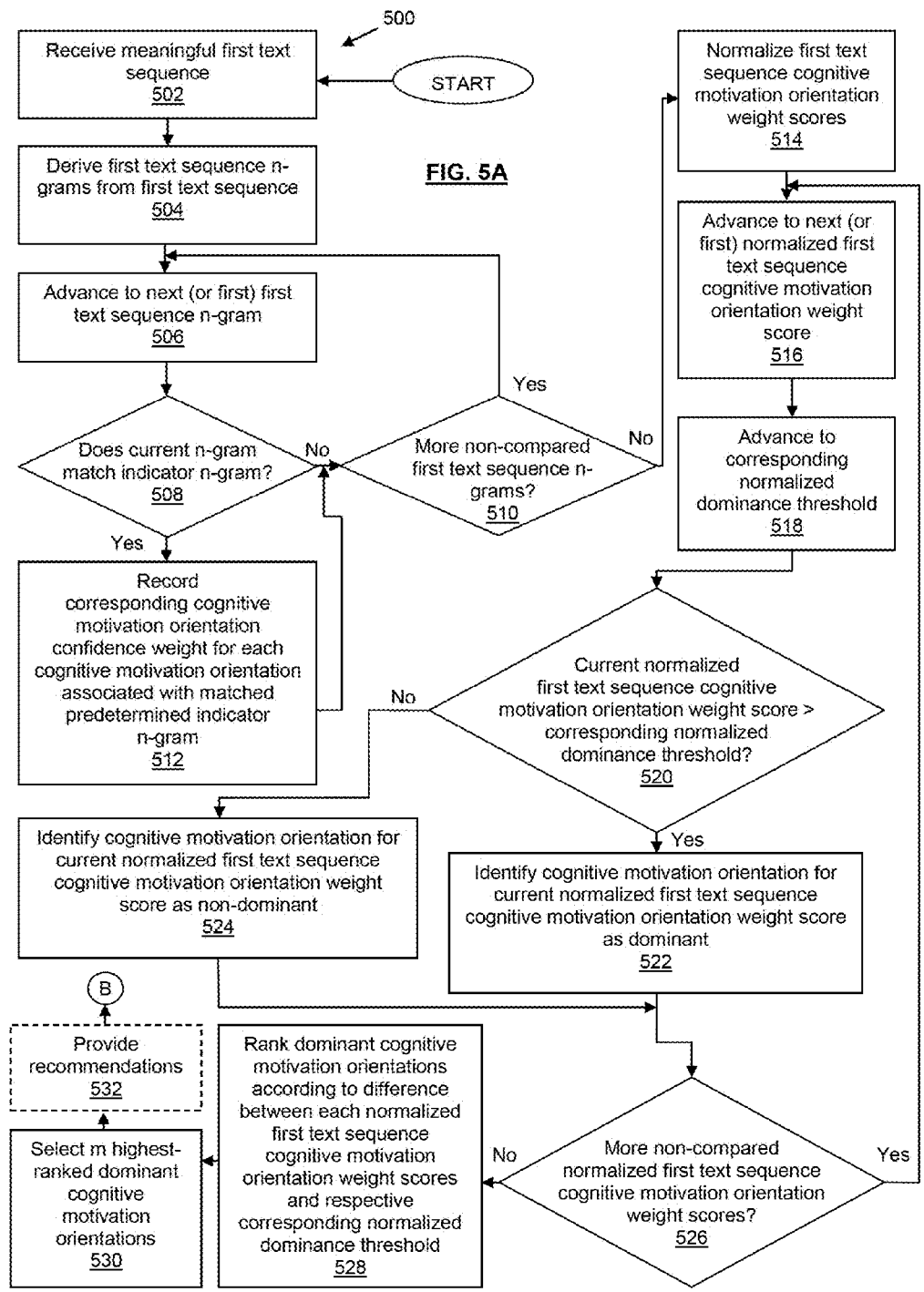

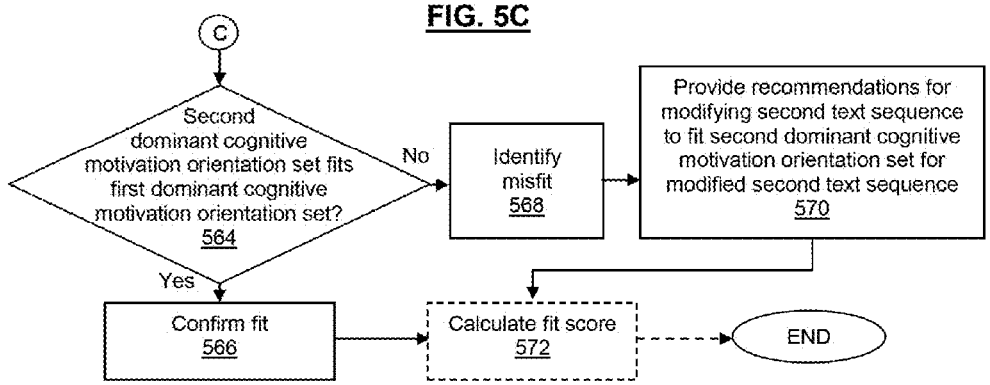
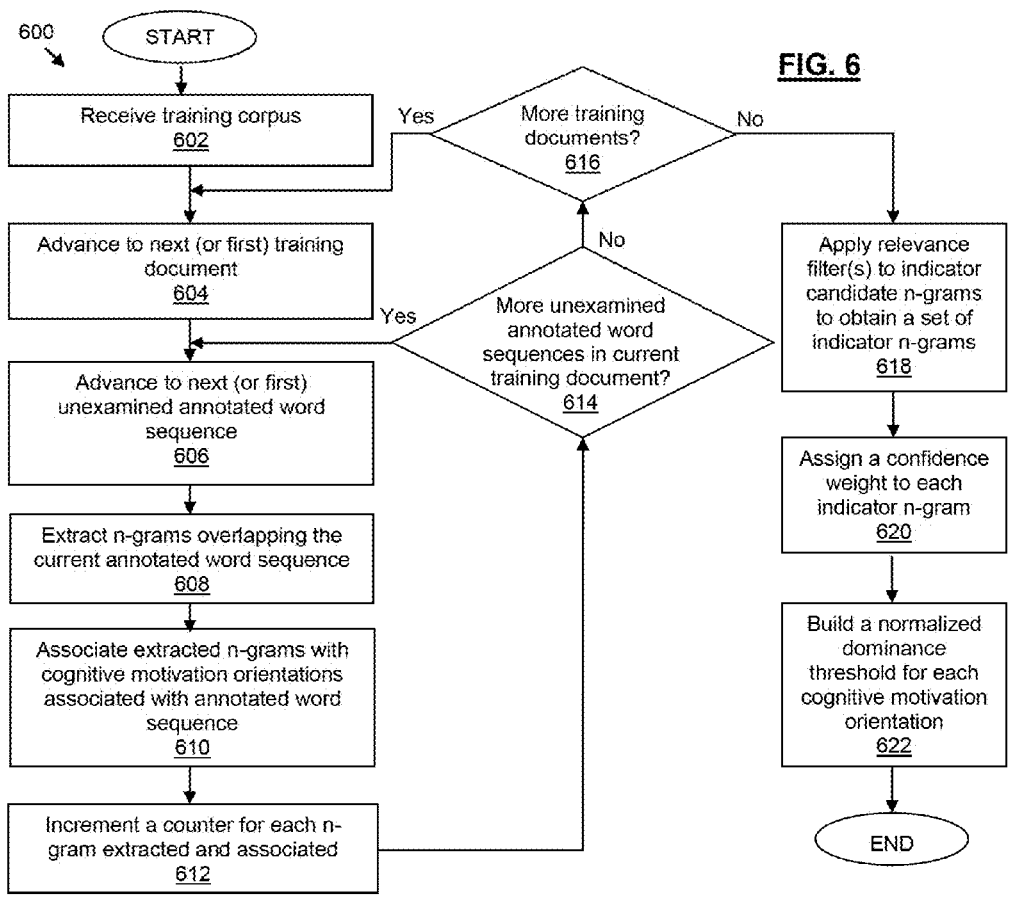

SYSTEMS, METHODS AND COMPUTER PROGRAM PRODUCTS FOR BUILDING A DATABASE ASSOCIATING N-GRAMS WITH COGNITIVE MOTIVATION ORIENTATIONS

CROSS-REFERENCE TO RELATED APPLICATION

This application claims priority to U.S. Provisional Application No. 61/677,074 filed on Jul. 30, 2012, the teachings of which are hereby incorporated by reference.

TECHNICAL FIELD

The present disclosure relates to analysis of text sequences, and more particularly to computer-implemented neurolinguistic analysis of text sequences to discern information about cognitive motivation orientations expressed therein.

BACKGROUND

Written communication among people provides many opportunities for misunderstandings, conflicts and lost opportunities because of the lack of non-textual visual, tonal and often contextual clues. One primary reason for this is that written communication is typically between parties who are physically remote from one another, and therefore do not have the benefit of hearing vocal intonations or seeing one another's body language during the communication. Without these non-textual clues, the communicating parties must attempt to interpret one another based only upon the text as it appears, often complete with typographical errors, ambiguity and vagueness. These problems can be compounded by a lack of skill in writing.

Although traditional paper letters sent by mail or fax usually receive a reasonable degree of care and attention from their authors, today many important written messages use instantaneous modes of communication which encourage rapid, "spur of the moment" correspondence. Examples of such types of communication include electronic mail (e-mail), text messaging via Short Message Service (SMS) or other systems, as well as through various network based media on the Internet or otherwise, including online chat systems and social media websites such as Facebook, LinkedIn and Twitter, among others. Such communications are typically composed quickly, with little planning or attention to detail, and are often written in an informal style.

Not surprisingly, a recipient of such written correspondence may misunderstand the meaning or intention of the author, which can require additional written correspondence or telephone conversations to resolve. In some cases, relationships can be damaged where a recipient perceives an insult where none was intended. Even where this is not the case, the wrong choice of words in responding to correspondence may fail to motivate the sender to take the action that the responder wants. Coupled with the fact that many people receive dozens or even hundreds of e-mail and text messages a day, there is enormous potential for miscommunication and missed opportunity.

Beginning in the 1970s, a field known as "neurolinguistics" began to develop. According to neurolinguistic theory, people do not choose the words they use accidentally; the language a person uses is an indication of how they are thinking One development in neurolinguistics was the identification of "meta programs" describing how a person thinks, gets motivated and makes decisions. Initially, approximately 60 meta programs were identified; Rodger Bailey divided a subset of these meta programs into motivation traits and working traits. Motivation traits are the patterns that indicate what a person needs to get motivated and stay motivated, and working traits describe the internal mental processing that a person uses in a particular situation. Further research determined that meta programs were not a fixed representation of a person's personality, cognition or psychology, but instead shifted based on the context. The meta programs might be quite different if a person were at work, doing grocery shopping, worrying about a particular problem or lying on a beach. It was also determined that the language a person used in communication is an indicator of the operative meta programs at the time of that communication.

Thus, a meta program is an example of what is referred to herein as a "cognitive motivation orientation", which refers to factors, patterns and/or elements that describe how a person thinks, becomes motivated and makes decisions in a given context, as determined from the language used in that context. One or more cognitive motivation orientations may be expressed within a given communication, and these reflect how the author thinks, becomes motivated and makes decisions in the context in which the communication originated. A cognitive motivation orientation is therefore different from a personality profile or psychological profile in that a cognitive motivation orientation relates to a particular context, whereas a personality profile or psychological profile attempts to provide an overall characterization of an individual.

Importantly, it has also been determined that how people react to certain types of language is related to the operative cognitive motivation orientation. Knowledge of a person's operative cognitive motivation orientation could therefore be used to predict and influence that person's behavior. Using language appropriate to the operative cognitive motivation orientation can create a positive impact while using incorrect language can easily trigger a negative reaction. A detailed discussion is provided in the book "Words That Change Minds—Mastering the Language of Influence" by Shelle Rose Charvet, a co-inventor hereof, published by Kendall/Hunt Publishing Company, 4050 Westmark Drive, Dubuque, Iowa 52002, Library of Congress Catalogue Card Number 97-70788, ISBN 978-0-7872-3479-9, the teachings of which are hereby incorporated by reference (all rights reserved).

A trained individual can, through judicious observation of a person's use of language, determine which cognitive motivation orientations are operative for the person in that context. It also takes training to be able to choose the correct words, phrases and actions to influence people based on their operative cognitive motivation orientations. These cognitive motivation orientations operate largely outside of a person's normal awareness, as few people think about how they are thinking from moment to moment. Even with training to identify the specific indicators in language structures or behaviors, one's ability to objectively, correctly identify the cognitive motivation orientations can easily be colored by one's own unconscious preferences or dislikes. People often use trial and error strategies, which take time, and in high-speed day-to-day communication, this means opportunities to have a positive impact can easily be lost. Moreover, a human being, even a highly-trained one, would not be able to identify cognitive motivation orientations quickly, objectively and consistently because of inherent biases.

SUMMARY

An automated tool can objectively identify the cognitive motivation orientations expressed in a meaningful text sequence, and can use this information in order to improve the effectiveness of written and oral communication, whether human-generated or machine-generated. Application of statistical methods to documents that have been annotated by a human expert can be used to build an analysis database that can be used by the automated tool.

A computer-implemented method for neurolinguistically analyzing text comprises receiving a meaningful first text sequence, deriving first text sequence n-grams from the first text sequence, and comparing the first text sequence n-grams to a plurality of predetermined indicator n-grams. Each predetermined indicator n-gram is associated with at least one cognitive motivation orientation, and each predetermined indicator n-gram has, for each cognitive motivation orientation with which it is associated, a corresponding cognitive motivation orientation confidence weight. For each first text sequence n-gram matching a predetermined indicator n-gram, the method records the corresponding cognitive motivation orientation confidence weight for each cognitive motivation orientation associated with that predetermined indicator n-gram.

The method may further comprise using the recorded cognitive motivation orientation confidence weights for the first text sequence to determine a first dominant cognitive motivation orientation set expressed in the first text sequence.

In one embodiment, recording the corresponding cognitive motivation orientation confidence weight for each cognitive motivation orientation associated with a particular predetermined indicator n-gram comprises incrementing a corresponding first text sequence cognitive motivation orientation weight score for each cognitive motivation orientation associated with that predetermined indicator n-gram according to the corresponding cognitive motivation orientation confidence weight. In such an embodiment, the method may further comprise normalizing the first text sequence cognitive motivation orientation weight scores to obtain normalized first text sequence cognitive motivation orientation weight scores. The method may yet further comprise comparing the normalized first text sequence cognitive motivation orientation weight scores to respective corresponding normalized dominance thresholds and ranking the normalized first text sequence cognitive motivation orientation weight scores according to the difference between each normalized first text sequence cognitive motivation orientation weight score and its respective corresponding normalized dominance threshold to obtain ranked normalized first text sequence cognitive motivation orientation weight scores.

The method may generate a first dominant cognitive motivation orientation set by identifying as dominant for the first text sequence each cognitive motivation orientation for which the associated normalized first text sequence cognitive motivation orientation weight score exceeds a corresponding normalized dominance threshold, and identifying as non-dominant for the first text sequence each cognitive motivation orientation for which the associated normalized first text sequence cognitive motivation orientation weight score does not exceed the corresponding normalized dominance threshold. The first dominant cognitive motivation orientation set may be generated by comparing the normalized first text sequence cognitive motivation orientation weight scores to respective corresponding normalized dominance thresholds and ranking the normalized first text sequence cognitive motivation orientation weight scores according to the difference between each normalized first text sequence cognitive motivation orientation weight score and its respective corresponding normalized dominance threshold to obtain ranked normalized first text sequence cognitive motivation orientation weight scores. The first dominant cognitive motivation orientation set may comprise m or fewer cognitive motivation orientations, where m is a positive integer, and where m or more cognitive motivation orientations are identified as dominant for the first text sequence, the dominant cognitive motivation orientation set may comprise the m most highly ranked cognitive motivation orientations.

The method may further comprise providing recommendations for preparation of a meaningful second text sequence addressing the first text sequence, with the recommendations being based on the first dominant cognitive motivation orientation set.

In some embodiments, the method may further comprise receiving a meaningful second text sequence addressing the first text sequence, deriving second text sequence n-grams from the second text sequence, comparing the second text sequence n-grams to the plurality of predetermined indicator n-grams, and, for each second text sequence n-gram matching a predetermined indicator n-gram, recording the corresponding cognitive motivation orientation confidence weight for each cognitive motivation orientation associated with that predetermined indicator n-gram. The recorded cognitive motivation orientation confidence weights for the first text sequence may be used to determine a first dominant cognitive motivation orientation set expressed in the first text sequence, and the recorded cognitive motivation orientation confidence weights for the second text sequence may be used to determine a second dominant cognitive motivation orientation set expressed in the second text sequence. The method may further comprise testing whether the second dominant cognitive motivation orientation set fits the first dominant cognitive motivation orientation set. Responsive to a determination that the second dominant cognitive motivation orientation set fits the first dominant cognitive motivation orientation set, the fit may be confirmed, and responsive to a determination that the second dominant cognitive motivation orientation set misfits the first dominant cognitive motivation orientation set for the first text sequence, the misfit may be identified. The method may yet further comprise, responsive to identifying the misfit, providing recommendations for modifying the second text sequence to fit a corresponding modified second dominant cognitive motivation orientation set to the first dominant cognitive motivation orientation set.

A computer-implemented method for analyzing text comprises receiving a meaningful first text sequence and neurolinguistically analyzing the first text sequence to generate first statistical information representing cognitive motivation orientations expressed within the first text sequence.

In one embodiment, neurolinguistically analyzing the first text sequence comprises extracting elements from the first text sequence and conducting a first comparison by comparing the elements extracted from the first text sequence to predetermined elements associated with cognitive motivation orientations to derive the first statistical information, and further comprises determining a first dominant cognitive motivation orientation set expressed within the first text sequence based on the first statistical information.

The method may further comprise providing recommendations for preparation of a meaningful response addressing the first text sequence, with the recommendations being based on the first dominant cognitive motivation orientation set. The response may be, for example, a meaningful second text sequence.

The method may further comprise receiving a meaningful second text sequence and neurolinguistically analyzing the second text sequence by extracting elements from the second text sequence and conducting a second comparison by comparing the elements extracted from the second text sequence to predetermined elements associated with cognitive motivation orientations. Second statistical information is derived from the second comparison. A second dominant cognitive motivation orientation set expressed within the second text sequence may be determined based on the second statistical information, and the method may further comprise testing fit between the first dominant cognitive motivation orientation set and the second dominant cognitive motivation orientation set. Responsive to a determination that the second dominant cognitive motivation orientation set misfits the first dominant cognitive motivation orientation set expressed, the misfit can be identified. Also responsive to a determination that the second dominant cognitive motivation orientation set misfits the first dominant cognitive motivation orientation set, the method may comprise presenting recommendations for modifying the second text sequence to fit a corresponding modified second dominant cognitive motivation orientation set to the first dominant cognitive motivation orientation set.

In one embodiment, the first text sequence is an e-mail message and the second text sequence is an unsent e-mail response to the first text sequence; in another embodiment the first text sequence is a transcription of a verbal communication.

In some embodiments, the method may further comprise automatically selecting a predetermined response to the first text sequence from a set of predetermined responses based on the first dominant cognitive motivation orientation set. The predetermined response may be, for example, an advertisement.

In other embodiments, the method may further comprise automatically dynamically generating a response to the first text sequence based on the first dominant cognitive motivation orientation set expressed within the first text sequence; the automatically dynamically generated response may be, for example, an advertisement.

The first text sequence may be a search term entered into a search engine.

A computer-implemented method for receiving an analysis of text comprises transmitting a meaningful first text sequence from a first computer system and receiving, at the first computer system, a communication responsive to at least a result of automated neurolinguistic analysis of cognitive motivation orientations expressed in the first text sequence.

In one embodiment, the communication is an advertisement. In another embodiment, the communication comprises first statistical information representing cognitive motivation orientations expressed within the first text sequence. In yet another embodiment, the communication comprises an identification of a neurolinguistically-determined first dominant cognitive motivation orientation set expressed within the first text sequence. The method may further comprise providing recommendations for preparation of a meaningful second text sequence addressing the first text sequence, with the recommendations being based on a first dominant cognitive motivation orientation set.

The method may further comprise transmitting a meaningful second text sequence from the first computer system, and in such embodiments the communication received at the first computer system may be responsive to the result of the automated neurolinguistic analysis of the cognitive motivation orientations expressed within the first text sequence and also to a result of automated neurolinguistic analysis of cognitive motivation orientations expressed within the second text sequence. In one particular embodiment, the communication received at the first computer system may comprise first statistical information representing the cognitive motivation orientations expressed within the first text sequence and second statistical information representing the cognitive motivation orientations expressed within the second text sequence, and the method may further comprise using the first statistical information and the second statistical information to carry out a test of fit between a first dominant cognitive motivation orientation set expressed within the first text sequence and a second dominant cognitive motivation orientation set expressed within the second text sequence. In another particular embodiment, the communication received at the first computer system may be responsive to the outcome of a test of fit between a neurolinguistically-determined first dominant cognitive motivation orientation set expressed within the first text sequence and a neurolinguistically-determined second dominant cognitive motivation orientation set expressed within the second text sequence.

The communication received at the first computer system may identify at least one recommendation for modifying the second text sequence to fit a corresponding modified second dominant cognitive motivation orientation set to the first dominant cognitive motivation orientation set.

In some embodiments, the first text sequence is an e-mail message and the second text sequence is an unsent e-mail response to the first text sequence. In other embodiments, the first text sequence is a transcription of a verbal communication.

In certain embodiments, the communication received at the first computer system comprises a predetermined response to the first text sequence, with the predetermined response being automatically selected from a set of predetermined responses based on the result of the automated neurolinguistic analysis of the first text sequence. In certain other embodiments, the communication received at the first computer system comprises an automatically dynamically generated response to the first text sequence based on the result of the automated neurolinguistic analysis of the first text sequence.

The first text sequence may be a search term entered into a search engine.

A method for building an analysis database associating n-grams with cognitive motivation orientations comprises receiving a training corpus of training documents. Each training document comprises a plurality of meaningfully arranged words, and each training document has at least one annotated word sequence therein. Each annotated word sequence is annotated with a corresponding word-sequence-level annotation identifying at least one cognitive motivation orientation associated with that annotated word sequence. The method further comprises generating indicator candidate n-grams by, for each annotated word sequence in each training document, extracting n-grams overlapping that annotated word sequence and associating each extracted n-gram with the cognitive motivation orientation(s) associated with that annotated word sequence, and applying at least one relevance filter to the indicator candidate n-grams to obtain a set of indicator n-grams. Each indicator n-gram has as its associated cognitive motivation orientation the cognitive motivation orientation with which the corresponding indicator candidate n-gram is most frequently associated.

In certain preferred embodiments, applying at least one relevance filter to the indicator candidate n-grams to obtain indicator n-grams comprises at least one of:
  (a) excluding from the set of indicator n-grams those indicator candidate n-grams for which a number of times that the respective indicator candidate n-gram appears in the training corpus in association with the cognitive motivation orientation with which the corresponding indicator candidate n-gram is most frequently associated is less than a predetermined minimum multiple of a number of times that the respective indicator candidate n-gram appears in the training corpus in association with the cognitive motivation orientation with which the corresponding indicator candidate n-gram is second-most frequently associated;

(b) excluding from the set of indicator n-grams those indicator candidate n-grams for which the number of times that the respective indicator candidate n-gram appears in the training corpus in association with the cognitive motivation orientation with which the corresponding indicator candidate n-gram is most frequently associated is less than a predetermined minimum number; and (c) excluding from the set of indicator n-grams those indicator candidate n-grams for which a percentage of appearances of the respective indicator candidate n-gram in the training corpus in association with the cognitive motivation orientation with which the corresponding indicator candidate n-gram is most frequently associated is less than a predetermined minimum percentage of the total number of appearances of the respective indicator candidate n-gram in the training corpus.

The method may further comprise assigning a confidence weight to each indicator n-gram. Assigning a confidence weight to each indicator n-gram may comprises assigning a confidence weight equal to:

(a) a number of times that the respective indicator candidate n-gram appears in the training corpus in association with the cognitive motivation orientation with which the corresponding indicator candidate n-gram is most frequently associated;

divided by (b) a total number of times that the respective indicator candidate n-gram appears in the training corpus.

The method may further comprise building a normalized dominance threshold for the cognitive motivation orientations. In one embodiment, building a normalized dominance threshold for the cognitive motivation orientations may comprise receiving a tuning corpus of tuning documents, with each tuning document comprising a plurality of meaningfully arranged words and having a respective document-level annotation identifying a dominant cognitive motivation orientation set for that tuning document. The method may obtain, for each tuning document, document raw confidence weight scores for each cognitive motivation orientation. The document raw confidence weight scores may be obtained by, for each tuning document, identifying each indicator n-gram appearing in that tuning document, and, for each identified indicator n-gram, incrementing a document raw confidence weight score for the cognitive motivation orientation associated with that identified indicator n-gram by the corresponding confidence weight. The method can then normalize the document raw confidence weight scores for each cognitive motivation orientation to obtain, for each tuning document, normalized document confidence weight scores for each cognitive motivation orientation. The method can use the normalized document confidence weight scores to select, for each cognitive motivation orientation, a normalized dominance threshold minimizing a number of incorrectly classified tuning documents. In one embodiment, incorrect classification for a given tuning document with respect to a particular cognitive motivation orientation means that either:

(a) the normalized document confidence weight score for that cognitive motivation orientation exceeds the normalized dominance threshold where that cognitive motivation orientation is absent from the document-level annotation for that tuning document; or (b) the normalized document confidence weight score for that cognitive motivation orientation is less than or equal to the normalized dominance threshold where that cognitive motivation orientation is present in the document-level annotation for that tuning document.

The present disclosure also describes computer systems and computer program products embodying the above methods.

BRIEF DESCRIPTION OF THE DRAWINGS

These and other features of the invention will become more apparent from the following description in which reference is made to the appended drawings wherein:

FIGS. 5A, 5B and 5C show an exemplary method for neurolinguistically analyzing text;

FIG. 6 is a flow chart showing an exemplary method for building an analysis database associating n-grams with cognitive motivation orientations;

DETAILED DESCRIPTION

Figure 1:
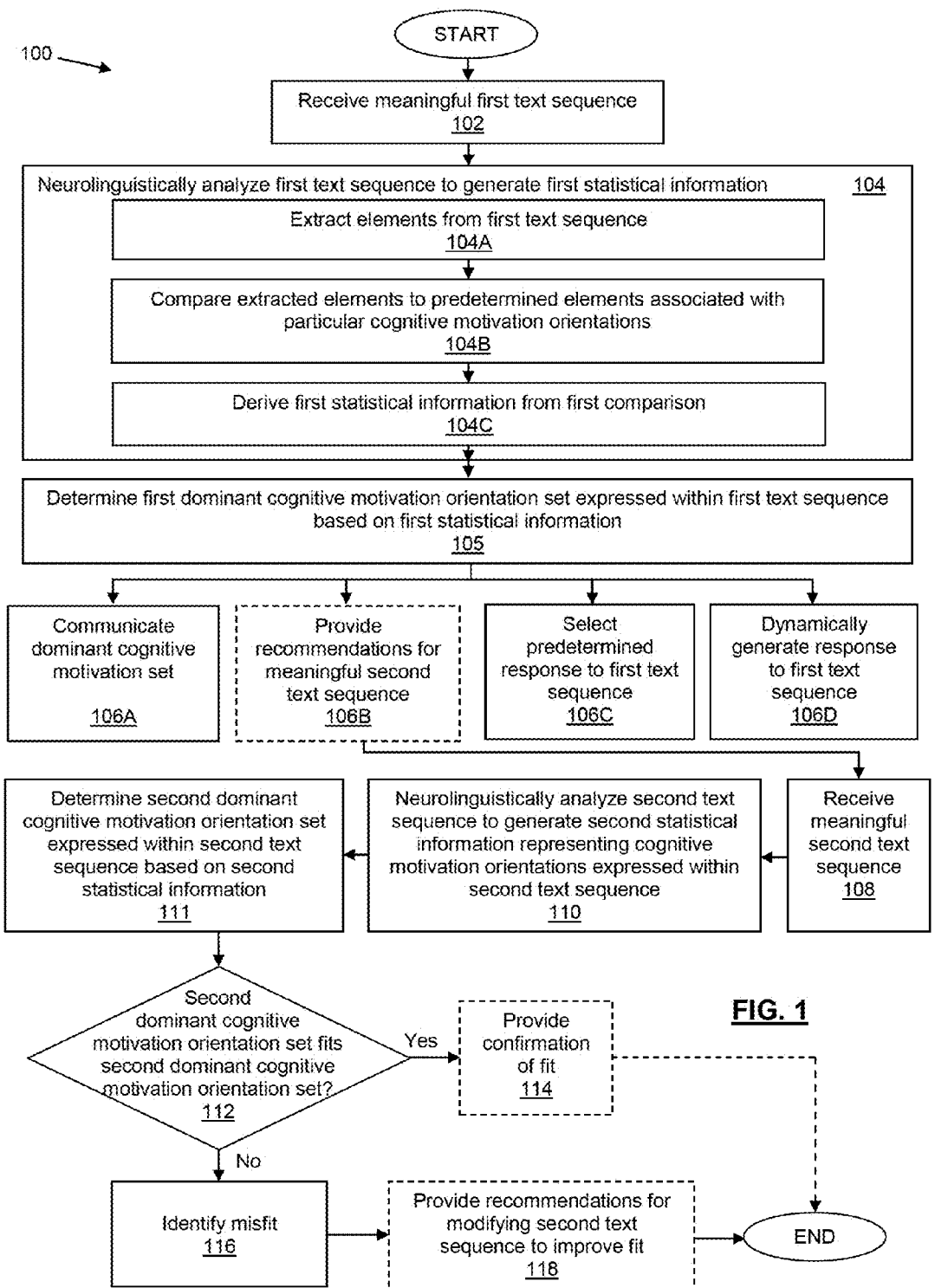
FIG. 1 is a flow chart showing an exemplary computer-implemented method 100 for analyzing text.

Reference is now made to FIG. 1, which is a flow chart showing, at a high level, an exemplary computer-implemented method 100 for analyzing text. At step 102, the method 100 receives a meaningful first text sequence, which may be any one of a variety of different types of text sequence as described further below. Within the context of this document, a text sequence is "meaningful" when it conveys meaning to a literate human reader. As such, a meaningful text sequence may be a complete document including a plurality of paragraphs, a single paragraph, a few sentences, a single sentence, a sentence fragment or even an abbreviated construct. For example, a multi-paragraph letter or e-mail message is a meaningful text sequence, and the sequence "txt u l8r" is also a meaningful text sequence (meaning "I will send you a text message later"). So-called "emoticons", which are sequences of ASCII characters that form primitive images to convey emotional information, can also be, or form part of, meaningful text sequences. Examples of emoticons include (quotations and separating commas do not form part of the emoticon) "<3", which represents a heart, ":)", ":)" or ":-)", which each represent a happy face, ";)", ";)" or ";-)", which each represent winking, and ":p", ": p", ":-p", ":P", ": P", or ":-P", which each represent the sender sticking his or her tongue out at the recipient. There are of course many other emoticons, which will be familiar to one skilled in the art and to most teenagers with modern mobile phones. A meaningful text sequence may originate in non-textual form, for example by automated transcription from vocal communication.

At step 104, the method 100 neurolinguistically analyzes the first text sequence to generate first statistical information representing cognitive motivation orientations expressed within the first text sequence. The first statistical information may be sent to a different computer system for further processing, or may be further processed by the computer system implementing the method 100. As will be explained in more detail below, in preferred embodiments complicated morphological, syntactic and semantic analysis is avoided in favor of statistical methods based on annotated training data.

As noted above, in this specification the term "cognitive motivation orientation" refers to factors, patterns and/or elements that describe how a person thinks, becomes motivated and makes decisions in a given context, as determined from the language used in that context. Thus, one or more cognitive motivation orientations may be expressed within a given meaningful text sequence. The informal term "motivation trigger" has also been used to refer to cognitive motivation orientations, and has the same meaning. A cognitive motivation orientation is different from a personality profile or psychological profile, such as one assigned according to the DISC personality theory, Enneagram theory or another theory, in that a cognitive motivation orientation relates to an individual's orientation in a particular context, whereas a personality profile or psychological profile attempts to provide an overall characterization of an individual applicable across most or all contexts. Even in the case of a personality profile or psychological profile which makes use of neurolinguistic analysis, the analysis is directed to providing an overall characterization of the individual's psychology or personality, rather than an assessment of the motivation and orientation in a specific context. Thus, the term "cognitive motivation orientation", as used herein, is to be understood as being limited to a particular context in relation to which the person has expressed the language being considered; as such a cognitive motivation orientation is language-context limited.

As shown in FIG. 1, in a preferred embodiment, step 104 of neurolinguistically analyzing the first text sequence to generate first statistical information representing cognitive motivation orientations expressed within the first text sequence comprises a sub-step 104A of extracting elements from the first text sequence, a sub-step 104B of conducting a first comparison by comparing the elements extracted from the first text sequence to predetermined elements associated with particular cognitive motivation orientations and a sub-step 104C of deriving the first statistical information from the first comparison. The first statistical information generated at step 104 may be used to determine a dominant cognitive motivation orientation set expressed in the first text sequence. For a given meaningful text sequence, there may be one or more cognitive motivation orientations that are dominant, or no cognitive motivation orientation may be dominant. Accordingly, a "dominant cognitive motivation orientation set" is a set of zero (null), one or more than one cognitive motivation orientations which are dominant for a particular meaningful text sequence. At step 105, the method 100 determines a first dominant cognitive motivation orientation set expressed within the first text sequence based on the first statistical information. Alternatively, where the first statistical information is sent to a different computer system, that different computer system may carry out step 105.

Details of exemplary implementations of steps 104 and 105 will be described below in the context of FIGS. 5A, 5B and 5C.

Following step 105, the method 100 may then proceed to one or more of a number of possible steps.

The method 100 may proceed to step 106A to communicate the dominant cognitive motivation orientation set determined at step 105, for example to a user of the computer system executing the method 100 or to another computer system. Step 106A could be used to help a human user compose an e-mail, letter, text message or other text sequence, for example an advertising or marketing document, that is not necessarily responsive to any other text sequence. For example, a user may be trying to compose a text sequence that has a specific dominant cognitive motivation orientation set, and step 106A can communicate whether or not that user has succeeded.

The method 100 may proceed to step 106B to provide recommendations for preparation of a meaningful second text sequence addressing the first text sequence, with the recommendations being based on the first dominant cognitive motivation orientation set identified at step 105. These recommendations would typically suggest language to use and language to avoid; the language suggestions will generally be independent of the substantive content. Where the first text sequence is an e-mail, letter, text message or the like, step 106B could be used to help a human user compose an e-mail, letter, text message or the like in response. In other embodiments, the text may be a transcription of a portion of a conversation. For example, software implementing the method 100 may be used in association with automated speech-to-text software to generate recommendations for a human customer service agent to respond to a verbal question or statement. Thus, the response to the first text sequence may be a verbal response.

The method 100 could proceed to step 106C to automatically select a predetermined response to the first text sequence from a set of predetermined responses based on the dominant cognitive motivation orientation set expressed within the first text sequence. For example, step 106C could be used where the method 100 is used in association with a natural language processing system for handling customer queries. The first text sequence could be a customer query, and the natural language processing system could parse this customer query to identify a class of predetermined responses that are responsive to the query, and step 106C could select from within the class of predetermined responses the particular predetermined response that best fits the dominant cognitive motivation orientation set expressed within the customer query. The first text sequence could also be a search string, for example entered into an Internet or other search engine, and the set of predetermined responses may be a set of advertisements each targeted toward a particular cognitive motivation orientation. Alternatively, the method 100 could proceed to step 106D to automatically dynamically generate a response to the first text sequence based at least in part on the dominant cognitive motivation orientation set expressed within the first text sequence. For example, in addition to choosing the information to convey based on the information requested in a query, a virtual digital assistant may select the language used to respond to the query based on the dominant cognitive motivation orientation set expressed within the first text sequence.

In a particular embodiment, after presenting recommendations for a response to the first text sequence based on the dominant cognitive motivation orientation set expressed within the first text sequence at step 106B, the method 100 can proceed to step 108. Alternatively, step 106B may be omitted and the method may proceed directly from step 104 to step 108. At step 108 the method 100 receives a meaningful second text sequence. For example, the first text sequence may be an e-mail message, a text message or a letter, and the second text sequence may be an unsent e-mail message, text message or letter response to the first text sequence. "Unsent" in this context means that the second text sequence has not been sent to the intended recipient, that is, the originator of the first text sequence, although it may have been sent to the computer system implementing the method 100 from a different computer system. In some embodiments, the second text sequence may be in a different communication format than the first text sequence. For example, a letter may be sent in response to an e-mail or vice versa, an e-mail message may be sent in response to a text message, and so on.

After receiving the second text sequence at step 108, the method 100 then proceeds to step 110, where the method 100 neurolinguistically analyzes the second text sequence to generate second statistical information representing cognitive motivation orientations expressed within the second text sequence. Step 110 would typically be carried out in a manner identical to or analogous to the neurolinguistic analysis of the first text sequence at step 104. The method 100 then proceeds to step 111, where the method 100 determines a second dominant cognitive motivation orientation set expressed within the second text sequence based on the second statistical information. Following step 111, at step 112 the method 100 tests the fit between the first dominant cognitive motivation orientation set (expressed within the first text sequence) and the second dominant cognitive motivation orientation set (expressed within the second text sequence). A more detailed explanation of an exemplary technique for testing fit between two cognitive motivation orientation sets is provided below in the context of FIGS. 5A, 5B and 5C. Responsive to a determination that the second dominant cognitive motivation orientation set fits the first dominant cognitive motivation orientation set, at optional step 114 the method 100 may provide a notification or confirmation of the fit, after which the method 100 ends. At step 116, responsive to a determination that the second dominant cognitive motivation orientation set misfits the first dominant cognitive motivation orientation set, the method 100 identifies the misfit, and may, at optional step 118, present recommendations for modifying the second text sequence so that the second dominant cognitive motivation orientation set, as expressed in the second text sequence as modified, better fits the first dominant cognitive motivation orientation set.

The first text sequence may be received (step 102) in a number of ways. For example, the first text sequence may be input directly into a computer system executing the method 100. For example, a human user may type the first text sequence, or dictate it using speech-to-text software, that is, the first text sequence may be a transcription of a verbal communication. The first text sequence may also be obtained using optical text recognition (OCR) software to extract the text sequence from an image file, such as an image of a hard copy document obtained using a peripheral scanner, by extracting the text sequence from an existing file, or other suitable techniques. Thus, software implementing the method 100 may be provided for a desktop computer, laptop computer, tablet computer, smartphone or other computer system.

Figure 2:
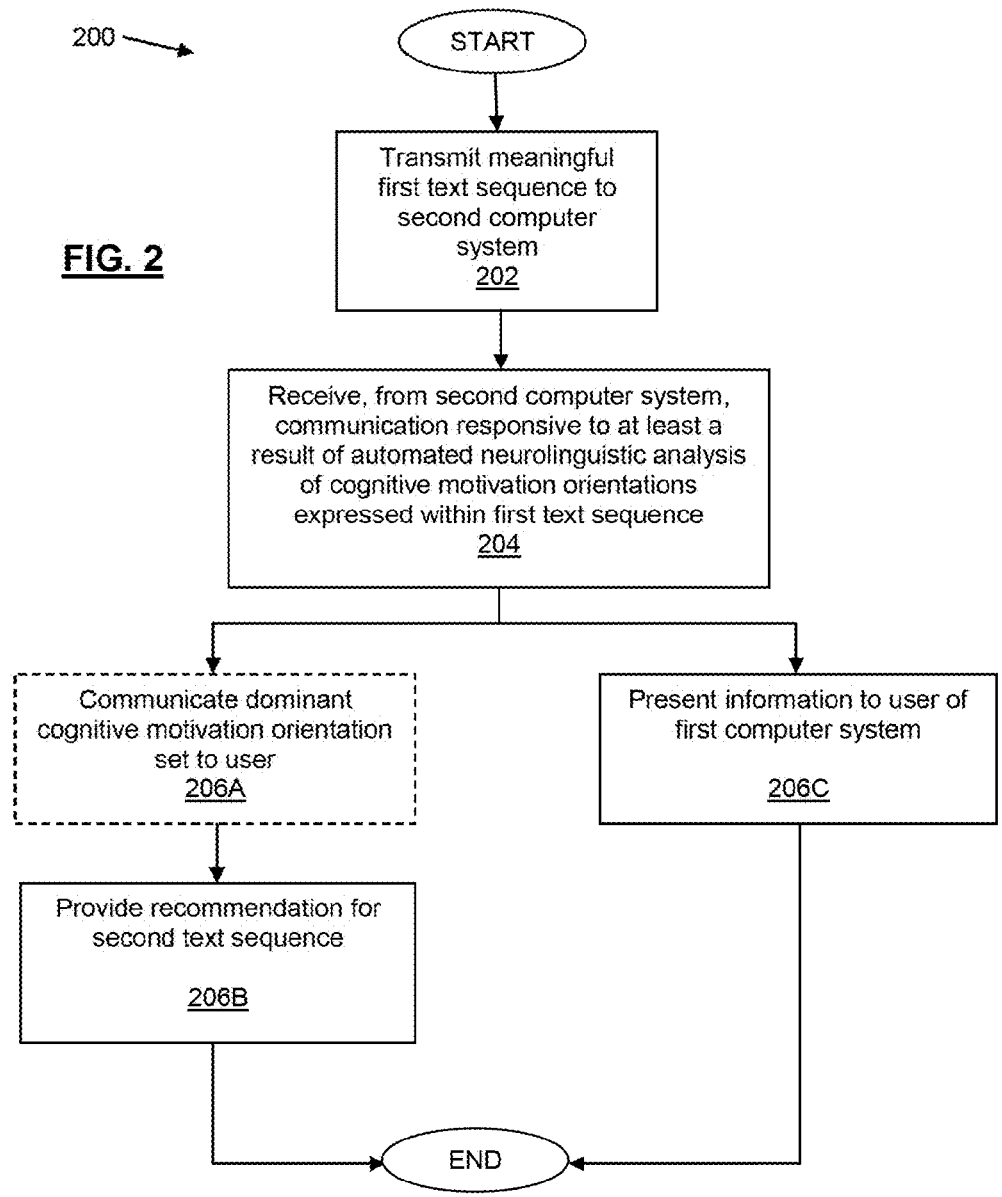
FIG. 2 is a flow chart showing a first exemplary computer-implemented method for receiving an analysis of text.

Alternatively, the first text sequence, and the second text sequence, if any, may be received at the computer system executing the method 100 from a different computer system, for example in a client-server architecture. FIG. 2 is a flow chart showing at a high level a first exemplary computer-implemented method 200 for receiving an analysis of text. The method 200 may be implemented by a first computer system that is in communication with a second computer system that is executing the method 100. At step 202, the first computer system transmits a meaningful first text sequence to the second computer system. The second computer system may then, for example, execute an implementation of the method 100. At step 204, the first computer system receives from the second computer system a communication responsive to at least a result of automated neurolinguistic analysis of cognitive motivation orientations expressed within the first text sequence.

The communication received at step 204 may comprise first statistical information representing cognitive motivation orientations expressed within the first text sequence which can be used to determine the first dominant cognitive motivation orientation set, or may comprise an identification of the neurolinguistically-determined first dominant cognitive motivation orientation set.

The communication received at step 204 may be responsive to additional factors beyond the neurolinguistically-determined dominant cognitive motivation orientation set expressed within the first text sequence. For example, as described above, in a virtual digital assistant context the communication may also be responsive to the specific information requested in a query. Similarly, where the first text sequence is a search term entered into a search engine such as Google, the communication received at step 204 may also be responsive to the search term in addition to the neurolinguistically-determined dominant cognitive motivation orientation set expressed within the first text sequence. As another example, the communication received at step 204 may comprise a set of search results whose contents and/or organization are influenced by both the search term and the neurolinguistically-determined dominant cognitive motivation orientation set expressed within the first text sequence.

The communication received at step 204 may comprise a predetermined response to the first text sequence that is automatically selected from a set of predetermined responses based on the result of automated neurolinguistic analysis of the first text sequence. For example, the communication received at step 204 may comprise advertisements which are based on the search term and whose language is based on, or selected based on, the neurolinguistically-determined dominant cognitive motivation orientation set expressed within the first text sequence. Similarly, the first text sequence may be an e-mail message sent through a Web-based e-mail service like Google's "Gmail" service or Microsoft's Hotmail service or another such service and the communication received at step 204 may be a targeted advertisement presented as part of the returned Web page. In such an embodiment, the category of advertisement (e.g. the company or type of product) may be selected based on specific terms used in the e-mail message, and the language used may be based on, or selected based on, the neurolinguistically-determined dominant cognitive motivation orientation expressed in the e-mail message.

Consider a case where a user has entered the search term "rain boots" into an Internet search engine, or the text scanning tool of a Web-based e-mail service has detected the phrase "I need to buy new rain boots" in an e-mail message. This is sufficient to determine that an advertisement for rain boots should be presented to the user. A server system may store a plurality of different advertisements for rain boots from a particular manufacturer, and automatically select which advertisement to present based on the neurolinguistically-determined dominant cognitive motivation orientation set. For example, the server may store advertisements which use specific language targeted to specific dominant cognitive motivation orientation sets, as shown in the table below (rather than all possible cognitive motivation orientation sets, only certain exemplary dominant cognitive motivation orientation sets are shown for ease of illustration):

| Dominant Cognitive Motivation Orientation Set | Language of Advertisement |
|---|---|
| Away From | Tired of getting your feet wet? |
| Towards | Want dry feet? |
| External | You need dry feet. |
| Internal | Would you like dry feet? |
| Procedures | Here's how to get dry feet. |
| Options | Many ways to get dry feet. |
| Options & Away From | Many ways to avoid wet feet. |
| Procedures & Away From | Here's how to avoid wet feet. |
| External & Away From | Avoid wet feet. |

More details about the exemplary cognitive motivation orientations in the table above are provided below.

In addition to cases where a targeted advertisement is presented in response to a search term, the content of an e-mail message or another meaningful text sequence, automatically selecting from a set of predetermined responses based on the result of automated neurolinguistic analysis of the first text sequence could be used where the first computer system is that of a customer or potential customer and the second computer system is that of a product or service provider. In these types of embodiments, the communication received at step 204 may be a "canned" advertisement, offer or other commercial material selected by the second computer system because its language fits the neurolinguistically-determined dominant cognitive motivation orientation set expressed within the first text sequence.

Alternatively, the communication received at step 204 may be an automatically dynamically generated response to the first text sequence based on the result of automated neurolinguistic analysis of the first text sequence. In such an embodiment, the language used to build the dynamically generated response may be based on in which the language is selected based on the neurolinguistically-determined dominant cognitive motivation orientation set.

Similarly to the method 100, following step 204, the method 200 may then proceed to one or more of a number of possible steps.

At optional step 206A, the method 200 may communicate the dominant cognitive motivation orientation set to a user of the computer system executing the method 200; in such an embodiment the communication received at step 204 would identify the dominant cognitive motivation orientation set.

The method 200 may proceed to optional step 206B to provide recommendations for preparation of a meaningful second text sequence, such as an e-mail, text message, letter or the like, or for suggestions for a verbal communication, addressing the first text sequence. In such embodiments, the communication received at step 204 could identify recommendations for a response to the first text sequence either by inclusion of those recommendations within the communication, by use of a tag or code, such as "recommendation 5", that designates one or more predefined or "canned" recommendations stored on the first computer system, or the first computer system may determine which recommendation(s) to present based on the neurolinguistically-determined first dominant cognitive motivation orientation set. In each case, the recommendations identified by the communication received at step 204 are based on the neurolinguistically-determined first dominant cognitive motivation orientation set. Step 206A may be omitted and the method may proceed directly to step 206B to provide recommendations without explicitly identifying the first dominant cognitive motivation orientation set, or steps 206A and 206B may proceed substantially in parallel.

The method 200 may also proceed to step 206C to present information to a user of the first computer system. The nature of the information communicated will depend on the nature of the communication received at step 204. For example, the communication may be search results, an advertisement, or other information.

After step 206C or step 206A and/or step 206B, if present, or after step 204, the method 200 ends.

Figure 3:
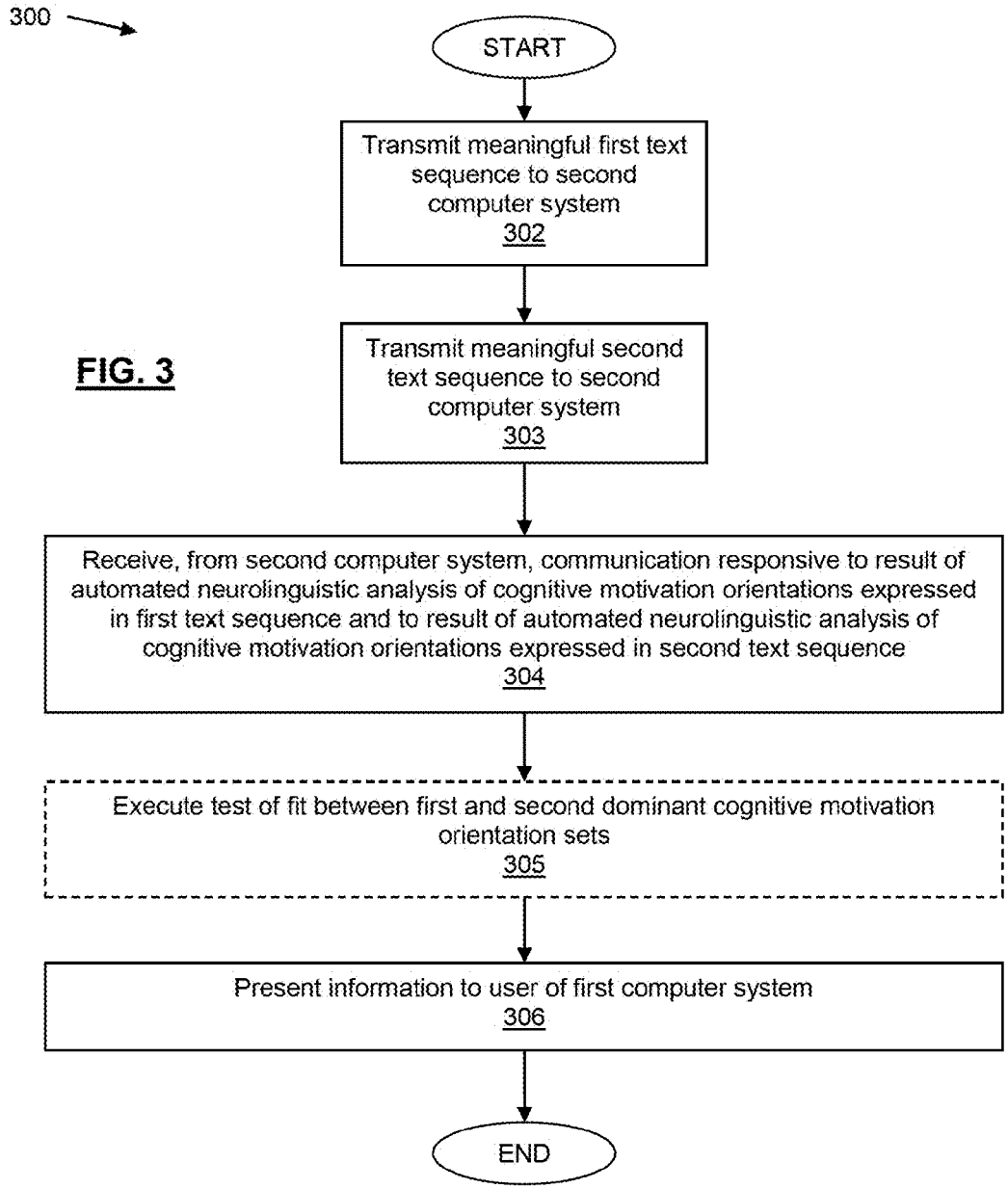
FIG. 3 is a flow chart showing a second exemplary computer-implemented method for receiving an analysis of text.

Reference is now made to FIG. 3, which is a flow chart showing at a high level a second exemplary computer-implemented method 300 for receiving an analysis of text. The method 300 may be implemented by a first computer system that is in communication with a second computer system that is executing an embodiment of the method 100 that includes steps 106B to 118. The method 300 may be carried out independently, or may be a continuation of the method 200 and begin after step 204, 206A or 206B. At step 302, the first computer system transmits a meaningful first text sequence to the second computer system, and at step 303 the first computer system transmits a meaningful second text sequence to the second computer system. The first and second text sequences may be obtained, for example, using any of the techniques described above. As in the case of the method 100, the first text sequence may be an e-mail message, a text message or a letter, and the second text sequence may be an unsent e-mail message, text message or letter response to the first text sequence. Steps 302 and 303 may be performed in reverse sequence, or substantially simultaneously. In a case where the method 300 is a continuation of the method 200, the first text sequence transmitted at step 302 will typically be the same text sequence transmitted at step 202. As such, in stateful embodiments, step 302 may be omitted when the first text sequence was already transmitted at step 202. After receiving the first and second text sequences sent by the first computer system at steps 302 (or 202) and 303, the second computer system may then, for example, execute an implementation of the method 100 that includes steps 106B to 118. At step 304, the first computer system receives from the second computer system a communication that is responsive both to the result of automated neurolinguistic analysis of the cognitive motivation orientations expressed in the first text sequence and to a result of automated neurolinguistic analysis of cognitive motivation orientations expressed in the second text sequence. The communication received at step 304 may comprise statistical information representing cognitive motivation orientations expressed within the first and second text sequences which can be used by the first computer system to determine the dominant cognitive motivation orientation sets for the first and second text sequences, or may comprise an identification of the neurolinguistically-determined dominant cognitive motivation orientation sets expressed in the first and second text sequences. In either case, the first computer system could then execute a test of fit between the neurolinguistically-determined first dominant cognitive motivation orientation set expressed within the first text sequence and a neurolinguistically-determined second dominant cognitive motivation orientation set expressed within the second text sequence at optional step 305. Alternatively, the communication received at step 304 may be responsive to the outcome of a test of fit, carried out by the second computer system, between the neurolinguistically-determined first dominant cognitive motivation orientation set expressed within the first text sequence and a neurolinguistically-determined second dominant cognitive motivation orientation set expressed within the second text sequence. In one embodiment, the communication received at step 304 identifies at least one recommendation for modifying the second text sequence so that the neurolinguistically-determined second dominant cognitive motivation orientation set expressed in the second text sequence, as modified, fits the neurolinguistically-determined first dominant cognitive motivation orientation set. As noted above, the recommendations may be identified by inclusion in the communication received at step 304, by use of a tag or code that designates one or more predefined or "canned" recommendations stored on the first computer system, or the first computer system may determine the recommendations directly based the dominant cognitive motivation orientation sets.

After step 304, or after step 305 if present, the method 300 proceeds to step 306 to present information to a user of the first computer system. The nature of the information communicated will depend on the nature of the communication received at step 304 and whether step 305 is present. For example, at step 306 the method 300 may communicate the results of a test of fit between the first and second dominant cognitive motivation orientation sets, either with or without recommendations for modifying the second text sequence.

Figure 4:
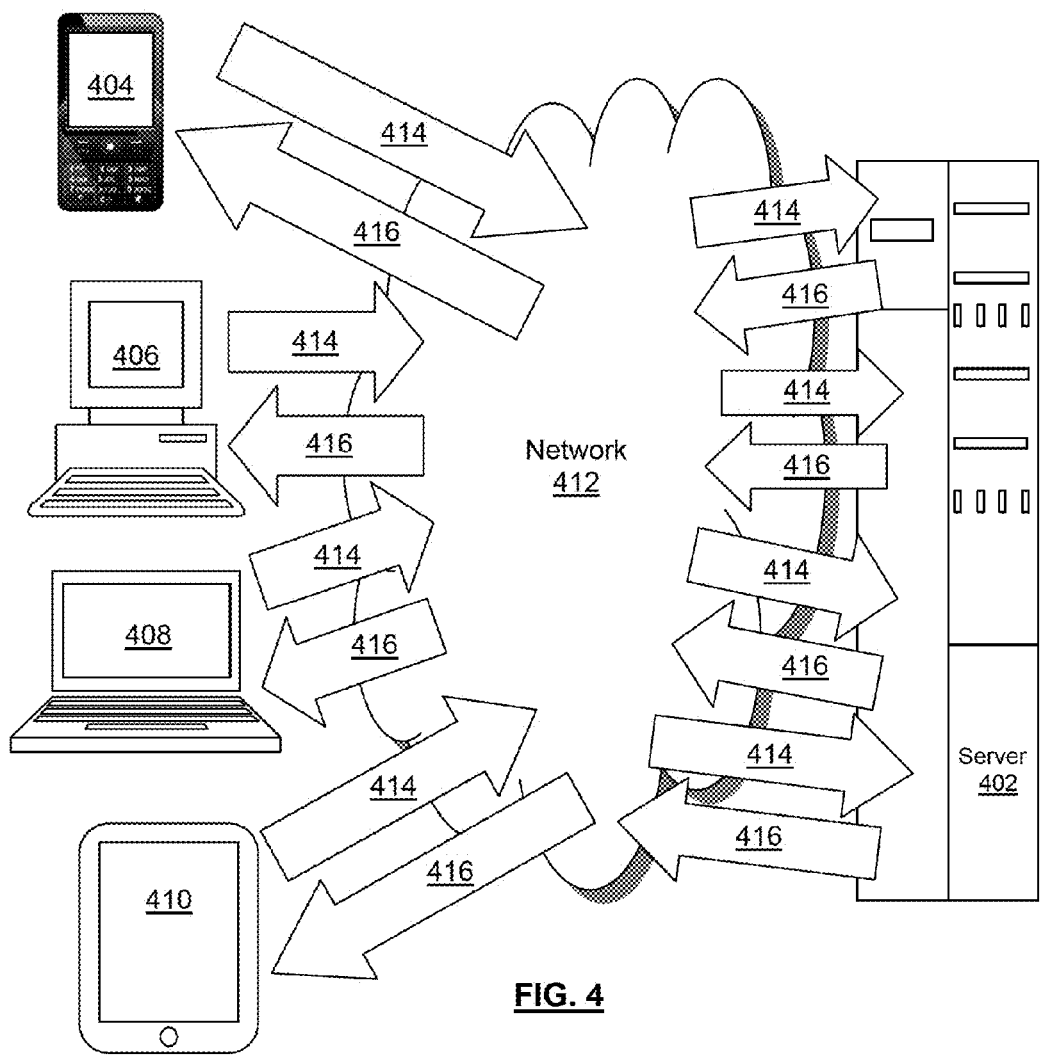
FIG. 4 shows exemplary computer systems and an exemplary network configuration.

Reference is now made to FIG. 4, which shows exemplary computer systems and an exemplary network configuration which may be used in implementing the above-described methods. In FIG. 4, a server 402, which may comprise a plurality of individual computers, implements an embodiment of the method 100. A plurality of devices, including one or more smartphones 404, desktop computers 406, laptop computers 408 and tablet computers 410, implement either the method 200 or the method 300, and communicate via a network 412, in this case the Internet, with the server 402. Each of the devices 404, 406, 408, 410 is a first computer system and the server 402 is a second computer system, and the devices 404, 406, 408, 410 can each transmit a communication 414 containing a meaningful first text sequence, as well as a second meaningful text sequence where the method 300 is being implemented, to the server 402 for analysis. The server 402 can transmit communications 416 to the respective devices 404, 406, 408, 410 based on the analysis.

For example, in one embodiment, a network architecture as shown in FIG. 4 can be used in association with an implementation of the method 100 that includes steps 106B through 118 on the server 402 and an implementation of the method 200 and/or 300 on any of the devices 404, 406, 408, 410 to analyze e-mail messages. In this embodiment, the methods 100 and 300, executed together, would identify the dominant cognitive motivation orientation set expressed in incoming emails, explain them to the user, provide recommendations for vocabulary to use and to avoid, and then analyze the corresponding response in order to make sure that the dominant cognitive motivation orientation set expressed in the response fits the dominant cognitive motivation orientation set expressed in the incoming e-mail message, thereby improving the communication.

A plug-in may be installed on an e-mail client executing on any of the devices 404, 406, 408, 410 and configured to communicate via a secure connection with the server 402. A plug-in is a piece of software which enhances another software application and usually cannot be run independently; in this case the plug-in integrates with the e-mail client and executes an implementation of the method 300, and the server 402 executes software that implements an embodiment of the method 100. The plug-in may, for example, provide one or more additional virtual buttons on the user interface for the e-mail client which, when activated, trigger the method 200 or 300. Preferably, the server 402 presents an application programming interface (API) that is supported across platforms so that different e-mail clients on different devices can be supported. In one preferred embodiment, communication between the devices 404, 406, 408, 410 and the server 402 is stateless, i.e. the server does not store information from, nor does it correlate information to, particular users. Thus, where the method 300 is a continuation of the method 200, the first text sequence would be re-sent at step 302 even though it was already sent at step 202 since it would not have been stored by the server. In other embodiments the communication may be stateful and step 302 could be omitted. Communication between the devices 404, 406, 408, 410 and the server 402 is preferably synchronous, meaning that the response is received as the result of the client query. In a preferred embodiment, the plug-in facilitates communication between the devices 404, 406, 408, 410 and the server 402 over the network 412 using the Representational State Transfer (REST) framework which supports the HTTP transport protocol and encryption, as it preferable for both client requests and server responses to be encrypted.

In one embodiment, the server 402 may be a different server from the server that administers the e-mail system with which the e-mail client is associated. For example, the server 402 may be the server of a third party service provider which provides the neurolinguistic analysis using a multi-tenant Software as a Service (SaaS) architecture. Alternatively, the server 402 may be the same server that administers the e-mail system with which the e-mail client is associated.

The use of a plug-in for the e-mail client implements a thin client approach, in which the plug-in would carry out very little processing, for example extracting the text sequence to be analyzed from the e-mail. E-mail messages often include information which is extraneous to the message text itself, such as headers, formatting such as bolding and italics, and non-text elements such as images and attachments. Moreover, an e-mail message may also include quoted text from previous e-mail messages which generally should not be included in the text to be analyzed. Thus, in one embodiment the plug-in for the e-mail client would extract the text sequence to be analyzed from the e-mail in a manner which excludes extraneous information and quoted text, leaving only plain text. In an embodiment that implements the method 300, the plug-in may extract both the text of the unsent response as well as the first level of quoted text, which would be the e-mail to which the unsent response is responsive. Where an e-mail message is forwarding another e-mail message, the e-mail client may provide a choice as to whether to analyze the forwarded e-mail message or the added text. Thus, the e-mail client may send a text sequence representing the content of an e-mail that has been received, two text sequences representing the content of an unsent response and the content of the e-mail to which the unsent response is responsive, or a text sequence representing an unsent e-mail that is not responsive to any other e-mail.

In one embodiment in which the method 100 and the methods 200 and/or 300 are used to analyze e-mail, after carrying out step 104 and, if applicable, step 110, the server 402 sends a response to the e-mail client that includes one or more numerical values for one or more corresponding cognitive motivation orientations. Numerical values may be provided for all cognitive motivation orientations tested, or only for those determined to be dominant. The numerical values will indicate the relative rankings of the cognitive motivation orientations, and can be used by the e-mail client to identify the most dominant cognitive motivation orientations. In this embodiment, the response sent by the server 402 to the e-mail client may also include explanation text regarding the dominant cognitive motivation orientation set(s) and, in the case of the method 300, recommendation text for adjusting a reply e-mail. The explanation text and recommendation text may be provided in a single format, or in both a short format and a longer, more detailed format. In other embodiments, the explanation text and recommendation text may be stored locally by the e-mail client. In either case, the e-mail client can use the numerical values to determine the dominant cognitive motivation orientation set(s) and select the appropriate explanation text and recommendation text where applicable. In an embodiment in which the explanation and recommendation text is stored locally, the server 402 may send an identifier, such as an alphanumeric identifier, of the dominant cognitive motivation orientation set(s) and the e-mail client can select which unit of explanation text or recommendation text to present based on that identifier. In still other embodiments, the server 402 may send only the specific explanation text (and recommendation text in the case of the method 300) applicable to dominant cognitive motivation orientation set(s) determined by the server 402. In yet further embodiments, the server 402 may send the statistical information required for the device 404, 406, 408, 410 to determine the dominant cognitive motivation orientation set(s). The server 402 can also send data representing a confidence value, such as a percentage, indicating the degree of confidence in the determination that each cognitive motivation orientation in the dominant cognitive motivation orientation set is in fact dominant.

Thus, in an embodiment which analyzes e-mail, a user of the e-mail client can request analysis of an e-mail, which may be a received e-mail, an unsent reply to a received e-mail, or an unsent e-mail that does not reply to another e-mail. The e-mail client can then provide to the user explanations of the dominant cognitive motivation orientation(s) in the e-mail(s), for example as prefabricated text in a pop-up window. For a received e-mail, the e-mail client can provide recommendations for preparing a response expressing a dominant cognitive motivation orientation set that will match the dominant cognitive motivation orientation set expressed in the received e-mail. For an unsent reply to a received e-mail, the e-mail client can provide recommendations for modifying the unsent reply based on a comparison of the dominant cognitive motivation orientation set expressed in the received e-mail to the dominant cognitive motivation orientation(s) set expressed in the unsent reply; these recommendations may also be provided as prefabricated text in a pop-up window. A user can repeatedly iterate the method 300 as they modify the unsent response to the e-mail to see whether the response is improving. In a preferred embodiment, when a user activates the "send" function for an unsent e-mail reply, the e-mail client can check whether the dominant cognitive motivation orientation set for the unsent reply has been checked for fit with the dominant cognitive motivation orientation set of the original e-mail, and provide a confirmation window if it has not (e.g. "are you sure you want to send this reply without checking for fit?"). Confidence values for the cognitive motivation orientations in the dominant cognitive motivation orientation set may also be displayed by the e-mail client. For example, an average of the confidence values for each of the cognitive motivation orientations in the dominant cognitive motivation orientation set may be presented graphically as a bar, which may include red, yellow and green portions corresponding to increasing levels of confidence.

In a client-server embodiment such as that shown in FIG. 4, the server 402 may also gather and correlate information about relating to cognitive motivation orientations with various other data items. For example, the server 402 may determine the frequency with which various cognitive motivation orientations or cognitive motivation orientation sets occur within a given geographic location, or within specific demographic groups.

In addition to the thin client approach described above in the context of FIG. 4, the method 100 may be implemented on the same computer system as the methods 200 and/or 300.

Figure 5B:
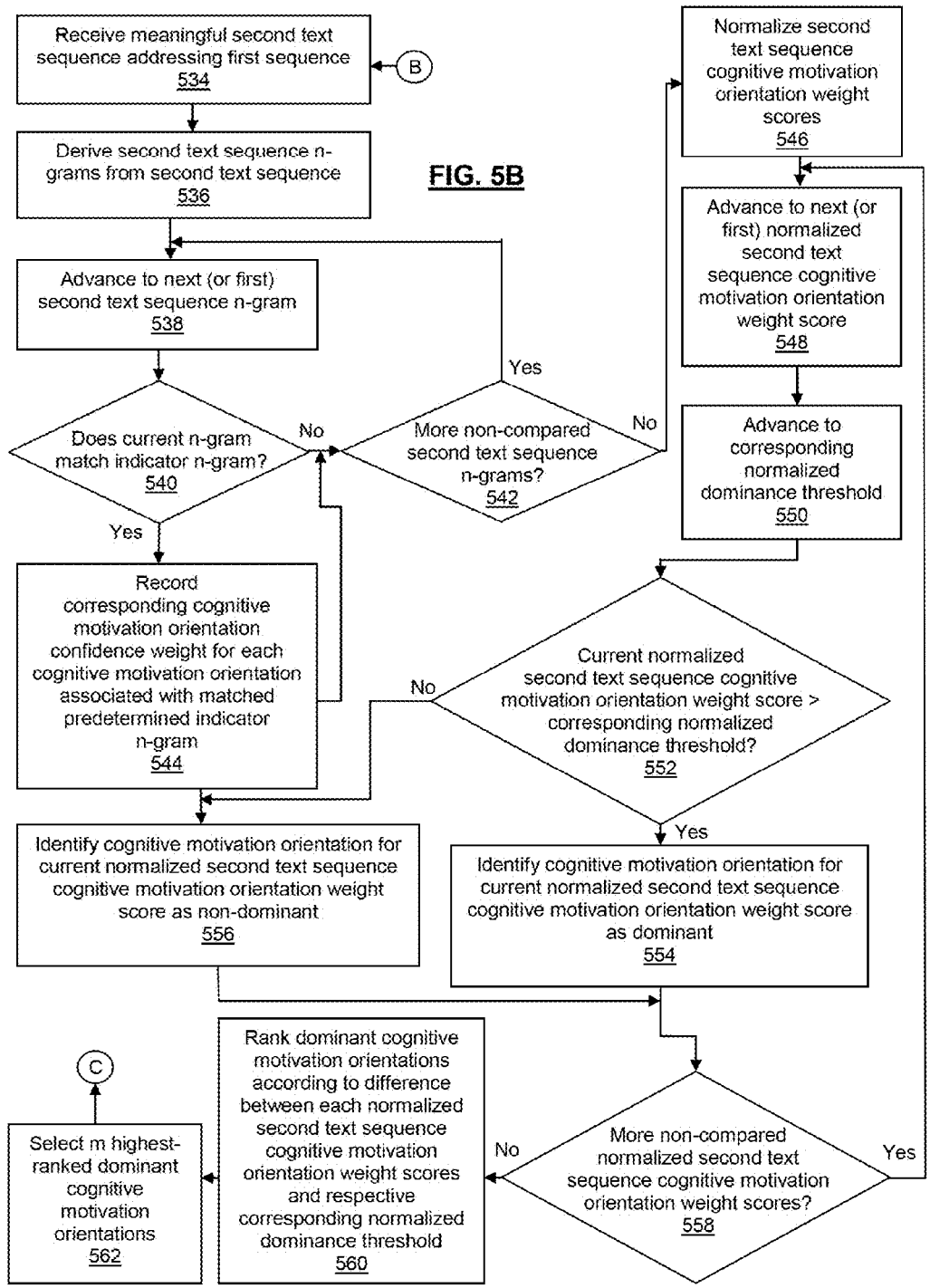

FIGS. 5A, 5B and 5C show an exemplary method 500 for neurolinguistically analyzing text. The method 500 is a particular exemplary implementation of an embodiment of the method 100 which includes steps 106B to 118 in addition to steps 102 and 104. The method 500 may be carried out on a single computer system, or certain steps of the method 500 may be carried out on different computer systems in communication with one another.

At step 502, the method 500 receives a meaningful first text sequence. This step corresponds to step 102 of the method 100. For example, in an e-mail embodiment the first text sequence received at step 502 may be the extracted message content of a received e-mail or an unsent e-mail in plain text form.

At step 504, the method 500 derives first text sequence n-grams from the first text sequence. In the exemplary embodiment, the first text sequence n-grams consist of all possible n-grams in the first text sequence. An "n-gram" is a contiguous sub-sequence of n items from a given sequence, and in the context of a text sequence may be phonemes, syllables, letters or words. In a presently preferred embodiment, the items are words and n-grams of one word (a "unigram"), two words (a "bigram") and three words (a "trigram"). In other embodiments, longer or shorter n-grams may be used. In a current embodiment, n-gram derivation is based on an interval [a, b] and thus all n-grams of size a, a+1, a+2, ..., b are derived. In a presently preferred embodiment the interval is [1, 3] although this interval is configurable. Derivation of word n-grams may be facilitated by tokenizing the first text sequence. The term "tokenizing" refers to a process in which a sequence of characters, such as ASCII characters, is divided into a sequence of individual tokens, such as words. Techniques for tokenizing, and for extracting n-grams from a sequence of tokens, are well known in the field of computer science, and are not discussed further here. By tokenizing the first text sequence into a sequence of words and then iterating over that sequence of words, all of the word unigrams, word bigrams and word trigrams can be identified. For example, if the first text sequence is "I don't want to go there", step 504 would derive the following first text sequence n-grams: "I", "I don't", "I don't want", "don't", "don't want", "don't want to", "want", "want to", "want to go", "to", "to go", "to go there", "go", "go there", and "there". The method 500 can handle emoticons by treating the emoticons as words; the tokenization process would be adapted so that the characters building an emoticon are grouped into a single token.

At step 506, the method 500 advances to the next (or first) first text sequence n-gram and then moves to step 508. At step 508, the method 500 compares the current first text sequence n-gram to a plurality of predetermined indicator n-grams to see if the current first text sequence n-gram matches one of the predetermined indicator n-grams. Each of the predetermined indicator n-grams is associated with at least one cognitive motivation orientation, and each predetermined indicator n-gram has, for each cognitive motivation orientation with which it is associated, a corresponding cognitive motivation orientation confidence weight. In a presently preferred embodiment each predetermined indicator n-grams is associated with exactly one cognitive motivation orientation. In alternate embodiments some predetermined indicator n-grams may be associated with more than one cognitive motivation orientation, with a different cognitive motivation orientation confidence weight for each cognitive motivation orientation with which it is associated. A flexible data structure could provide a cognitive motivation orientation confidence weight variable for each possible cognitive motivation orientation, with the variable set to zero for cognitive motivation orientations with which the respective predetermined indicator n-gram is not associated. In a presently preferred embodiment, the predetermined indicator n-grams are stored in a specially formatted text file; other file types may also be used to store the predetermined indicator n-grams, for example a relational database.

At step 510, responsive to a determination at step 508 that the current first text sequence n-gram does not match any of the predetermined indicator n-grams, the method 500 proceeds to step 510 to check whether there are any additional first text sequence n-grams that have not yet been compared. Responsive to a "yes" determination at step 510, the method 500 returns to step 506 to advance to the next n-gram.

Responsive to a determination at step 508 that the current first text sequence n-gram matches one of the predetermined indicator n-grams, at step 512 the method 500 records the corresponding cognitive motivation orientation confidence weight for each cognitive motivation orientation associated with that predetermined indicator n-gram. In the illustrated embodiment, recording the cognitive motivation orientation confidence weight is accomplished by, at step 512, incrementing a corresponding first text sequence cognitive motivation orientation weight score for each cognitive motivation orientation associated with that predetermined indicator n-gram according to the corresponding cognitive motivation orientation confidence weight. In a presently preferred embodiment in which each predetermined indicator n-gram is associated with exactly one cognitive motivation orientation, step 512 will increment the first text sequence cognitive motivation orientation weight score for the cognitive motivation orientation associated with the predetermined indicator n-gram that matches the current first text sequence n-gram. After step 512, the method 500 proceeds to step 510 to check whether there are any additional first text sequence n-grams that have not yet been compared.

If the method 500 determines at step 510 that there are no more first text sequence n-grams that have not yet been compared, that is, that all of the first text sequence n-grams have been checked against the plurality of predetermined indicator n-grams, this means that the method 500 has determined the "raw" first text sequence cognitive motivation orientation weight scores for each cognitive motivation orientation. Further processing of the "raw" first text sequence cognitive motivation orientation weight scores may be carried out on the same computer system that calculated them, or the "raw" first text sequence cognitive motivation orientation weight scores may be sent to another computer system for further processing.

Other techniques may be used for recording the corresponding cognitive motivation orientation confidence weight for each cognitive motivation orientation associated with a predetermined indicator n-gram matching the current n-gram. For example, in an embodiment in which processing is divided across two or more computer systems, one computer system may annotate the first text sequence, with the n-grams that matched a predetermined indicator n-gram being annotated with the corresponding cognitive motivation orientation confidence weights. Once all n-grams have been examined, the annotated first text sequence could then be sent to another computer system, which could extract the annotated cognitive motivation orientation confidence weights to obtain the "raw" first text sequence cognitive motivation orientation weight scores for further processing, for example in accordance with subsequent steps of the method 500.

The "raw" first text sequence cognitive motivation orientation weight scores will depend on the size of the first text sequence, and therefore following a determination at step 510 that all of the first text sequence n-grams have been checked against the predetermined indicator n-grams, the method 500 then proceeds to step 514, where the method 500 normalizes the first text sequence cognitive motivation orientation weight scores to obtain normalized first text sequence cognitive motivation orientation weight scores. The first text sequence cognitive motivation orientation weight scores may be normalized, for example, by dividing each first text sequence cognitive motivation orientation weight score by the number of tokens in the first text sequence. Other normalization procedures may also be used. The method 500 then proceeds to step 516.

Each of the cognitive motivation orientations which the method 500 detects will have a corresponding normalized dominance threshold which serves as a boundary for determining whether or not that cognitive motivation orientation is dominant for a particular text sequence. An exemplary method for building normalized dominance thresholds will be described below in the context of FIG. 8.

At step 516, the method 500 advances to the next (or first) normalized first text sequence cognitive motivation orientation weight score and then to step 518 to advance to the corresponding normalized dominance threshold. The method 500 then proceeds to step 520 and compares the current normalized first text sequence cognitive motivation orientation weight score to the corresponding normalized dominance threshold to see whether the current normalized first text sequence cognitive motivation orientation weight score exceeds the corresponding normalized dominance threshold. Equivalently, depending on the value of the normalized dominance threshold, step 520 may test whether the current normalized first text sequence cognitive motivation orientation weight score is equal to or greater than the corresponding normalized dominance threshold. Preferably, where the current normalized first text sequence cognitive motivation orientation weight score exceeds the corresponding normalized dominance threshold, step 520 will also determine and store the amount by which the current normalized first text sequence cognitive motivation orientation weight score exceeds the corresponding normalized dominance threshold.

Responsive to a determination at step 520 that the current normalized first text sequence cognitive motivation orientation weight score exceeds the corresponding normalized dominance threshold, the method 500 proceeds to step 522. At step 522, the method 500 identifies the cognitive motivation orientation for the current normalized first text sequence cognitive motivation orientation weight score as being a dominant cognitive motivation orientation, for example by setting a flag. Where step 520 also determines the amount by which the current normalized first text sequence cognitive motivation orientation weight score exceeds the corresponding normalized dominance threshold, storing a non-zero value for this amount may serve to identify the relevant cognitive motivation orientation as dominant.

If method determines at step 520 that the current normalized first text sequence cognitive motivation orientation weight score does not exceed the corresponding normalized dominance threshold, the method 500 proceeds to step 524. At step 524, the method 500 identifies the cognitive motivation orientation for the current normalized first text sequence cognitive motivation orientation weight score as being a non-dominant cognitive motivation orientation. In an embodiment in which step 520 also determines the amount by which the current normalized first text sequence cognitive motivation orientation weight score exceeds the corresponding normalized dominance threshold; in some embodiments storing a zero value or a negative value for this amount may serve to identify the relevant cognitive motivation orientation as non-dominant.

After either of steps 522 or 524, the method 500 proceeds to step 526 to check whether there are any normalized first text sequence cognitive motivation orientation weight scores that have not yet been compared against their corresponding normalized dominance threshold. Responsive to a "yes" determination at step 526, the method 500 returns to step 516 to advance to the next (or first) normalized first text sequence cognitive motivation orientation weight score. Responsive to a "no" determination at step 526, meaning that all the normalized first text sequence cognitive motivation orientation weight scores have been compared against their corresponding normalized dominance threshold, the method 500 proceeds to step 528.

At step 528, the method 500 ranks the dominant cognitive motivation orientations for the first text sequence according to the difference between each normalized first text sequence cognitive motivation orientation weight scores and the respective corresponding normalized dominance threshold. To account for the different magnitudes of the normalized dominance threshold, the ranking process includes a scaling step. In one embodiment, each normalized first text sequence cognitive motivation orientation weight score may be divided by its respective corresponding normalized dominance threshold, with values below 1 indicating non-dominance and values above 1 indicating dominance, and the values can then be ranked. In another embodiment, this scaling may be achieved by dividing the difference (positive or negative) between the normalized first text sequence cognitive motivation orientation weight score and the corresponding normalized dominance threshold by the absolute value of the normalized dominance threshold. In a preferred embodiment, each of the normalized first text sequence cognitive motivation orientation weight scores is mapped to a range in which the respective normalized dominance threshold is set to zero. For example, the respective normalized first text sequence cognitive motivation orientation weight scores may be mapped according to a scaling in which the portion from zero to the corresponding normalized dominance threshold is mapped to normalized range of −100 to zero. The result is that normalized first text sequence cognitive motivation orientation weight scores above zero indicate dominance and normalized first text sequence cognitive motivation orientation weight scores equal to or below zero indicate non-dominance. Following this scaling step, the scaled normalized first text sequence cognitive motivation orientation weight scores can be compared and ranked. The respective scaled normalized first text sequence cognitive motivation orientation weight scores can also be used as a confidence value indicating the degree of confidence in the determination that the respective cognitive motivation orientation is dominant, with the distance from zero representing the degree of confidence.

Although FIG. 5A shows step 520 as occurring before step 528, in other embodiments the step of determining whether the current normalized first text sequence cognitive motivation orientation weight score exceeds the corresponding normalized dominance threshold may occur after or substantially simultaneously with the step of ranking the dominant cognitive motivation orientations for the first text sequence. In certain embodiments, steps 520 through 524 may be omitted because the ranking at 528 will inherently distinguish non-dominant cognitive motivation orientations from dominant cognitive motivation orientations. For example, where the normalized cognitive motivation orientation weight scores are divided by their respective normalized dominance thresholds, a value of 1 can be used to distinguish between dominant and non-dominant cognitive motivation orientations, with values below or equal to 1 indicating non-dominance and values above 1 indicating dominance. Similarly, where each of the normalized first text sequence cognitive motivation orientation weight scores is mapped to a range in which the respective normalized dominance threshold is set to zero, a negative or zero value will indicate non-dominance and a positive value will indicate dominance.

Moreover, an identification of the ranking of the cognitive motivation orientations may be sent to another computer system, without determining which cognitive motivation orientations, if any, are dominant. For example, the values used for the ranking may be sent in an ordered list or other suitable format to such other computer system; the ranking of the cognitive motivation orientations will be inherent in the values used to rank them. The other computer system could use those values, in conjunction with appropriate boundary values, to determine which cognitive motivation orientations are dominant. The ranking values can also be used by the other computer system to select the m most dominant cognitive motivation orientations as described below. In one particularly preferred embodiment, each of the normalized first text sequence cognitive motivation orientation weight scores is mapped to a range in which the respective normalized dominance threshold is set to zero, and the resulting values are sent to another computer system as an ordered list. For example, a first computer system may execute the method 200, and a second computer system may execute steps 502 to 528 (possibly omitting steps 520 to 526) and then return the values resulting from step 528 to the first computer system as an ordered list; the ordered list would then be the communication received at step 204 of the method 200. The order in which the values appear in the ordered list appear will follow a predetermined pattern so that the values can be associated with the corresponding cognitive motivation orientations. For example, the first value in the list may correspond to the "toward" cognitive motivation orientation, the second value may correspond to the "away from" cognitive motivation orientation, the third value may correspond to the "internal" cognitive motivation orientation, and so on. Steps 530 and 532 could then be carried out by the first computer system. More details about the foregoing cognitive motivation orientations are provided below.

After step 528, the method 500 then proceeds to step 530, where the method 500 selects the m highest-ranked dominant cognitive motivation orientations as the dominant cognitive motivation orientation set for the first text sequence, where m is a positive integer. In a presently preferred embodiment, m=2 although other values of m may be used. Also in the presently preferred embodiment, the dominant cognitive motivation orientation set contains the most dominant cognitive motivation orientations but the ranking of dominant cognitive motivation orientations within the dominant cognitive motivation orientation set is immaterial. In such an embodiment, where the number of cognitive motivation orientations is identified as dominant by steps 520 through 526 is less than or equal to m, steps 528 and 530 are reduced to triviality and may be omitted; optionally an intermediate step testing for this condition may be interposed after step 526 to permit steps 528 and 530 to be bypassed where appropriate. In other embodiments, the ranking of dominant cognitive motivation orientations within the dominant cognitive motivation orientation set may be relevant for subsequent processing and as such steps 528 and 530 would only be bypassed, if at all, where only a single cognitive motivation orientation, or no cognitive motivation orientation, was identified as dominant.

The result of the method 500, following step 530 (or at the completion of all iterations of steps 520 to 526 if steps 528 and 530 are bypassed), is a dominant cognitive motivation orientation set for the first text sequence, which contains either the m most dominant of the cognitive motivation orientations that were identified as dominant or, if fewer than m cognitive motivation orientations were identified as dominant, all of the cognitive motivation orientations that were identified as dominant. If no cognitive motivation orientations were identified as dominant, the dominant cognitive motivation orientation set will be null or empty. As noted above, a presently preferred value for m is 2. Accordingly, steps 514 through 530 (or 526 if steps 528 and 530 are bypassed) are an exemplary procedure for using the recorded cognitive motivation orientation confidence weights for the first text sequence, which are obtained by steps 502 through 512, to determine a first dominant cognitive motivation orientation set expressed in the first text sequence. Following step 530 (or at the completion of all iterations of steps 520 to 526 if steps 528 and 530 are bypassed), the method 500 has transformed the meaningful text sequence received at step 502 into actionable information about the dominant cognitive motivation orientation(s) of the author of that text sequence.

In some embodiments, steps 502 to step 530 (or steps 502 through the final iteration of step 526 if steps 528 and 530 are bypassed) may be used to identify a dominant cognitive motivation orientation set for the first text communication for purposes other than comparing it to the dominant cognitive motivation orientation set for a second text sequence. For example, steps 102 and 104 of the method 100 may be implemented using this portion of the method 500, and the method 100 could then proceed to step 106A to communicate the dominant cognitive motivation orientation set determined at step 104, to step 106C to automatically select a predetermined response to the first text sequence from a set of predetermined responses based on the dominant cognitive motivation orientation set expressed within the first text sequence, or to step 106D to automatically dynamically generate a response to the first text sequence based on the dominant cognitive motivation orientation set expressed within the first text sequence.

Following step 530, the method 500 proceeds to optional step 532, where the method 500 provides recommendations for preparation of a meaningful second text sequence addressing the first text sequence. The recommendations provided at step 532 are based on the dominant cognitive motivation orientation set determined at step 530 (or at the completion of all iterations of steps 520 to 526 if steps 528 and 530 are bypassed). Step 532 may be executed in all cases or only in response to input from a user, or another computer system, requesting the recommendations. The recommendations may be predefined or "canned" recommendations, and the appropriate recommendations may be retrieved from a lookup table based on the dominant cognitive motivation orientation set. Alternatively, the recommendations may be dynamically generated based on the dominant cognitive motivation orientation set. The recommendations provided at step 532 may be presented on a display of the computer system implementing the method 500, or may be transmitted to another computer system. Alternatively, step 532 may transmit to another computer system an identification of the dominant cognitive motivation orientation set for the first text sequence, or of the recommendations to be presented, and that other computer system can retrieve the appropriate recommendations, either from local or distributed storage. In some embodiments, at step 532 identification of both the dominant cognitive motivation orientation set for the first text sequence and of recommendations may be transmitted.

Following step 532, or step 530 if step 532 is omitted, the method 500 proceeds to step 534. At step 534 the method 500 receives a meaningful second text sequence that addresses the first text sequence. For example, where the first text sequence is an e-mail message, the second text sequence may be an e-mail response to the first text sequence that has been entered into the e-mail client but not yet sent to the person who sent the first e-mail.

Following step 534, the method then proceeds to steps 536 through 562. At steps 536 through 562, the method 500 derives second text sequence n-grams from the second text sequence and compares the second text sequence n-grams to the plurality of predetermined indicator n-grams. For each second text sequence n-gram matching a predetermined indicator n-gram, the method 500 records the corresponding cognitive motivation orientation confidence weight for each cognitive motivation orientation associated with that predetermined indicator n-gram, and the method 500 uses the recorded cognitive motivation orientation confidence weights for the second text sequence to determine a second dominant cognitive motivation orientation set expressed in the second text sequence. Steps 536 through 562 correspond to steps 506 through 530, respectively, except that steps 536 through 562 are performed on the second text sequence rather than the first text sequence. Accordingly, a detailed discussion of steps 536 through 562 is omitted in the interest of brevity. It should be noted that step 562 preferably uses the same value of m as does step 530.

In the exemplary method 500, determination of the first and second dominant cognitive motivation orientations is based on statistical information derived from the appearance of particular indicator n-grams in the first and second text sequences and the weight that those indicator n-grams carry as markers of particular cognitive motivation orientations, as determined from annotated training data (as described further below). As such, complicated morphological, syntactic and semantic analysis is avoided. Moreover, the analysis is substantially indifferent to the substantive meaning of the text sequence.

At the conclusion of step 562 (or at the completion of all iterations of steps 552 to 558 if steps 562 and 562 are bypassed), the method 500 will have obtained a dominant cognitive motivation orientation set for the first text sequence and a dominant cognitive motivation orientation set for the second text sequence. Thus, following step 562 (or at the completion of all iterations of steps 552 to 558 if steps 560 and 562 are bypassed), the method 500 has transformed the meaningful text sequence received at step 534 into actionable information about the dominant cognitive motivation orientation(s) of the author of that text sequence, again as expressed in the dominant cognitive motivation orientation set.

The method 500 then proceeds to step 564.

At step 564, the method 500 tests whether the second dominant cognitive motivation orientation set fits the first dominant cognitive motivation orientation set. The precise nature of the test will depend on the categories of cognitive motivation orientations; exemplary rules for such a test are described below.

At step 566, responsive to a determination at step 564 that the second dominant cognitive motivation orientation set fits the first dominant cognitive motivation orientation set, the method 500 confirms the fit at step 566 and then ends. Confirming the fit may be done, for example, by presenting the confirmation on a display of the computer system implementing the method 500, or by transmitting the confirmation to another computer system.

At step 568, responsive to a determination at step 566 that the second dominant cognitive motivation orientation set misfits the first dominant cognitive motivation orientation set, the method 500 identifies the misfit and then proceeds to step 570. The identification of the misfit may optionally be presented on a display of the computer system implementing the method 500 or transmitted to another computer system. At step 570, responsive to identifying the misfit, the method 500 provides recommendations for modifying the second text sequence to fit the second dominant cognitive motivation orientation set for the modified second text sequence to the dominant cognitive motivation orientation set for the first text sequence, after which the method 500 ends. At optional step 572, the method 500 calculates a fit score representing the degree of fit between the second dominant cognitive motivation orientation set and the first dominant cognitive motivation orientation set. Detailed discussion of an exemplary method for calculating a fit score is provided below in the context of FIG. 12; in general, a fit score may be calculated based on how close the second dominant cognitive motivation orientation set is to an "ideal" dominant cognitive motivation orientation set given the first dominant cognitive motivation orientation set. Steps 534 through 572 can be repeated for a modified second text sequence; e.g. one that has been modified based on the recommendations at step 570. The fit score may provide a finer resolution than the "fits" or "misfits" test at step 564, and therefore can provide a measurement of whether the modifications have brought the second dominant cognitive motivation orientation set closer to matching the first dominant cognitive motivation orientation set.

The exemplary method 500 shows, for ease of illustration, a stateful embodiment in which the dominant cognitive motivation orientation set for the first text sequence may be stored so that it can be used in response to a subsequent query. Specifically, steps 502 to 532 may be executed in response to a query seeking identification of the dominant cognitive motivation orientation set for the first text sequence, or recommendations for preparing a meaningful second text sequence that addresses the first text sequence, or both. The dominant cognitive motivation orientation set for the first text sequence may be stored at or immediately following step 530 (or at or immediately following the completion of all iterations of steps 520 to 526 if steps 528 and 530 are bypassed) so that it can be used in response to a subsequent query. As a result, when the method 500 receives query seeking a comparison of the dominant cognitive motivation orientation set for the first text sequence to the dominant cognitive motivation orientation set for a meaningful second text sequence that addresses the first text sequence at step 534, it is only necessary to execute steps 534 to 562 to determine the dominant cognitive motivation orientation set for the second text sequence. The dominant cognitive motivation orientation set for the second text sequence can then be compared to the stored dominant cognitive motivation orientation set for the first text sequence. Thus, steps 502 to 532 need not be repeated and duplicative processing is avoided.

In an alternative stateless embodiment, the dominant cognitive motivation orientation set for the first text sequence is not stored for use in response to a subsequent query. In a stateless embodiment, a query seeking identification of the dominant cognitive motivation orientation set for the first text sequence, or recommendations for preparing a meaningful second text sequence that addresses the first text sequence, or both, would trigger processing of steps 502 to 532 only, after which the method 500 would end. In a stateless embodiment of the method 500, a query seeking a comparison of the dominant cognitive motivation orientation set for the first text sequence to the dominant cognitive motivation orientation set for a meaningful second text sequence that addresses the first text sequence would include both the first text sequence and the second text sequence. In response to this query, steps 502 to 566 or 570 would be executed, with step 532 being omitted and the dominant cognitive motivation orientation sets for the first text sequence and the second text sequence would be discarded after step 566 or 570. In a particular embodiment, steps 502 to 530 and steps 534 to 562 may proceed substantially in parallel. In a manner similar to that described above in the context of steps 520 to 528, steps 520 to 526 and 552 to 558 may be omitted where the dominance determination is inherent in the ranking carried out at steps 528 and 560, and an identification of the ranking may be sent to another computer system for further processing. For example, the values used for the ranking for each of the first text sequence and the second text sequence may be sent in an ordered list. The first value in the list may correspond to the "toward" cognitive motivation orientation for the first text sequence and the second value may correspond to the "toward" cognitive motivation orientation for the second text sequence, the third value in the list may correspond to the "away from" cognitive motivation orientation for the first text sequence and the fourth value in the list may correspond to the "away from" cognitive motivation orientation for the second text sequence, and so on. Alternatively, two ordered lists may be used. A first computer system may execute the method 300, and a second computer system may execute steps 502 to 528 (possibly omitting steps 520 to 526) and 534 to 560 (possibly omitting steps 552 to 558) and then return the values resulting from steps 528 and 560 to the first computer system. The first computer system could then carry out steps 530 and 532 and 562 to 570.

In some embodiments, the method 500 may incorporate a length test for the first text sequence (and the second text sequence, where applicable), and if the text sequence is too short to analyze accurately, the method 500 may return a suitable error message such as "The message is too short to analyze." In cases where the first text sequence is too short to analyze accurately but the second text sequence is long enough for accurate analysis, the method 500 may simply analyze the second text sequence in isolation as if it were a first text sequence.

Similarly, longer text sequences will require more processing resources, so in some embodiments a length limit may be imposed on the text sequences. For example, in an e-mail analysis embodiment using a client-server architecture as described above and shown in FIG. 4, the e-mail client may send only the first k characters of each text sequence, where k is a positive integer of suitable size and, where the size k is exceeded, notify the user that only the first k characters will be analyzed. The method 500 may also carry out an initial length test and reject text sequences exceeding k characters.

In certain embodiments, the cognitive motivation orientations used are selected from the meta programs identified in the field of neurolinguistics. Table 1 below lists examples of cognitive motivation orientations along with a brief description, language which indicates the presence of that cognitive motivation orientation (indicator language), as well as examples of language to use and to avoid when seeking to influence a person for whom that cognitive motivation orientation is dominant in a given context:

TABLE 1

OVERVIEW OF COGNITIVE MOTIVATION ORIENTATIONS

| Cognitive Motivation Orientation | Description | Indicator Language | Language to Use | Language to Avoid |
|---|---|---|---|---|
| Level | Doing or thinking | | | |
| Proactive | Likes to jump into action; motivated by doing | Action verbs, present tense | Go for it, do it now, don't wait, hurry up | Think about it for a while, wait, the time is not ripe, could it happen? |
| Reactive | Motivated to wait, analyze, and consider | Infinitive verbs, passive voice, conditionals | Let's consider this, think it through carefully, how could it happen?, when the time is right | Get on with it, make it happen, do it now, don't wait, get it done quickly |
| Criteria | Verbal expression of values | Exact words and phrases used & repeated | Match phrases used | Use other words |
| Direction | Movement orientation | | | |
| Toward | Motivated by goals and the benefits of achieving them | Benefits, goals, desires, moving toward | Rewards, benefits, move towards | Avoid, prevent, stop |
| Away From | Motivated to move away from what they do not want | What they don't want, not happen, problems, undesirable consequences | Avoid, solve, prevent, get away from, don't worry | Goals, rewards, benefits, move towards, you will get |
| Source | Where the decision is made | | | |
| Internal | Prefers to judge based on his or her own internal standards; motivated to decide for him or herself | I want, I need, you should, it must, I know | What do you think?, it's a choice for you to decide, is this right?, a suggestion for you to consider, only you can decide | You should, you must, don't do that, everyone will be happy you, many people prefer to, the results will show you |
| External | Motivated by outside sources, feedback or guidance | Is this okay? What should I do? | Everyone will appreciate you, I think you should, the results will show you | It's up to you, only you can decide, what do you think, here is some info so that you can decide, do you agree |
| Reason | Straight forward steps or many choices | | | |
| Options | Prefers many choices, enticed by bending or breaking rules | Variety, ways, possibilities, find a way around it | Options, choices, ways to do it, find a way around, variety | The right thing to do, the only way, the way, procedure to follow, step by step |
| Procedures | Motivated to follow and complete a process; wants to know the next step and how to do something | First, second, procedure, process | Step by step, complete the whole thing, it's the right way, the correct procedure, follow these steps | Lots of different ways, look at the possible options, possibilities, choices, find a way around |
| Decision Factors | Frequency and kind of change needed | | | |
| Sameness/ Matching | Motivated when things stay the same | Same, maintain, not changed | Keep it the same, don't change, the classic version, timeless, maintain | New, different, never been done before, unique, unusual |
| Sameness with Exception | Motivated by gradual change | Better, worse, progress, evolve | Improve, gradually, incremental, upgrade, increase, | Radical shift, stay the same, change, uniquely classic, stable |
| Difference/ Mismatching | Motivated by radical change, new, different, | Different, new, never been done before, change | Unique, be different, shift, change, switch, revolution | Same, stay the course, slow evolution, no change, be just like them |
| Scope | Size of information | | | |
| General | Focuses on the overview, big picture | Generally, the main point, overview, | Overview, big picture, mainly, to get to the point, the | Here are all the details, each little piece of |

TABLE 1-continued

OVERVIEW OF COGNITIVE MOTIVATION ORIENTATIONS

| Cognitive Motivation Orientation | Description | Indicator Language | Language to Use | Language to Avoid |
|---|---|---|---|---|
| | | | main idea | info, exactly, specifically |
| Specific | Focuses on specific details | Details, specifics | Specific actions, one by one, each detail, specifically, exactly | Skip to the end, what's really important?, details don't matter |
| Attention Direction | Attention on non-verbal behavior or content | | | |
| Self | Focuses on the words; tends not to notice others' behavior or voice tone | Robotic use of language | Use his or her Criteria, you may wish to consider, keep non-verbals to a minimum | Fantastic, disaster, notice how it feels, pay attention to how he is talking, can you see he is happy? |
| Other | Notices and responds to the non-verbal behavior of others and uses non-verbals when communicating | Voice tone and body language match the person and situation | Match the tone and non-verbals | Speak in a robotic way, do not show empathy |
| Stress Response | How a person responds to stressful events | | | |
| Feelings | Emotional responses to normal levels of stress; stays in feelings | Highly emotional vocabulary | Outrageous, awful, incredibly important, passion | Think about it, the logical thing to do, work it out step by step, be rational, use logic |
| Choice | Moves in and out of emotions voluntarily in stress | Mix of emotional and rational vocabulary | Feel and think, emotion and logic, feels right and makes good sense, evidence & gut feeling; intuition and data | Use rational or emotional language only |
| Thinking | Responds rationally in stress | Uses rational vocabulary | Think, work it out, logical, cold reality, hard facts | It has to feel right, use your intuition, gut feel, passion, excitement |
| Style | Environment that promotes productivity | | | |
| Independent | Alone with sole responsibility | I, sole, myself, indicates he/she is alone, sole responsibility | By yourself, no one will bother you, without interruption, you will have control, go it alone | Collaboratively work with others, consult at every step, report to, we need to cooperate, us |
| Proximity | In control of own territory with others around | I, team, me, them, | Your role, their role, your responsibility, each team will, you can direct the team | By yourself, do it alone, share responsibility equally, in harmony all together, we |
| Cooperative | Together with others in a team, sharing responsibility | We, us, our | All together, collaboratively, be with us, we, in harmony as a group | By yourself, do it alone, in isolation, no one will be there, total quiet |
| Sorting Filters/ Organization | What a person pays attention to | | | |
| Person | Focuses on people, and relationships | Names, mother, boss, client, folks | Names, experience, people, relationship, you will feel comfortable there | Things, results, productivity, ideas, methods |
| Thing | Focuses on tasks, systems, ideas, tools, and material objects | Things, production, tasks | Things, production, ideas, methods, results, tasks | That will feel great, improve relationships, people matter, the folks, our buddies |

TABLE 1-continued

OVERVIEW OF COGNITIVE MOTIVATION ORIENTATIONS

| Cognitive Motivation Orientation | Description | Indicator Language | Language to Use | Language to Avoid |
|---|---|---|---|---|
| Place | Focuses on surroundings, place in a group | Environment view, where, place in group | Your place, where you are, surroundings, environment, the place is | Do this, focus on people, the information proves, we need to take action |
| Information | Focuses on data, content, research | Facts, data, information | The information is, what the facts demonstrate, research indicates, did you know? the data will show | How they feel, where we are now, let's do this, people matter, step by step |
| Activity | Focuses on actions, what is to be done | Active verbs | What will we do? Put that in action, let's do it now, make it so, you can do it | The data will show, people feel, look around, stay still, wait for them |
| Rule Structure | Behavior rules for self and others | | | |
| My/My | My rules for me/My rules for you; able to tell others what they expect | You should, if I were you | You know what the others ought to do, just tell them what you think, you know the right way, because you are certain that this needs to be done, let them know | You should, when you're not sure, if you don't know, it's ambiguous, maybe yes, maybe no |
| My/. | My rules for me/Doesn't pay much attention to others | Who cares about them?, they are not important | Forget about them, you are all that matters, do what you want, they won't mind, in your best interest | They need to be catered to, focus on others, they matter more than you, show them you care, others want |
| No/My | Don't know what the rules are for me/I have rules for others | Not sure, don't know, but others should | While you may not be sure, think about what they need to do, even if you aren't sure, when you don't know what to do, what would someone else do? | You know inside yourself, just decide, make it so, get on with it, come on, aren't you over this already? |
| My/Your | My rules for me/Your rules for you; sees both sides; so may be hesitant to tell others what to do | I need, they need, two points of view | Different strokes for different folks, to each his own, not everyone is the same, several points of view, many perspectives | Compliance by everyone, same standards, across the board, the acorn doesn't fall far from the tree, consistent |
| Convincer Channel | Type of information a person needs to start the process of getting convinced | | | |
| See | See evidence | See, clarity, vision | Look at this, see what I mean?, the light is on, clarity, look here | Feel it in your gut, listen carefully, read the report, talk it over, say it out loud |
| Hear | Oral presentation or hear something | Discuss, ask, listen | Ask yourself, sounds right, listen to this, hear all about it, harmonious | It looks great, read it in the reports, see this, gut feel, feel good about it |
| Read | Read something | Read, reports analyze text | Read about it online, read it here, the reports are in, have you read the book? Reading into the facts | Let's discuss this, what do you see? Gut feel, look it over, talk about it |
| Do | Do something | Work with it, try it out, struggle with it | Try it on, work through it, test drive it | Look it over, ask about it, read the information |

TABLE 1-continued

OVERVIEW OF COGNITIVE MOTIVATION ORIENTATIONS

| Cognitive Motivation Orientation | Description | Indicator Language | Language to Use | Language to Avoid |
|---|---|---|---|---|
| Convincer Mode | How the information previously gathered is processed to enable a person to become "convinced" of something | | | |
| Number of Examples | Certain number of times to be convinced | Numbers of times | A couple of times, 3 examples, once is not enough, several times over, twice now | Jump to conclusions, try it for a while, a long period, mull it over for the next week, decide now |
| Automatic | Convinced immediately and rarely change their minds | Know right away, it's obvious | You will know immediately, it will be love at first site, you can decide right away, don't wait, get it now | Take lots of time to decide, check if you have doubts, try it a few times first, look into your doubts |
| Consistent | Never completely convinced | You never know, doubt, possible problems | Check it each time to make sure, may not quite convincing enough yet, each event is a little bit different, each and every time, you never know | You'll be certain, we know for sure, you can tell right away, a couple of times is enough, do it for a little while |
| Period of Time | Need a certain duration to be convinced | Day, week, month, year | Have it for a while, mull it over for a couple of weeks, how long do you need, trial period, a month | If you try it once, you'll know, 3 times a winner, right away, don't even think about it, several examples |
| Time Orientation | | | | |
| Past | Focused on past events etc | Were, was, had been | Learn from past experienced, based on what happened, last time, in the past, a year ago | Prepare for the future, be here now, plan for what is next, leave the past behind, in the now |
| Present | In the moment | Now, here, in the present | What's important right now, what are you thinking now, here and now, in the present, at the moment | The past will show you, think about the future consequences, think about what happened before, yesterday, tomorrow |
| Future | Thinking about future | future, tomorrow, next year | And in five years from now, looking back from the future, next year, next month, from now on | Now is all that matters, the present time, think about the past, we used to, past tradition, stick to what was done |

The "Language to Use" and "Language to Avoid" boxes in the table above each provide a short exemplary list which illustrates the types of phrases which should be used and avoided, respectively, in the second text sequence when a particular cognitive motivation orientation is part of the dominant cognitive motivation orientation set expressed in the first text sequence. The information in the table above can thus be used, for example, to generate recommendations, either predefined ("canned") or dynamically, for modifying the second text sequence to fit the dominant cognitive motivation orientation set for the second text sequence to the dominant cognitive motivation orientation set for the first text sequence. One skilled in the art, now informed by the present disclosure, can expand upon the exemplary "Language to Use" and "Language to Avoid" with different words and phrases having similar meanings.

In one particular embodiment, the cognitive motivation orientations which the method 100 (as exemplified by the method 500) detects are "toward", "away from", "internal", "external", "options" and "procedures". Table 2 below is a correspondence table illustrating exemplary mappings between the dominant cognitive motivation orientation set determined for the first text sequence and the ideal dominant cognitive motivation orientation set for the second text sequence for such an embodiment in which m (the number of most dominant cognitive motivation orientations included in the dominant cognitive motivation orientation set) is equal to 2 at least for the dominant cognitive motivation orientation for the first text sequence. In the cells underneath each cognitive motivation orientation under the heading "Ideal dominant cognitive motivation orientation set for second text sequence", a "y" means that cognitive motivation orientation must be dominant, an "n" means that cognitive motivation orientation must not be dominant, and an "i" indicates that the ideal dominant cognitive motivation orientation set for the second text sequence is indifferent to whether that cognitive motivation orientation is dominant or non-dominant.

The rules shown in the above table can be used to determine, for example at step 112 of the method 100 or step 566 of the method 500, whether the dominant cognitive motivation orientation set for the second text sequence fits or misfits the dominant cognitive motivation orientation set for the first text sequence. Where the current dominant cognitive motivation orientation set for the second text sequence is the ideal dominant cognitive motivation orientation set for the second text sequence, the dominant cognitive motivation orientation set for the second text sequence fits the dominant cognitive motivation orientation set for the first text sequence. Conversely, where the current dominant cognitive motivation orientation set for the second text sequence differs from the ideal dominant cognitive motivation orientation set for the second text sequence, the dominant cognitive motivation orientation set for the second text sequence misfits the dominant cognitive motivation orientation set for the first text sequence.

TABLE 2

CORESPONDENCE BETWEEN COGNITIVE MOTIVATION ORIENTATION SET FOR FIRST TEXT SEQUENCE AND IDEAL COGNITIVE MOTIVATION ORIENTATION SET FOR SECOND TEXT SEQUENCE

| Dominant cognitive motivation orientation set for first text sequence | | Ideal dominant cognitive motivation orientation set for second text sequence | | | | | |
|---|---|---|---|---|---|---|---|
| | | Away-From | Toward | External | Internal | Options | Procedures |
| Away-from | Toward | y | y | i | i | i | i |
| Options | Away-from | y | i | i | i | y | i |
| Procedures | Toward | i | y | i | i | i | y |
| Toward | Options | i | y | i | i | y | i |
| Options | Procedures | i | i | i | i | y | y |
| Procedures | Away-from | y | i | i | i | i | y |
| Away-from | None | y | i | i | i | i | i |
| Toward | None | i | y | i | i | i | i |
| Options | None | i | i | i | i | y | i |
| Procedures | None | i | i | i | i | i | y |
| None | None | i | i | y | n | y | i |
| Toward | Internal | i | y | y | n | y | i |
| Internal | External | i | i | y | n | y | i |
| Away-from | Internal | y | i | y | n | y | i |
| Internal | Options | i | i | y | n | y | i |
| Internal | Procedures | i | i | y | n | y | y |
| Internal | None | i | i | y | n | y | i |
| Toward | External | i | y | n | y | y | i |
| External | Options | i | i | n | y | y | i |
| External | Procedures | i | i | n | y | y | y |
| Away-from | External | y | i | n | y | y | i |
| External | None | i | i | n | y | y | i |

It should be noted that while certain rows in the above table may appear to be contradictory, for example, where "toward" and "away from" are identified as the two most dominant cognitive motivation orientations, this merely indicates that, within that context, the individual who composed the relevant text sequence is in the middle of the continuum or is equally motivated by both.

Table 2 above identifies certain exemplary dominant cognitive motivation orientation sets, but is not intended to limit the application of the systems, methods and computer program products to dominant cognitive motivation orientation sets formed by a combination of those cognitive motivation orientations, and the systems, methods and computer program products can be extended to encompass a wide variety of cognitive motivation orientations, including other cognitive motivation orientations listed in Table 1.

The rules shown in the above table can be used to:

provide recommendations for preparation of a meaningful second text sequence addressing the first text sequence (e.g. step 106B of the method 100 or step 532 of the method 500);

provide recommendations for modifying the second text sequence to fit the dominant cognitive motivation orientation set expressed within the second text sequence to the dominant cognitive motivation orientation set expressed within the first text sequence (e.g. step 118 of the method 100, step 570 of the method 500);

automatically select a predetermined response to the first text sequence from a set of predetermined responses (e.g. step 106C of the method 100); and/or automatically dynamically generate a response to the first text sequence (e.g. step 106D of the method 100).

The table above illustrates the following rules for testing whether the dominant cognitive motivation orientation set for the second text sequence fits the dominant cognitive motivation orientation set for the first text sequence:

where the dominant cognitive motivation orientation for the first text sequence is the away-from cognitive motivation orientation alone, the dominant cognitive motivation orientation set for the second text sequence fits the dominant cognitive motivation orientation set for the first text sequence where the dominant cognitive motivation orientation set for the second text sequence includes the away-from cognitive motivation orientation;

where the dominant cognitive motivation orientation set for the first text sequence is the toward cognitive motivation orientation alone, the dominant cognitive motivation orientation set for the second text sequence fits the dominant cognitive motivation orientation set for the first text sequence where the dominant cognitive motivation orientation set for the second text sequence includes the toward cognitive motivation orientation;

where the dominant cognitive motivation orientation set for the first text sequence is the options cognitive motivation orientation alone, the dominant cognitive motivation orientation set for the second text sequence fits the dominant cognitive motivation orientation set for the first text sequence where the dominant cognitive motivation orientation set for the second text sequence includes the options cognitive motivation orientation;

where the dominant cognitive motivation orientation set for the first text sequence is the procedures cognitive motivation orientation alone, the dominant cognitive motivation orientation set for the second text sequence fits the dominant cognitive motivation orientation set for the first text sequence where the dominant cognitive motivation orientation set for the second text sequence includes the procedures cognitive motivation orientation;

where the dominant cognitive motivation orientation set for the first text sequence is the internal cognitive motivation orientation alone, the dominant cognitive motivation orientation set for the second text sequence fits the dominant cognitive motivation orientation set for the first text sequence where the dominant cognitive motivation orientation set for the second text sequence includes the external cognitive motivation orientation and the options cognitive motivation orientation and excludes the internal cognitive motivation orientation;

where the dominant cognitive motivation orientation set for the first text sequence is the external cognitive motivation orientation alone, the dominant cognitive motivation orientation set for the second text sequence fits the dominant cognitive motivation orientation set for the first text sequence where the dominant cognitive motivation orientation set for the second text sequence includes the internal cognitive motivation orientation and the options cognitive motivation orientation and excludes the external cognitive motivation orientation;

where the dominant cognitive motivation orientation set for the first text sequence includes the away-from cognitive motivation orientation and the towards cognitive motivation orientation as the most dominant cognitive motivation orientations, the dominant cognitive motivation orientation set for the second text sequence fits the dominant cognitive motivation orientation set for the first text sequence where the dominant cognitive motivation orientation set for the second text sequence includes the away-from cognitive motivation orientation and the towards cognitive motivation orientation;

where the dominant cognitive motivation orientation set for the first text sequence includes the away-from cognitive motivation orientation and the options cognitive motivation orientation as the most dominant cognitive motivation orientations, the dominant cognitive motivation orientation set for the second text sequence fits the dominant cognitive motivation orientation set for the first text sequence where the dominant cognitive motivation orientation set for the second text sequence includes the away-from cognitive motivation orientation and the options cognitive motivation orientation;

where the dominant cognitive motivation orientation set for the first text sequence includes the away-from cognitive motivation orientation and the procedures cognitive motivation orientation as the most dominant cognitive motivation orientations, the dominant cognitive motivation orientation set for the second text sequence fits the dominant cognitive motivation orientation set for the first text sequence where the dominant cognitive motivation orientation set for the second text sequence includes the away-from cognitive motivation orientation and the procedures cognitive motivation orientation;

where the dominant cognitive motivation orientation set for the first text sequence includes the away-from cognitive motivation orientation and the internal cognitive motivation orientation as the most dominant cognitive motivation orientations, the dominant cognitive motivation orientation set for the second text sequence fits the dominant cognitive motivation orientation set for the first text sequence where the dominant cognitive motivation orientation set for the second text sequence includes the away-from cognitive motivation orientation, the external cognitive motivation orientation and the options cognitive motivation orientation and excludes the internal cognitive motivation orientation;

where the dominant cognitive motivation orientation set for the first text sequence includes the away-from cognitive motivation orientation and the external cognitive motivation orientation as the most dominant cognitive motivation orientations, the dominant cognitive motivation orientation set for the second text sequence fits the dominant cognitive motivation orientation set for the first text sequence where the dominant cognitive motivation orientation set for the second text sequence includes the away-from cognitive motivation orientation, the internal cognitive motivation orientation and the options cognitive motivation orientation and excludes the external cognitive motivation orientation;

where the dominant cognitive motivation orientation set for the first text sequence includes the toward cognitive motivation orientation and the procedures cognitive motivation orientation as the most dominant cognitive motivation orientations, the dominant cognitive motivation orientation set for the second text sequence fits the dominant cognitive motivation orientation set for the first text sequence where the dominant cognitive motivation orientation set for the second text sequence includes the toward cognitive motivation orientation and the procedures cognitive motivation orientation;

where the dominant cognitive motivation orientation set for the first text sequence includes the toward cognitive motivation orientation and the options cognitive motivation orientation as the most dominant cognitive motivation orientations, the dominant cognitive motivation orientation set for the second text sequence fits the dominant cognitive motivation orientation set for the first text sequence where the dominant cognitive motivation orientation set for the second text sequence includes the toward cognitive motivation orientation and the options cognitive motivation orientation;

where the dominant cognitive motivation orientation set for the first text sequence includes the toward cognitive motivation orientation and the internal cognitive motivation orientation as the most dominant cognitive motivation orientations, the dominant cognitive motivation orientation set for the second text sequence fits the dominant cognitive motivation orientation set for the first text sequence where the dominant cognitive motivation orientation set for the second text sequence includes the toward cognitive motivation orientation, the external cognitive motivation orientation and the options cognitive motivation orientation and excludes the internal cognitive motivation orientation;

where the dominant cognitive motivation orientation set for the first text sequence includes the toward cognitive motivation orientation and the external cognitive motivation orientation as the most dominant cognitive motivation orientations, the dominant cognitive motivation orientation set for the second text sequence fits the dominant cognitive motivation orientation set for the first text sequence where the dominant cognitive motivation orientation set for the second text sequence includes the internal cognitive motivation orientation and the options cognitive motivation orientation and the towards cognitive motivation orientation and excludes the external cognitive motivation orientation;

where the dominant cognitive motivation orientation set for the first text sequence includes the options cognitive motivation orientation and the procedures cognitive motivation orientation as the most dominant cognitive motivation orientations, the dominant cognitive motivation orientation set for the second text sequence fits the dominant cognitive motivation orientation set for the first text sequence where the dominant cognitive motivation orientation set for the second text sequence includes the options cognitive motivation orientation and the procedures cognitive motivation orientation;

where the dominant cognitive motivation orientation set for the first text sequence includes the options cognitive motivation orientation and the internal cognitive motivation orientation as the most dominant cognitive motivation orientations, the dominant cognitive motivation orientation set for the second text sequence fits the dominant cognitive motivation orientation set for the first text sequence where the dominant cognitive motivation orientation set for the second text sequence includes the external cognitive motivation orientation and the options cognitive motivation orientation and excludes the internal cognitive motivation orientation;

where the dominant cognitive motivation orientation set for the first text sequence includes the internal cognitive motivation orientation and the external cognitive motivation orientation as the most dominant cognitive motivation orientations, the dominant cognitive motivation orientation set for the second text sequence fits the dominant cognitive motivation orientation set for the first text sequence where the dominant cognitive motivation orientation set for the second text sequence includes the external cognitive motivation orientation and the options cognitive motivation orientation and excludes the internal cognitive motivation orientation;

where the dominant cognitive motivation orientation set for the first text sequence includes the internal cognitive motivation orientation and the procedures cognitive motivation orientation as the most dominant cognitive motivation orientations, the dominant cognitive motivation orientation set for the second text sequence fits the dominant cognitive motivation orientation set for the first text sequence where the dominant cognitive motivation orientation set for the second text sequence includes the external cognitive motivation orientation, the options cognitive motivation orientation and the procedures cognitive motivation orientation and excludes the internal cognitive motivation orientation;

where the dominant cognitive motivation orientation set for the first text sequence includes the external cognitive motivation orientation and the procedures cognitive motivation orientation as the most dominant cognitive motivation orientations, the dominant cognitive motivation orientation set for the second text sequence fits the dominant cognitive motivation orientation set for the first text sequence where the dominant cognitive motivation orientation set for the second text sequence includes the internal cognitive motivation orientation, the options cognitive motivation orientation and the procedures cognitive motivation orientation and excludes the external cognitive motivation orientation;

where the dominant cognitive motivation orientation set for the first text sequence is determined to be null, the dominant cognitive motivation orientation set for the second text sequence fits the dominant cognitive motivation orientation set for the first text sequence where the dominant cognitive motivation orientation set for the second text sequence includes the external cognitive motivation orientation and the options cognitive motivation orientation and excludes the internal cognitive motivation orientation.

Thus, step 564 may compare the current second dominant cognitive motivation orientation set to the ideal dominant cognitive motivation orientation set for the second text sequence as set out in Table 2 above.

Figure 12:
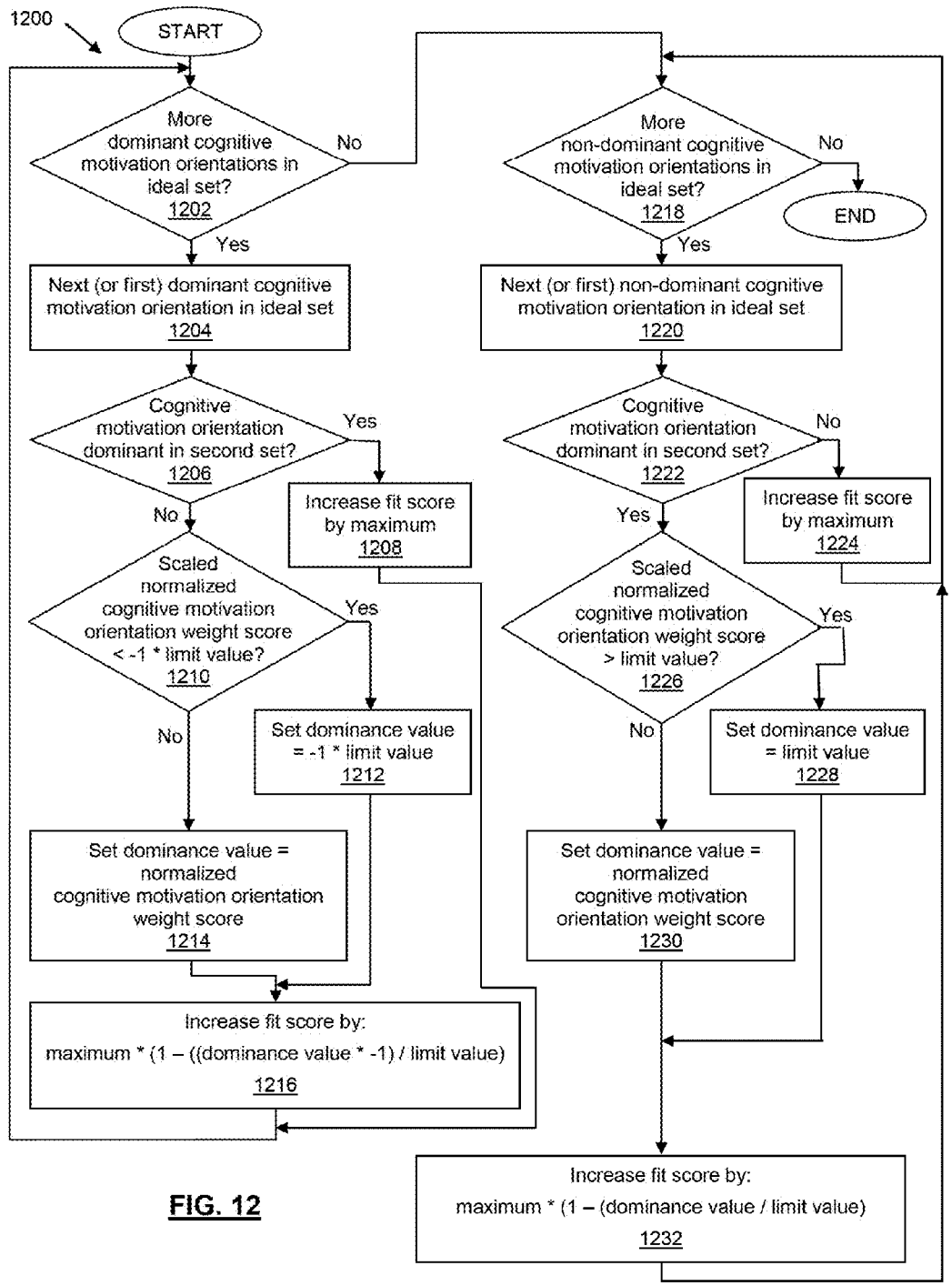
FIG. 12 is a flow chart showing an exemplary method for calculating a fit score.

Reference is now made to FIG. 12, which shows an exemplary method 1200 for calculating a fit score. In summary, the fit score is the sum of certain calculated values derived from the normalized cognitive motivation orientation weight scores for each cognitive motivation orientation in the second dominant cognitive motivation orientation set that must be dominant or must be non-dominant in the ideal dominant cognitive motivation orientation set for the second text sequence. Where a cognitive motivation orientation that must be dominant in the ideal dominant cognitive motivation orientation set is dominant in the second dominant cognitive motivation orientation set, and when a cognitive motivation orientation that must not be dominant in the ideal dominant cognitive motivation orientation set is non-dominant in the second dominant cognitive motivation orientation set, a maximum value will be contributed to the fit score. Where a cognitive motivation orientation that must be dominant in the ideal dominant cognitive motivation orientation set is non-dominant in the second dominant cognitive motivation orientation set, and when a cognitive motivation orientation that must not be dominant in the ideal dominant cognitive motivation orientation set is dominant in the second dominant cognitive motivation orientation set, the contribution to the fit score will be based on how far away the normalized cognitive motivation orientation weight score for that cognitive motivation orientation is from being dominant or non-dominant, respectively. Normalized cognitive motivation orientation weight scores for cognitive motivation orientations to which the ideal dominant cognitive motivation orientation set for the second text sequence is indifferent are not included in the calculation.

In a preferred embodiment, the fit score has a maximum value of 100, and each cognitive motivation orientation that must be dominant or must be non-dominant in the ideal dominant cognitive motivation orientation set for the second text sequence can contribute a maximum value equal to 100 divided by the number of cognitive motivation orientations that must be dominant or must be non-dominant in the ideal dominant cognitive motivation orientation set. For example, if there are three cognitive motivation orientations that must be dominant and one cognitive motivation orientation that must be non-dominant, each cognitive motivation orientation can contribute a maximum of 25 to the fit score (100/4=25) and if there are two cognitive motivation orientations that must be dominant and one cognitive motivation orientation that must be non-dominant, each cognitive motivation orientation can contribute a maximum of 33.33 to the fit score (100/3=33.33). If there is one cognitive motivation orientation that must be dominant and no cognitive motivation orientations that must not be dominant, that single cognitive motivation orientation would contribute a maximum of 100 to the fit score (100/1=100). In the preferred embodiment described in the context of FIG. 12 and the method 1200 the respective normalized first text sequence cognitive motivation orientation weight scores are mapped according to a scaling in which the portion from zero to the corresponding normalized dominance threshold is mapped to normalized range of −100 to zero, so that zero serves as the boundary between dominant and non-dominant, as described above.

At step 1202, the method 1200 checks whether there are any more dominant cognitive motivation orientations in the ideal dominant cognitive motivation orientation set. Responsive to a "yes" at step 1202, the method 1200 proceeds to step 1204 and advances to the next (or first) cognitive motivation orientation that must be dominant in the ideal dominant cognitive motivation orientation set for the second text sequence. At step 1206, the method 1200 checks whether that same cognitive motivation orientation is dominant in the second dominant cognitive motivation orientation set. A "yes" determination at step 1206 indicates that that cognitive motivation orientation is dominant when it is supposed to be, and the method proceeds to step 1208 and increases the fit score by the maximum and then returns to step 1202. Responsive to a "no" determination at step 1206, indicating that the cognitive motivation orientation is not dominant when it should be, the method 1200 proceeds to step 1210.

At step 1210, the method 1200 compares the magnitude of the scaled normalized cognitive motivation orientation weight score to a limit value. Although the boundary between dominant and non-dominant is set at zero for the scaled normalized cognitive motivation orientation weight scores, the magnitude of the distance of a scaled normalized cognitive motivation orientation weight score from the boundary is relevant. For example, scaled normalized cognitive motivation orientation weight scores of −70 and −2 both indicate non-dominance, but the latter is much closer to being dominant than the former. A slight improvement (e.g. an increase of 5) to a scaled normalized cognitive motivation orientation weight score of −2 might make the corresponding cognitive motivation orientation dominant, whereas the same magnitude of improvement to a scaled normalized cognitive motivation orientation weight score of −70 would make very little difference. The limit value is selected as the magnitude from the zero boundary where improvements to the scaled normalized cognitive motivation orientation weight score begin to have a significant effect and therefore should be taken into account in calculating the fit score. In a preferred embodiment, the limit value is 30, although other limit values may also be used.

Accordingly, at step 1210, the method 1200 tests whether the scaled normalized cognitive motivation orientation weight score for the current cognitive motivation orientation is less than −1 multiplied by the limit value. Since at step 1210 the method 1200 is handling a case where the current cognitive motivation orientation should be dominant but is not, the scaled normalized cognitive motivation orientation weight score is negative and the limit value is multiplied by −1 for the comparison. If the scaled normalized cognitive motivation orientation weight score for the current cognitive motivation orientation is less than −1 multiplied by the limit value ("yes" at step 1210), the method 1200 proceeds to step 1212 and sets a dominance value used in calculating the fit score equal to −1 multiplied by the limit value. If the scaled normalized cognitive motivation orientation weight score for the current cognitive motivation orientation is greater than or equal to −1 multiplied by the limit value ("no" at step 1210) then the dominance value is set equal to the scaled normalized cognitive motivation orientation weight score for the current cognitive motivation orientation at step 1214. In other embodiments, if the dominance value is initialized to the scaled normalized cognitive motivation orientation weight score for the current cognitive motivation orientation, step 1214 may be omitted.

After either step 1212 or 1214, the method 1200 proceeds to step 1216, where the method 1200 increases the fit score according the formula: maximum*(1−((dominance value*−1)/limit value). Where the dominance value was set equal to −1 multiplied by the limit value, the formula reduces to zero; in other cases the amount by which the fit score is increased will be positive and will be greater the closer the normalized cognitive motivation orientation weight score is to zero. After step 1216, the method 1200 returns to step 1202 to check whether there are any more dominant cognitive motivation orientations in the ideal dominant cognitive motivation orientation set.

Responsive to a "no" at step 1202, indicating that all of the cognitive motivation scores that must be dominant in the ideal dominant cognitive motivation orientation set have been considered, the method 1200 proceeds to step 1218 to check whether there are any more cognitive motivation orientations that must be non-dominant in the ideal dominant cognitive motivation orientation set.

Responsive to a "yes" at step 1218, at step 1220 the method 1200 advances to the next (or first) cognitive motivation orientation that must be non-dominant in the ideal dominant cognitive motivation orientation set for the second text sequence, and then at step 1222 the method 1200 checks whether that same cognitive motivation orientation is dominant in the second dominant cognitive motivation orientation set. A "no" determination at step 1222 indicates that that cognitive motivation orientation is non-dominant in the second cognitive motivation orientation set as in the ideal dominant cognitive motivation orientation set, so the method 1200 proceeds to step 1224 and increases the fit score by the maximum and then returns to step 1218. Responsive to a "yes" determination at step 1222, indicating that the cognitive motivation orientation is dominant when it should not be dominant, the method 1200 proceeds to step 1226.

At step 1226, the method 1200 tests whether the scaled normalized cognitive motivation orientation weight score for the current cognitive motivation orientation exceeds the limit value. At step 1226 the method 1200 is handling a case where the current cognitive motivation orientation is dominant when it should not be, so the scaled normalized cognitive motivation orientation weight score is positive. If the scaled normalized cognitive motivation orientation weight score for the current cognitive motivation orientation exceeds the limit value ("yes" at step 1226), the method 1200 proceeds to step 1228 and sets the dominance value used in calculating the fit score equal to the limit value. If the scaled normalized cognitive motivation orientation weight score for the current cognitive motivation orientation is less than or equal to the limit value ("no" at step 1226) then at step 1230 the dominance value is set equal to the scaled normalized cognitive motivation orientation weight score for the current cognitive motivation orientation.

After either step 1228 or 1230, the method 1200 proceeds to step 1232, where the method 1200 increases the fit score according the formula: maximum*(1−(dominance value/limit value). Where the dominance value was set equal to the limit value, the formula reduces to zero; in other cases the amount by which the fit score is increased will be greater the closer the normalized cognitive motivation orientation weight score is to zero. After step 1232, the method 1200 returns to step 1218 to check whether there are any more cognitive motivation orientations that must not be dominant in the ideal dominant cognitive motivation orientation set. Responsive to a "no" determination at step 1218, indicating that the method 1200 has considered all cognitive motivation orientations that must be dominant or must not be dominant in the ideal cognitive motivation orientation set (i.e. all non-indifferent cognitive motivation orientations), the method 1200 ends.

The method 1200 is merely one example of a method for calculating a fit score; other methods may also be used.

Reference is now made to FIG. 6, which is a flow chart showing an exemplary method 600 for building an analysis database associating n-grams with cognitive motivation orientations. A database built according to the method 600 shown in FIG. 6 may provide the plurality of predetermined indicator n-grams used at steps 508 and 540 of the method 500 shown in FIGS. 5A, 5B and 5C.

At step 602, the method 600 receives a training corpus comprising a plurality of training documents. The training documents may consist of a variety of types of document in electronic form, including e-mail message bodies, letter contents, text message contents, essays, news articles, and so on. For documents that did not originate in electronic form, the documents may be manually retyped, scanned using OCR technology or otherwise converted into electronic form. The training documents may be general in nature, covering a range of subject matter, or may be specialized training documents associated with particular fields. For example, to build an analysis database useful for analyzing communications between lawyers, the training documents could come from e-mails, letters and text messages between lawyers, or between lawyers and their clients, legal agreements, or court documents. Similarly, suitably selected training documents may be used to build analysis databases for other fields or professions, such as medicine or accounting, or for particular business areas such as manufacturing, consulting, human resources or marketing.

Each of the training documents comprises a plurality of meaningfully arranged words. These words may include emoticons and informal abbreviations, such as "l8r" (meaning "later"), "ttyl" (meaning "talk to you later" and "ROTFL" (meaning "rolling on the floor laughing") as well as well-defined dictionary words. In addition, the words in the training documents may include common grammar and spelling errors. Each of the training documents has at least one annotated word sequence of one or more words therein, and each of these annotated word sequences is annotated with a corresponding word-sequence-level annotation identifying at least one cognitive motivation orientation associated with that annotated word sequence. For example, the word sequence "find a way around it" may be annotated with a word-sequence-level annotation identifying the "options" cognitive motivation orientation as being associated with that word sequence, and the word sequence "what I don't want to happen is" may be annotated with a word-sequence-level annotation identifying the "away from" cognitive motivation orientation as being associated with that word sequence. Typically, the word-sequence-level annotations would be based on an identification of the association between the relevant word sequence and the cognitive motivation orientation by a human individual skilled in the field of neurolinguistics. Examples of such associations can be seen in the "Indicator Language" column in Table 1 above, some of the cells of which include word sequences which indicate, and hence are associated with, the cognitive motivation association for the row in which that cell is found. Annotation may be carried out, for example, using a modified version of the MMAX2 annotation tool (the current open source release of MMAX2 is available at http://sourceforge.net/projects/mmax2/files/).

In a case where a word sequence is associated with more than one cognitive motivation orientation, that word sequence may have a single annotation identifying each cognitive motivation orientation with which it is associated, or may have one annotation for each such cognitive motivation orientation.

At steps 604 through 614, the method 600 generates indicator candidate n-grams.

At step 604, the method 600 advances to the next (or first) training document, and then advances to the next (or first) unexamined annotated word sequence in the current training document at step 606.

At step 608, the method 600 extracts n-grams overlapping the current annotated word sequence. In particular, at step 608, for each positive integer n where 0<n≤x and x is a positive integer, the method extracts all n-grams overlapping that annotated word sequence. In a presently preferred embodiment, x=3 and at step 608 all unigrams, bigrams and trigrams overlapping the current annotated word sequence are extracted. For example, if the word sequence "find a way around it" is annotated with the "options" cognitive motivation orientation, step 608 would extract the following n-grams: "find", "a", "way", "around", "it", "find a", "a way", "way around", "around it", "find a way", "a way around", and "way around it". In alternative embodiments, unigrams and/or other shorter n-grams may be ignored, and step 608 may extract all n-grams overlapping the annotated word sequence for all cases where y<n≤x and x and y are positive integers. For example, where y=3 and x=6, step 608 would extract 4-grams, 5-grams and 6-grams. After step 608, the method 600 then proceeds to step 610, at which each extracted n-gram is associated with the cognitive motivation orientation(s) associated with the current annotated word sequence. Continuing with the example of the word sequence "find a way around it", each of the n-grams "find", "a", "way", "around", "it", "find a", "a way", "way around", "around it", "find a way", "a way around", and "way around it" would be associated with the "options" cognitive motivation orientation. Suitable methods for extracting the n-grams are within the capability of one skilled in the art, now informed by the present disclosure, and hence are not described further here.

After step 610, the method 600 proceeds to step 612. At step 612, for each n-gram extracted at step 608 and associated with the cognitive motivation orientation(s) associated with the current annotated word sequence at step 610, the method 600 increments a respective counter. The counter records the number of times that the n-gram appears in the training corpus in association with the cognitive motivation orientation(s) with which it was associated at step 610. Thus, there will be one counter for each n-gram—cognitive motivation orientation pair, and the counter will be incremented each time the method 600 identifies (at steps 608 to 610) another instance where the n-gram appears in the training corpus in association with that cognitive motivation orientation. In one implementation, step 612 may comprise first checking for an existing counter for a particular n-gram—cognitive motivation orientation pair. If an existing counter for that n-gram—cognitive motivation orientation pair is found, the counter would be incremented by 1; if no such counter yet exists, the counter would be created and initialized at a value of 1. The information contained in the counters may be utilized later in applying one or more relevance filters (step 618) and in assigning confidence weights (step 620) as described further below.

While FIG. 6 shows the method 600 first extracting all n-grams overlapping the current annotated word sequence (step 608), then associating all of the extracted n-grams with the appropriate cognitive motivation orientation (step 610), and then incrementing the respective counters, this is merely illustrative of one exemplary implementation. For example, the method 600 may equivalently be performed with steps 608, 610 and 612 executing substantially simultaneously, such as by associating each extracted n-gram with the cognitive motivation orientation and incrementing the counter immediately following extraction thereof.

To facilitate extraction of the n-grams (step 608), the training documents are preferably tokenized into words as the first stage in the annotation process. Thus, in a preferred embodiment, the training documents are created by annotating token sequences, and annotations will start and end at token borders.

After each iteration of steps 608, 610 and 612, the method 600 proceeds to step 614 to check whether there are more unexamined annotated word sequences in the current training document. Responsive to a determination that there are more unexamined annotated word sequences in the current training document ("yes" at step 608), the method 600 returns to step 606 to advance to the next unexamined annotated word sequence. If the method 600 determines at step 614 that there are no more unexamined annotated word sequences in the current training document, i.e. because all annotated word sequences have been examined ("no" at step 614), the method 600 proceeds to step 616 to check if there are more training documents to be handled. If there are additional training documents that have not yet been handled ("yes" at step 616), the method 600 returns to step 604 to advance to the next training document. If the method 600 determines at step 616 that there are no more training documents, i.e. all training documents in the training corpus have been handled ("no" at step 616), the method 600 proceeds to step 618.

Following completion of the last iteration of steps 604 through 616, the method 600 will have generated a plurality of indicator candidate n-grams from the training corpus. At step 618, the method applies at least one relevance filter to these indicator candidate n-grams to obtain a set of indicator n-grams. Exemplary relevance filters are described further below. Each of the indicator n-grams resulting from application of the relevance filter(s) at step 618 has as its associated cognitive motivation orientation the cognitive motivation orientation with which the corresponding indicator candidate n-gram is most frequently associated. At step 620 the method 600 assigns a confidence weight to each indicator n-gram; an exemplary method for assigning a confidence weight is described further below.

While FIG. 6 shows the method 600 first obtaining the set of indicator n-grams (step 618) and then assigning a confidence weight to each indicator n-gram (step 620), this is merely illustrative of one exemplary implementation. For example, the method 600 may equivalently be performed with steps 618 and 620 executing substantially simultaneously, such as by assigning a confidence weight to each indicator n-gram when it passes the relevance filter.

In a presently preferred embodiment, the confidence weight assigned to a given indicator candidate n-gram is equal to: (a) the number of times that the respective indicator candidate n-gram appears in the training corpus in association with the cognitive motivation orientation with which the corresponding indicator candidate n-gram is most frequently associated, divided by (b) the total number of times that the respective indicator candidate n-gram appears in the training corpus. The count for component (a) of this calculation may be obtained using the relevant counter from step 612 above, and the count for component (b) of this calculation may be obtained using the counter from step 702 of the method 700 which, as explained in more detail below, is a particular implementation of step 618.

At step 622 the method 600 builds a normalized dominance threshold for each of the cognitive motivation orientations. Details of an exemplary procedure for building a normalized dominance threshold are described further below in the context of the method 800 and FIG. 8. After step 622, the method 600 ends.

The result of the method 600 is an analysis database associating n-grams with cognitive motivation orientations, with each n-gram—cognitive motivation orientation pair having a confidence weight indicating the strength of that n-gram as an indicator (indicator n-gram) of the presence of the associated cognitive motivation orientation. The analysis database also includes a normalized dominance threshold for each of the cognitive motivation orientations. By using an analysis database built according to the method 600, a method such as the method 100 can perform an objective statistical analysis of a text sequence based on empirical evidence of the outcome of the application of human expertise, as reflected in the training corpus and tuning corpus. Thus, the method 600 effectively transforms a set of annotated documents that reflect the application of human expertise to specific cases (word sequences as part of larger documents) into a generalized computer-usable repository of that human knowledge, enabling a computer to directly apply that human knowledge, for example by way of the method 100.

The database associating n-grams with cognitive motivation orientations can be tested by applying the analysis method that uses the database (e.g. the method 500 in FIGS. 5A, 5B and 5C) to a testing corpus of text sequences that are not annotated but for which the dominant cognitive motivation orientation set is known based on expert human analysis. The precision and recall of the system can be calculated. Precision refers to the proportion of the identified dominant patterns that are in fact dominant, and recall describes the proportion of the dominant patterns that are actually retrieved. Precision and recall can be combined into a single value as a measure of overall system performance.

By adding more training documents/tuning documents and re-executing the method 600, the analysis database may be incrementally improved. For example, a server executing the method 500 may, with user consent and in compliance with all applicable laws including privacy laws, be configured to store text sequences, such as e-mail message content. Those stored text sequences can then be annotated so as to become training documents and/or tuning documents for use in a subsequent iteration of the method 600.

Figure 7:
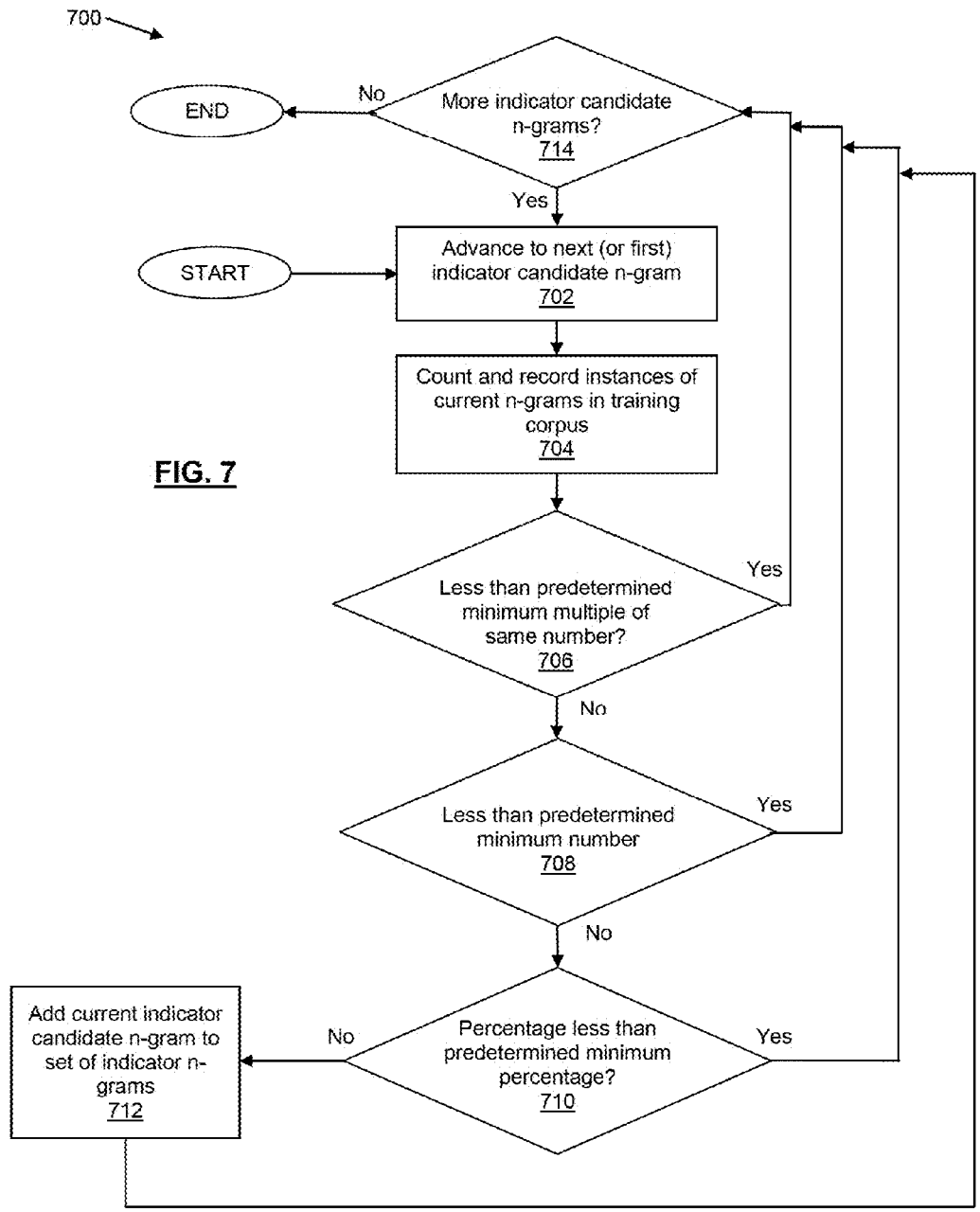
FIG. 7 is a flow chart showing an exemplary method for applying a series of relevance filters to the indicator candidate n-grams to obtain indicator n-grams.

Reference is now made to FIG. 7, which is a flow chart showing an exemplary method 700 for applying a series of relevance filters to the indicator candidate n-grams to obtain indicator n-grams. Thus, the method 700 is an exemplary implementation of step 618 of the method 600. The method 700 makes use of the counters for each n-gram—cognitive motivation orientation pair described above in the context of step 616 of the method 600.

At the first iteration of step 702, the method 700 advances to the first indicator candidate n-gram. At step 704, the method 700 scans the training corpus for instances of the current n-gram and counts those appearances. This step records the total number of times that the current n-gram appears in the training corpus, regardless of which cognitive motivation orientation(s) it is associated with by annotation, and also includes instances where the n-gram appears without being associated with any cognitive motivation orientation. Implementation of step 704 is within the capability of one skilled in the art, now informed by the present disclosure, and hence details of the specific procedure for this step are omitted for brevity. Although counting of the total number of appearances of each n-gram may be carried out at other stages of the method 600, the embodiment shown in FIG. 7 results in the training corpus being scanned only for n-grams that are indicator candidate n-grams. After step 704, the method 700 proceeds to step 706, which applies a first relevance filter.

At step 706, the method 700 tests whether the number of times that the respective indicator candidate n-gram appears in the training corpus in association with the cognitive motivation orientation with which the corresponding indicator candidate n-gram is most frequently associated is less than a predetermined minimum multiple of a number of times that the respective indicator candidate n-gram appears in the training corpus in association with the cognitive motivation orientation with which the corresponding indicator candidate n-gram is second-most frequently associated. For example, consider a particular n-gram in the training corpus that is most frequently associated in the with the toward cognitive motivation orientation and second most frequently associated with the procedures cognitive motivation orientation. If that n-gram appears p times in association with the toward cognitive motivation orientation and q times in association with the procedures cognitive motivation orientation, where the predetermined minimum multiple is r, step 706 will test whether $p > r*q$ or the mathematical equivalent of whether $p/q > r$. Information about the frequency of associations may be obtained from the counters incremented at step 612 of the method 600. A "yes" determination at step 706 means that the current indicator candidate n-gram has failed the first relevance filter, and the method 700 returns to step 714 to check whether there are more indicator candidate n-grams to examine. Thus, the result of failing the first relevance filter (a "yes" determination at step 706) is the current indicator candidate n-gram will be excluded from the set of indicator n-grams. A "no" determination at step 706 means that the current indicator candidate n-gram has passed the first relevance filter, and the method 700 then proceeds to step 708.

At step 708, the method 700 tests whether the number of times that the respective indicator candidate n-gram appears in the training corpus in association with the cognitive motivation orientation with which the corresponding indicator candidate n-gram is most frequently associated is less than a predetermined minimum number. A "yes" determination at step 708 means that the current indicator candidate n-gram has failed the second relevance filter, so the current indicator candidate n-gram will be excluded from the set of indicator n-grams and the method 700 returns to step 714 to check whether there are more indicator candidate n-grams to examine. A "no" determination at step 708 indicates that the current indicator candidate n-gram has passed the second relevance filter, and the method 700 then proceeds to step 710.

At step 710, the method 700 tests whether the percentage of appearances of the respective indicator candidate n-gram in the training corpus in association with the cognitive motivation orientation with which the corresponding indicator candidate n-gram is most frequently associated is less than a predetermined minimum percentage of the total number of appearances of the respective indicator candidate n-gram in the training corpus. A "yes" determination at step 710 means that the current indicator candidate n-gram has failed the third relevance filter, and the method 700 returns to step 714 to check whether there are more indicator candidate n-grams to examine. Thus, the result of failing the third relevance filter (a "yes" determination at step 710) the current indicator candidate n-gram will be excluded from the set of indicator n-grams. A "no" determination at step 710 means that the current indicator candidate n-gram has passed the third and final relevance filter, and the method 700 then proceeds to step 712. At step 712, the current indicator candidate n-gram is added to the set of indicator n-grams, and the method 700 returns to step 714 to check whether there are more indicator candidate n-grams to be filtered.

At step 714, which is reached whenever an indicator candidate n-gram fails a relevance test or passes all three relevance tests, the method 700 checks whether there are more indicator candidate n-grams to be filtered. Responsive to a "no" determination, which means that the relevance filter has been applied to all of the indicator candidate n-grams, the method 700 ends (i.e. step 618 would end and the method 600 would proceed to step 620). Responsive to a "yes" determination at step 714, the method 700 returns to step 702 and advances to the next indicator candidate n-gram at step 702 and then proceeds to step 704.

Steps 706, 708 and 710 may be carried out in any order. In alternative embodiments, only one or two of the filters represented by steps 706, 708 and 710 may be applied, or different filters may be used.

Figure 8:
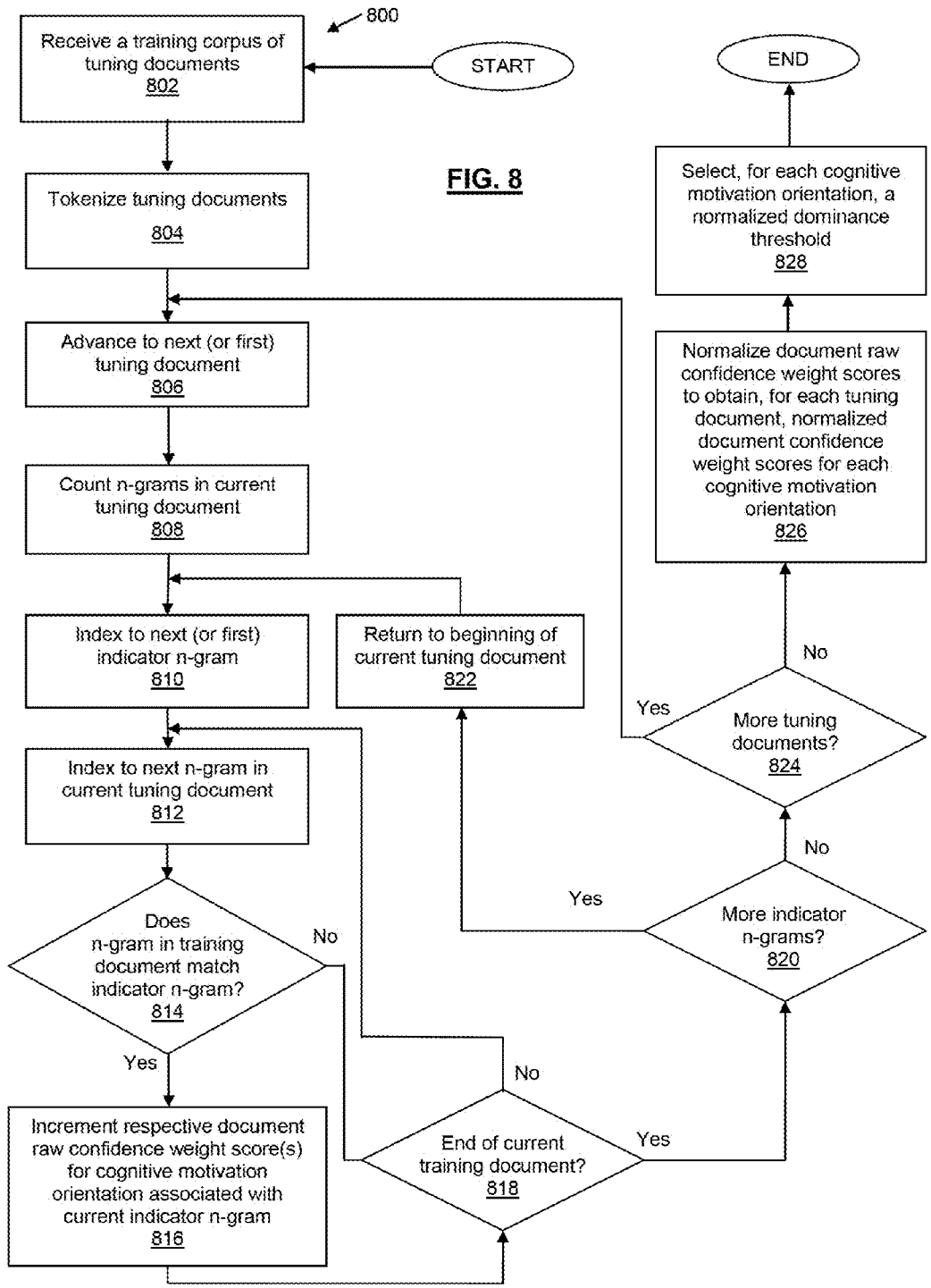
FIG. 8 is a flow chart showing an exemplary method for building a normalized dominance threshold for a cognitive motivation orientation.

FIG. 8 is a flow chart showing an exemplary method 800 for building a normalized dominance threshold for a cognitive motivation orientation. The method 800 is an exemplary implementation of step 622 of the method 600.

At step 802, the method 800 receives a tuning corpus of tuning documents, and at step 804, tokenizes the tuning documents. Alternatively, the tuning documents may be received in tokenized form.

Like the training documents, the tuning documents may consist of a variety of types of document in electronic form, including documents that did not originate in electronic form but have been converted to electronic form, and may be general in nature or specialized to a particular field. Each tuning document in the tuning corpus comprises a plurality of meaningfully arranged words, which, as with the training documents, may include not only well-defined dictionary words but also emoticons and informal abbreviations.

Each tuning document has a respective document-level annotation identifying a dominant cognitive motivation orientation set for that tuning document. Similarly to the training documents, the document-level annotation would be based on an identification by a person skilled in the field of neurolinguistics of the cognitive motivation orientation(s) that are most dominant in the document. Although it is preferable that the training corpus and the tuning corpus be two different groups of documents, it is contemplated that there may be overlap between the training corpus and the tuning corpus, and even that the training corpus and the tuning corpus may be identical. Where the training corpus and the tuning corpus are identical, each document has at least one word sequence therein that is annotated with a corresponding word-sequence-level annotation identifying at least one cognitive motivation orientation associated with that annotated word sequence, as well as an overall document-level annotation identifying a dominant cognitive motivation orientation set for that document. In embodiments where the training corpus and the tuning corpus are identical, steps 802 and 804 may be omitted since the documents will already have been received at step 602 and will have been tokenized prior to step 612.

Steps 806 through 824 of the method 800 obtain, for each tuning document, a document raw confidence weight score for each cognitive motivation orientation. As explained in greater detail below, successive iterations of steps 810 through 818 will examine the n-grams in each tuning document and identify each indicator n-gram appearing in that tuning document. The n-grams that are examined in the tuning documents are those whose sizes correspond to the sizes of the n-grams extracted at step 612. Thus, in one embodiment, for the same value of x as used in step 612, the successive iterations of steps 810 through 818 will examine the n-grams in each tuning document for each positive integer n where 0<n≤x and x is a positive integer. As noted above, on a presently preferred embodiment, x=3 so steps 810 through 818 will examine all unigrams, bigrams and trigrams in each tuning document.

At step 806, the method 800 advances to the next (or first) tuning document, and then at step 808 counts the number of n-grams in the current tuning document. Step 808 is shown in its present position in the method 800 for ease of illustration, and may alternatively be carried out at other stages of the method 800. Following step 808, at step 810 the method 800 indexes to the next (or first) indicator n-gram, and then at step 812 indexes to the next n-gram in the current tuning document. At step 814, the method 800 tests whether the current n-gram in the current tuning document matches the current indicator n-gram. Responsive to a "yes" determination at step 814, at step 816 the method 800 increments the respective document raw confidence weight score(s) for the cognitive motivation orientation(s) associated with the current indicator n-gram. The amount of the increment is equal to the confidence weight for the indicator n-gram associated with that cognitive motivation orientation. Thus, each time an indicator n-gram is identified in a tuning document, that tuning document's raw confidence weight score for the cognitive motivation orientation associated with the identified indicator n-gram is incremented by the corresponding confidence weight. After incrementing the respective document raw confidence weight score(s) at step 816, the method 800 proceeds to step 818 to check whether the end of the current tuning document has been reached. Responsive to a "no" determination at step 814, indicating that the current n-gram in the current tuning document does not match the current indicator n-gram, the method 800 proceeds directly to step 820.

If at step 818 the method 800 determines that the end of the current tuning document has not yet been reached ("no" at step 818), the method 800 returns to step 812 and indexes to the next n-gram in the current tuning document. If the method 800 determines at step 818 that the end of the current tuning document has been reached ("yes" at step 818), the method 800 proceeds to step 820, which checks if there are more indicator n-grams for which the current tuning document is to be checked. Responsive to a "yes" determination at step 820, the method 800 proceeds to step 822 to return to the beginning of the current tuning document and then returns to step 810 to index to the next indicator n-gram. If the method 800 determines at step 820 that there are no more indicator n-grams for which the current tuning document is to be checked ("no" at step 820), the method 800 proceeds to step 824 to check if there are more tuning documents to examine. Responsive to a determination that there are more tuning documents to examine ("yes" at step 824), the method 800 returns to step 806 to advance to the next tuning document. Responsive to a determination that there are no more tuning documents to handle, i.e. all tuning documents have been checked for indicator n-grams ("no" at step 824), the method 800 proceeds to step 826.

Steps 806 through 824 of the method 800 implement a procedure in which the tuning documents are sequentially scanned for each indicator n-gram in turn. This is merely one exemplary procedure; other procedures may equivalently be used. For example, tuning documents could be scanned by sequentially comparing each n-gram in the tuning document to the list of indicator n-grams.

At step 826, the method 800 normalizes the document raw confidence weight scores computed by step 16 for each cognitive motivation orientation to obtain, for each tuning document, normalized document confidence weight scores for each cognitive motivation orientation. In a presently preferred embodiment, the raw confidence weight scores are normalized by dividing the raw confidence weight scores by the number of tokens in the respective tuning document.

At step 828, the method 800 selects, for each cognitive motivation orientation, a normalized dominance threshold that minimizes the number of incorrectly classified tuning documents. A tuning document will be incorrectly classified with respect to a particular cognitive motivation orientation if one of the following conditions is met:

(a) the normalized document confidence weight score for that cognitive motivation orientation exceeds the normalized dominance threshold where that cognitive motivation orientation is absent from the document-level annotation for that tuning document; or (b) the normalized document confidence weight score for that cognitive motivation orientation is less than or equal to the normalized dominance threshold where that cognitive motivation orientation is present in the document-level annotation for that tuning document.

Conceptually, for each cognitive motivation orientation the tuning documents are arranged from left to right in order of increasing normalized document confidence weight score, as shown in the table below, and then a "cut" is applied to divide the table into a left and a right side. A tuning document for which the cognitive motivation orientation being considered is dominant is correctly classified if it is on the right side of the cut and incorrectly classified if it is on the left side of the cut; a tuning document for which the cognitive motivation orientation being considered is non-dominant is correctly classified if it is on the left side of the cut and incorrectly classified if it is on the right side of the cut.

| Tuning Document | A | B | C | D | E | F |
|---|---|---|---|---|---|---|
| Cognitive Motivation Orientation Dominant? | No | No | Yes | Yes | No | Yes |
| Normalized Document Confidence Weight Score | 14 | 20 | 45 | 55 | 80 | 100 |

The normalized dominance threshold is assigned a value corresponding to the "cut" that produces the fewest incorrect classifications. In the exemplary case illustrated by the table above, the normalized dominance threshold would be assigned a value between 20 and 45, since a "cut" between 20 and 45 produces the fewest errors, specifically a single error by incorrectly classifying tuning document "E". The choice of value between 20 and 45 is arbitrary given the above dataset since any value in that range (greater than 20 and less than 45) will produce the same single error; in a preferred embodiment the normalized dominance threshold is assigned a value equal to the midpoint between the normalized document confidence weight score immediately below the cut and the normalized document confidence weight score immediately above the cut. Thus, for the above example, the normalized dominance threshold would be assigned a value of 32.5, which could be rounded to 32 or 33.

After step 828, the method 800 ends.

Figure 9:
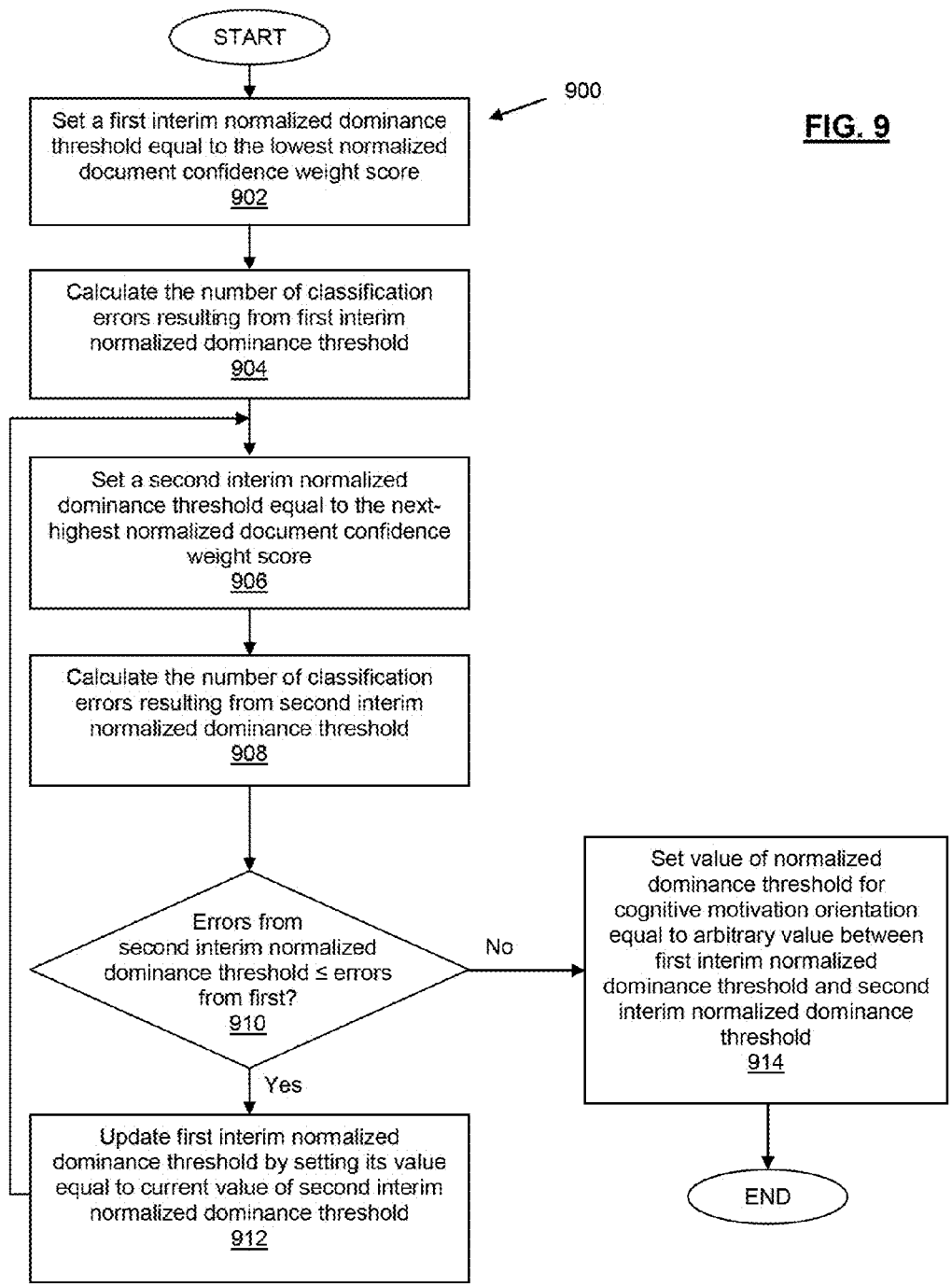
FIG. 9 is a flow chart showing an exemplary method for selecting a normalized dominance threshold for a cognitive motivation orientation.

Reference is now made to FIG. 9, which is a flow chart showing an exemplary method 900 for selecting a normalized dominance threshold for a particular cognitive motivation orientation. Thus, step 828 of the method 800 can be implemented by executing the method 900 for each cognitive motivation orientation.

At step 902, the method 900 sets an first interim normalized dominance threshold equal to the lowest normalized document confidence weight score. For the sample dataset above, the first interim normalized dominance threshold would be set equal to 14, the normalized document confidence weight score from tuning document A. The method 900 then proceeds to step 904 to calculate the number of classification errors resulting from the first interim normalized dominance threshold. A classification error occurs where, for a particular tuning document, the normalized document confidence weight score for a cognitive motivation orientation (a) exceeds the interim normalized dominance threshold for that cognitive motivation orientation but the document-level annotation for that tuning document does not identify that cognitive motivation orientation as being within the dominant cognitive motivation orientation set for that tuning document; or (b) does not exceed the interim normalized dominance threshold for that cognitive motivation orientation but the document-level annotation for that tuning document identifies that cognitive motivation orientation as being within the dominant cognitive motivation orientation set for that tuning document. Initially, the number of classification errors will be very high. Using the sample dataset above, the calculation at step 904 would show two classification errors, namely tuning documents B and E.

After step 904, the method 900 proceeds to step 906 and sets a second interim normalized dominance threshold equal to the next-highest normalized document confidence weight score. Using the dataset above, on the first iteration of step 906 the second interim normalized dominance threshold would be set equal to 20, which is the normalized document confidence weight score for tuning document B. The method then proceeds to step 908 to calculate the number of classification errors resulting from the second interim normalized dominance threshold. In this first iteration, the calculation at step 908 would show only a single classification error, namely tuning document E.

The method 900 then proceeds to step 910, which compares the number of classification errors resulting from using the first interim normalized dominance threshold to the number of classification errors resulting from using the second interim normalized dominance threshold. If the number of classification errors resulting from using the second interim normalized dominance threshold is less than or equal to the number of classification errors resulting from using the first interim normalized dominance threshold ("yes" at step 910), this indicates that the second interim normalized dominance threshold is better than the first interim normalized dominance threshold, and the method 900 proceeds to step 912. Continuing to use the example dataset above, since using the second interim normalized dominance threshold produced only a single error while using the first interim normalized dominance threshold produced two errors, the method would proceed to step 912.

At step 912, the method 900 updates the first interim normalized dominance threshold by setting its value equal to the current value of the second interim normalized dominance threshold. Using the sample data, the first interim normalized dominance threshold would be set equal to 20. The method 900 then returns to step 906 to set a new value of the second interim normalized dominance threshold equal to the next-highest normalized document confidence weight score. Thus, the value of the second interim normalized dominance threshold would be set equal to 45 based on the sample dataset above. It is not necessary to re-execute step 904 because the number of classification errors for the updated first interim normalized dominance threshold was already calculated at the previous iteration of step 908.

Steps 906 through 912 will continue to iterate to increase the second interim normalized dominance threshold to the next highest normalized document confidence weight score as long as each new second interim normalized dominance threshold produces fewer classification errors than that which preceded it. As the second interim normalized dominance threshold continues to increase, it will eventually cease to produce fewer classification errors than the one that preceded it. This will result in a "no" determination at step 910, indicating that the current second interim normalized dominance threshold produces no fewer classification errors than the previous second interim normalized dominance threshold, whose value is now reflected in the first interim normalized dominance threshold. This means that further increases in the second interim normalized dominance threshold will not produce any improvements in the number of classification errors, and the number of classification errors resulting from the value of the first interim normalized dominance threshold is at least as good as, if not better than the number of classification errors resulting from the value of the second interim normalized dominance threshold. For example, on the next iteration of steps 906 through 912 based on the sample dataset above, it is determined that the second interim normalized dominance threshold of 45 produces two classification errors, namely tuning documents C and E, which is more than the single classification error produced by the first interim normalized dominance threshold of 20. This would produce a "no" at step 910.

Responsive to a "no" at step 910, indicating that further increases in the second interim normalized dominance threshold will not produce any improvements in the number of classification errors, the method 900 proceeds to step 914 to set the value of the final normalized dominance threshold for the cognitive motivation orientation equal to an arbitrary value between the first interim normalized dominance threshold and the second interim normalized dominance threshold, such as the midpoint.

The exemplary systems and methods described herein are not limited to the English language, and may be extended, with suitable modification, to other languages. By providing training and tuning documents in a new language, the method 600 can be used to build an analysis database associating n-grams in that language with cognitive motivation orientations, thereby enabling the methods 100, 200 and 300 to be applied, for example by implementation of the method 500, to that new language. For strongly inflecting languages such as German, a stemming process (computation of word stems based on inflected word forms) can be used to normalize words to their stem, which is expected to lead to more reliable n-gram counts. Other linguistic tools may also be used. An implementation of the methods 100, 200 and 300 may be enabled to handle multiple languages through the use of language recognition software to identify whether any special language handling is to be applied, such as stemming, and to select the analysis database for that language.

Aspects of the present technology have been described above with reference to flowchart illustrations and/or block diagrams of methods, apparatus (systems) and computer program products according to various embodiments. In this regard, the flowchart and block diagrams in the Figures illustrate the architecture, functionality, and operation of possible implementations of systems, methods and computer program products according to various embodiments of the present technology. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Some specific examples of the foregoing have been noted above but these noted examples are not necessarily the only such examples. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
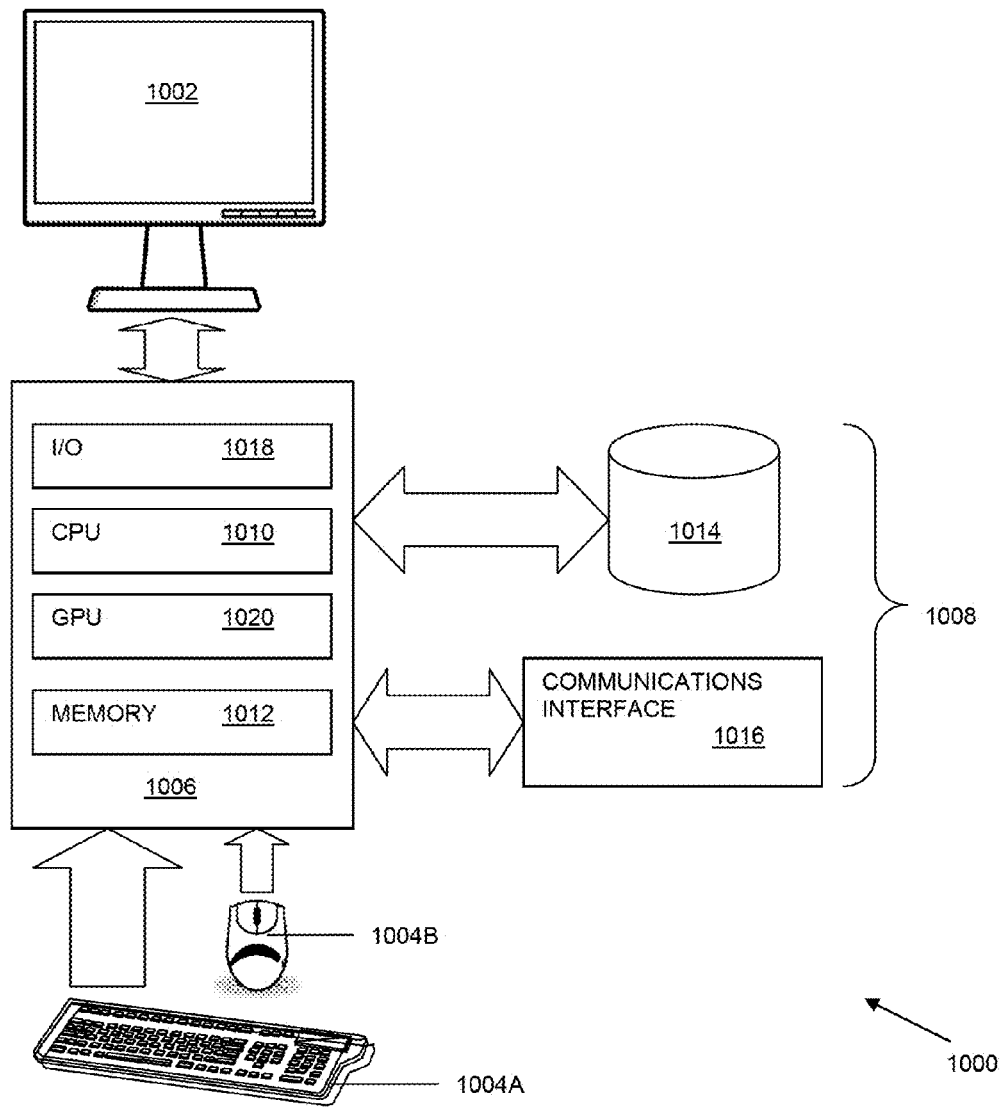
FIG. 10 is a schematic representation of an exemplary computer system, which may be used in implementing various methods described herein.

An illustrative computer system in respect of which the methods herein described may be implemented is presented as a block diagram in FIG. 10. The illustrative computer system is denoted generally by reference numeral 1000 and includes a display 1002, input devices in the form of keyboard 1004A and pointing device 1004B, computer 1006 and external devices 1008. While pointing device 1004B is depicted as a mouse, it will be appreciated that other types of pointing device may also be used.

The computer 1006 may contain one or more processors or microprocessors, such as a central processing unit (CPU) 1010. The CPU 1010 performs arithmetic calculations and control functions to execute software stored in an internal memory 1012, preferably random access memory (RAM) and/or read only memory (ROM), and possibly additional memory 1014. The additional memory 1014 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 1014 may be physically internal to the computer 1006, or external as shown in FIG. 10, or both.

The computer system 1000 may also include other similar means for allowing computer programs or other instructions to be loaded. Such means can include, for example, a communications interface 1016 which allows software and data to be transferred between the computer system 1000 and external systems and networks. Examples of communications interface 1016 can include a modem, a network interface such as an Ethernet card, a wireless communication interface, or a serial or parallel communications port. Software and data transferred via communications interface 1016 are in the form of signals which can be electronic, acoustic, electromagnetic, optical or other signals capable of being received by communications interface 1016. Multiple interfaces, of course, can be provided on a single computer system 1000.

Input and output to and from the computer 1006 is administered by the input/output (I/O) interface 1018. This I/O interface 1018 administers control of the display 1002, keyboard 1004A, external devices 1008 and other such components of the computer system 1000. The computer 1006 also includes a graphical processing unit (GPU) 1020. The latter may also be used for computational purposes as an adjunct to, or instead of, the (CPU) 1010, for mathematical calculations.

The various components of the computer system 1000 are coupled to one another either directly or by coupling to suitable buses.

Figure 11:
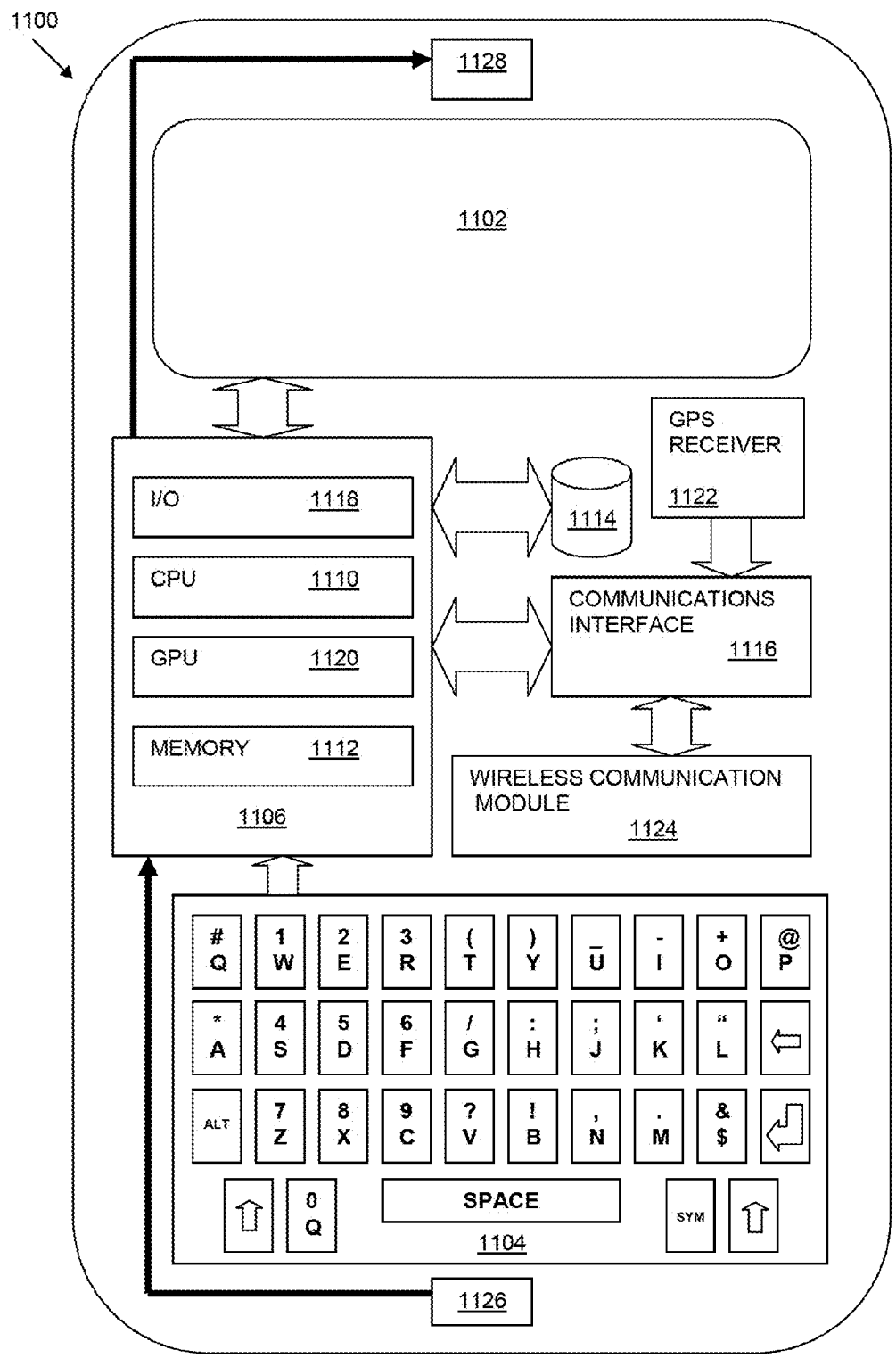
FIG. 11 is a schematic representation of an exemplary smartphone, which may be used in implementing various methods described herein.

FIG. 11 shows an exemplary networked mobile wireless telecommunication computing device in the form of a smartphone 1100. The smartphone 1100 includes a display 1102, an input device in the form of keyboard 1104 and an onboard computer system 1106. The display 1102 may be a touchscreen display and thereby serve as an additional input device, or as an alternative to the keyboard 1104. The onboard computer system 1106 comprises a central processing unit (CPU) 1110 having one or more processors or microprocessors for performing arithmetic calculations and control functions to execute software stored in an internal memory 1112, preferably random access memory (RAM) and/or read only memory (ROM) is coupled to additional memory 1114 which will typically comprise flash memory, which may be integrated into the smartphone 1100 or may comprise a removable flash card, or both. The smartphone 1100 also includes a communications interface 1116 which allows software and data to be transferred between the smartphone 1100 and external systems and networks. The communications interface 1116 is coupled to one or more wireless communication modules 1124, which will typically comprise a wireless radio for connecting to one or more of a cellular network, a wireless digital network or a Wi-Fi network. The communications interface 1116 will also typically enable a wired connection of the smartphone 1100 to an external computer system. A microphone 1126 and speaker 1128 are coupled to the onboard computer system 1106 to support the telephone functions managed by the onboard computer system 1106, and GPS receiver hardware 1122 may also be coupled to the communications interface 1116 to support navigation operations by the onboard computer system 1106. Input and output to and from the onboard computer system 1106 is administered by the input/output (I/O) interface 1118, which administers control of the display 1102, keyboard 1104, microphone 1126 and speaker 1128. The onboard computer system 1106 may also include a separate graphical processing unit (GPU) 1120. The various components are coupled to one another either directly or by coupling to suitable buses.

The term "computer system", as used herein, is not limited to any particular type of computer system and encompasses servers, desktop computers, laptop computers, networked mobile wireless telecommunication computing devices such as smartphones, tablet computers, as well as other types of computer systems.

As will be appreciated by one skilled in the art, aspects of the technology described herein may be embodied as a system, method or computer program product. Accordingly, aspects of the technology described herein may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the presently described technology may take the form of a computer program product embodied in one or more computer readable medium(s) carrying computer readable program code.

Where aspects of the technology described herein are implemented as a computer program product, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Thus, computer readable program code for implementing aspects of the technology described herein may be contained or stored in the memory 1112 of the onboard computer system 1106 of the smartphone 1100 or the memory 1012 of the computer 1006, or on a computer usable or computer readable medium external to the onboard computer system 1106 of the smartphone 1100 or the computer 1006, or on any combination thereof.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the presently described technology may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Finally, the terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope of the claims. The embodiment was chosen and described in order to best explain the principles of the technology and the practical application, and to enable others of ordinary skill in the art to understand the technology for various embodiments with various modifications as are suited to the particular use contemplated.

One or more currently preferred embodiments have been described by way of example. It will be apparent to persons skilled in the art that a number of variations and modifications can be made without departing from the scope of the claims.

What is claimed is:

1. A computer-implemented method for building an analysis database associating each of a plurality of n-grams with corresponding respective cognitive motivation orientations, comprising:
 receiving a training corpus of training documents in electronic form;
 wherein the receiving of the training corpus of training documents comprises scanning at least one training document using OCR technology, and thereby transforming the at least one training document into electronic form;
 each training document comprising a plurality of meaningfully arranged words;
 each training document having at least one annotated word sequence therein;
 wherein within each training document, each particular annotated word sequence is annotated with a corresponding word-sequence-level annotation identifying at least one cognitive motivation orientation that is associated with that particular annotated word sequence;
 for each training document:
  for each annotated word sequence in that particular training document:
   extracting n-grams overlapping that particular annotated word sequence; and
   associating each extracted n-gram with the at least one cognitive motivation orientation associated with that particular annotated word sequence;
 generating a set of indicator candidate n-grams wherein:
  each indicator candidate n-gram represents all instances of a particular n-gram in the training corpus for which at least one instance of that particular n-gram was extracted from any annotated word sequence in any training document;
  each indicator candidate n-gram being associated with every cognitive motivation orientation that is associated with at least one instance of the particular n-gram represented by that particular indicator candidate n-gram;
 applying at least one relevance filter to each indicator candidate n-grams in the set of indicator candidate n-grams to obtain a set of indicator n-grams, wherein:
  the set of indicator n-grams is a subset of the set of indicator candidate n-grams, so that each indicator n-gram corresponds to only one indicator candidate n-gram and thereby each indicator n-gram represents all instances of a corresponding particular n-gram in the training corpus for which at least one instance of that particular n-gram was extracted from any annotated word sequence in any training document;
  each indicator n-gram is associated with only a single cognitive motivation orientation; and
  each indicator n-gram has, as its associated single cognitive motivation orientation, that single cognitive motivation orientation with which the instances of the particular n-gram represented by that particular indicator n-gram are most frequently associated.

2. The method of claim 1, wherein applying at least one relevance filter to each indicator candidate n-grams in the set of indicator candidate n-grams to obtain a set of indicator n-grams comprises:
 excluding from the set of indicator n-grams those indicator candidate n-grams for which there is no single cognitive motivation orientation with which instances of the particular n-gram represented by that particular indicator candidate n-gram are most frequently associated in the training corpus;
 and further comprises at least one of:
  (a) excluding from the set of indicator n-grams those indicator candidate n-grams for which a predetermined minimum multiple condition is not satisfied, wherein the predetermined minimum multiple is satisfied in respect of a particular indictor candidate n-gram only if:
   (A) there is a single cognitive motivation orientation with which instances of the particular n-gram represented by that particular indicator candidate n-gram are most frequently associated in the training corpus, wherein instances of the particular n-gram represented by that particular indicator candidate n-gram appear p times in the training corpus in association with the single cognitive motivation orientation with which instances of the particular n-gram represented by that particular indicator candidate n-gram are most frequently associated in the training corpus;
   (B) there is at least one cognitive motivation orientation with which instances of the particular n-gram represented by that particular indicator candidate n-gram are second-most frequently associated in the training corpus, wherein instances of the particular n-gram represented by that particular indicator candidate n-gram appear q times in the training corpus in association with the at least one cognitive motivation orientation with which instances of the particular n-gram represented by that particular indicator candidate n-gram are second-most frequently associated in the training corpus; and
   (C) p exceeds the value resulting from multiplying q by a predetermine multiplier value r;
  (b) excluding from the set of indicator n-grams those indicator candidate n-grams for which p is less than a predetermined minimum number; and
  (c) excluding from the set of indicator n-grams those indicator candidate n-grams for which a calculated percentage is less than a predetermined minimum percentage, the calculated percentage being the value obtained by:
   dividing p by a total number of appearances in the training corpus of instances of the particular n-gram represented by the particular indicator candidate n-gram; and
   multiplying the resulting quotient by 100.

3. The method of claim 1, further comprising assigning a confidence weight to each indicator n-gram.

4. The method of claim 3, wherein:
 assigning a confidence weight to each indicator n-gram comprises assigning to each indicator n-gram a confidence weight equal to p
 divided by a total number of appearances in the training corpus of instances of the particular n-gram represented by that particular indicator n-gram;
 where instances of the particular n-gram represented by that particular indicator n-gram appear p times in the training corpus in association with the single cognitive motivation orientation with which instances of the particular n-gram represented by that particular indicator n-gram are most frequently associated in the training corpus.

5. The method of claim 3, further comprising building a respective normalized dominance threshold associated with each of the cognitive motivation orientations.

6. The method of claim 5, wherein building a respective normalized dominance threshold associated with for each of the cognitive motivation orientations comprises:
receiving a tuning corpus of tuning documents;
each tuning document comprising a plurality of meaningfully arranged words;
each tuning document being annotated with a respective document-level annotation, wherein the respective document-level annotation identifies a dominant cognitive motivation orientation set assigned to the particular tuning document annotated by that particular document-level annotation;
obtaining, for each tuning document, respective document raw confidence weight scores associated with every cognitive motivation orientation expressed in that particular tuning document by, for each tuning document:
for each indicator n-gram:
identifying each instance of a matching n-gram appearing in that particular tuning document, wherein the matching n-gram matches the particular indicator n-gram; and
for each instance of a matching n-gram, incrementing a document raw confidence weight score associated with the cognitive motivation orientation that is associated with that particular indicator n-gram matched by the matching n-gram, wherein the incrementing is according to the confidence weight assigned to that particular n-gram;
for each tuning document, normalizing the document raw confidence weight scores for each cognitive motivation orientation expressed in that particular tuning document by:
dividing the raw confidence weight score associated with each cognitive motivation orientation expressed in that particular tuning document by a number of tokens contained in that particular tuning document to assign normalized document confidence weight scores to each cognitive motivation orientation expressed in that particular tuning document; and
selecting, for each cognitive motivation orientation, a normalized dominance threshold, wherein the normalized dominance threshold minimizes a number of incorrectly classified tuning documents, wherein:
incorrect classification of a given tuning document with respect to a particular cognitive motivation orientation is a condition selected from the group consisting of:
(a) the normalized document confidence weight score associated with that cognitive motivation orientation with respect to that particular tuning document exceeds the normalized dominance threshold but that cognitive motivation orientation is absent from the document-level annotation annotating that particular tuning document; and
(b) the normalized document confidence weight score associated with that cognitive motivation orientation with respect to that particular tuning document is less than or equal to the normalized dominance threshold but that cognitive motivation orientation is present in the document-level annotation annotating that particular tuning document.

7. A database-building data processing system configured for building an analysis database associating each of a plurality of n-grams with corresponding respective cognitive motivation orientations, the system comprising:
a host computer with memory and at least one processor coupled to the memory; and
a database-building module, the database-building module comprising program code that, when executed in the memory of the host computer:
receives a training corpus of training documents, wherein:
each training document comprises a plurality of meaningfully arranged words in electronic form;
wherein the receiving of the training corpus of training documents comprises scanning at least one training document using OCR technology, and thereby transforming the at least one training document into electronic form;
each training document has at least one annotated word sequence therein;
wherein within each training document, each particular annotated word sequence is annotated with a corresponding word-sequence-level annotation identifying at least one cognitive motivation orientation that is associated with that particular annotated word sequence;
for each training document:
for each annotated word sequence in that particular training document:
extracts n-grams overlapping that particular annotated word sequence; and
associates each extracted n-gram with the at least one cognitive motivation orientation associated with that particular annotated word sequence;
generates a set of indicator candidate n-grams wherein:
each indicator candidate n-gram represents all instances of a particular n-gram in the training corpus for which at least one instance of that particular n-gram was extracted from any annotated word sequence in any training document;
each indicator candidate n-gram being associated with every cognitive motivation orientation that is associated with at least one instance of the particular n-gram represented by that particular indicator candidate n-gram;
applies at least one relevance filter to each indicator candidate n-gram in the set of indicator candidate n-grams to obtain a set of indicator n-grams, wherein;
the set of indicator n-grams is a subset of the set of indicator candidate n-grams, so that each indicator n-gram corresponds to only one indicator candidate n-gram and thereby each indicator n-gram represents all instances of a corresponding particular n-gram in the training corpus for which at least one instance of that particular n-gram was extracted from any annotated word sequence in any training document; and
each indicator n-gram is associated with only a single cognitive motivation orientation;
wherein each indicator n-gram has as its associated single cognitive motivation orientation, that single cognitive motivation orientation with which the instances of the particular n-gram represented by that particular indicator n-gram are most frequently associated.

8. The data processing system of claim 7, wherein the program code that, when executed in the memory of the host computer, applies at least one relevance filter to each indicator candidate n-gram in the set of indicator candidate n-grams to obtain a set of indicator n-grams comprises program code that, when executed in the memory of the host computer:
excluding from the set of indicator n-grams those indicator candidate n-grams for which there is no single cognitive motivation orientation with which instances of the particular n-gram represented by that particular indicator candidate n-gram are most frequently associated in the training corpus;
and further does at least one of:
(a) excluding from the set of indicator n-grams those indicator candidate n-grams for which a predetermined minimum multiple condition is not satisfied, wherein the predetermined minimum multiple is satisfied in respect of a particular indictor candidate n-gram only if:
(A) there is a single cognitive motivation orientation with which instances of the particular n-gram represented by that particular indicator candidate n-gram are most frequently associated in the training corpus, wherein instances of the particular n-gram represented by that particular indicator candidate n-gram appear p times in the training corpus in association with the single cognitive motivation orientation with which instances of the particular n-gram represented by that particular indicator candidate n-gram are most frequently associated in the training corpus;
(B) there is at least one cognitive motivation orientation with which instances of the particular n-gram represented by that particular indicator candidate n-gram are second-most frequently associated in the training corpus, wherein instances of the particular n-gram represented by that particular indicator candidate n-gram appear q times in the training corpus in association with the at least one cognitive motivation orientation with which instances of the particular n-gram represented by that particular indicator candidate n-gram are second-most frequently associated in the training corpus; and
(C) p exceeds the value resulting from multiplying q by a predetermine multiplier value r;
(b) excluding from the set of indicator n-grams those indicator candidate n-grams for which p is less than a predetermined minimum number; and
(c) excluding from the set of indicator n-grams those indicator candidate n-grams for which a calculated percentage is less than a predetermined minimum percentage, the calculated percentage being the value obtained by:
dividing p by a total number of appearances in the training corpus of instances of the particular n-gram represented by that particular indicator candidate n-gram; and
multiplying the resulting quotient by 100.

9. The data processing system of claim 7, wherein the database-building module further comprises program code that, when executed in the memory of the host computer, assigns a confidence weight to each indicator n-gram.

10. The data processing system of claim 9, wherein the program code that, when executed in the memory of the host computer, assigns a confidence weight to each indicator n-gram comprises program code that, when executed in the memory of the host computer, assigns a confidence weight to each indicator n-gram wherein for each indicator n-gram, the respective confidence weight is equal to p divided by a total number of appearances in the training corpus of instances of the particular n-gram represented by that particular indicator n-gram;
where instances of the particular n-gram represented by that particular indicator n-gram appear p times in the training corpus in association with the single cognitive motivation orientation with which instances of the particular n-gram represented by that particular indicator n-gram are most frequently associated in the training corpus.

11. The data processing system of claim 9, wherein the database-building module further comprises program code that, when executed in the memory of the host computer, builds a respective normalized dominance threshold associated with each of the cognitive motivation orientations.

12. The data processing system of claim 11, wherein the program code that, when executed in the memory of the host computer, builds a respective normalized dominance threshold associated with each of the cognitive motivation orientations comprises program code that, when executed in the memory of the host computer:
receives a tuning corpus of tuning documents, wherein:
each tuning document comprises a plurality of meaningfully arranged words;
each tuning document being annotated with a respective document-level annotation, wherein the respective document-level annotation identifies a dominant cognitive motivation orientation set assigned to the particular tuning document annotated by that particular document-level annotation;
obtains, for each tuning document, document raw confidence weight scores associated with every cognitive motivation orientation expressed in that particular tuning document by, for each tuning document:
for each indicator n-gram:
identifying each instance of a matching n-gram appearing in that particular tuning document, wherein the matching n-gram matches the particular indicator n-gram; and
for each instance of a matching n-gram, incrementing a document raw confidence weight score associated with the cognitive motivation orientation that is associated with that particular indicator n-gram matched by the matching n-gram, wherein the incrementing is according to the confidence weight assigned to that particular n-gram;
for each tuning document, normalizes the document raw confidence weight scores for each cognitive motivation orientation expressed in that particular tuning document by:
dividing the raw confidence weight scores associated with each cognitive motivation orientation expressed in that particular tuning document by a number of tokens contained in that particular tuning document to assign, normalized document confidence weight scores to each cognitive motivation orientation expressed in that particular tuning document; and
selects, for each cognitive motivation orientation, a normalized dominance threshold, wherein the normalized dominance threshold minimizes a number of incorrectly classified tuning documents, wherein:
incorrect classification of a given tuning document with respect to a particular cognitive motivation orientation is a condition selected from the group consisting of:
(a) the normalized document confidence weight score associated with that cognitive motivation orientation, with respect to that particular tuning document, exceeds the normalized dominance threshold but that cognitive motivation orientation is absent from the document-level annotation annotating that particular tuning document; and (b) the normalized document confidence weight score associated with that cognitive motivation orientation, with respect to that particular tuning document, is less than or equal to the normalized dominance threshold but that cognitive motivation orientation is present in the document-level annotation annotating that particular tuning document.

13. A computer program product for building an analysis database associating each of a plurality of n-grams with corresponding respective cognitive motivation orientations, the computer program product comprising:

a non-transitory computer readable storage medium having computer readable program code embodied therewith, the computer readable program code comprising:

computer readable program code adapted to, when executed by a computer, cause the computer to receive a training corpus of training documents, wherein:

each training document comprises a plurality of meaningfully arranged words in electronic form;

wherein the receiving of the training corpus of training documents comprises scanning at least one training document using OCR technology, and thereby transforming the at least one training document into electronic form;

each training document has at least one annotated word sequence therein;

wherein, within each training document, each particular annotated word sequence is annotated with a corresponding word-sequence-level annotation identifying at least one cognitive motivation orientation that is associated with that particular annotated word sequence;

computer readable program code adapted to, when executed by a computer, cause the computer to, for each training document:

for each annotated word sequence in that particular training document:

extract n-grams overlapping that particular annotated word sequence; and associate each extracted n-gram with the at least one cognitive motivation orientation associated with that particular annotated word sequence;

computer readable program code adapted to, when executed by a computer, cause the computer to generate indicator candidate n-grams wherein:

each indicator candidate n-gram represents all instances of a particular n-gram in the training corpus for which at least one instance of that particular n-gram was extracted from any annotated word sequence in any training document;

each indicator candidate n-gram being associated with every cognitive motivation orientation that is associated with at least one instance of the particular n-gram represented by that particular indicator candidate n-gram;

computer readable program code adapted to, when executed by a computer, cause the computer to apply at least one relevance filter to each indicator candidate n-grams in the set of indicator candidate n-grams to obtain a set of indicator n-grams, wherein;

the set of indicator n-grams is a subset of the set of indicator candidate n-grams, so that each indicator n-gram corresponds to only one indicator candidate n-gram and thereby each indicator n-gram represents all instances of a corresponding particular n-gram in the training corpus for which at least one instance of that particular n-gram was extracted from an annotated word sequence in any training document; and each indicator n-gram is associated with only a single cognitive motivation orientation;

wherein each indicator n-gram has as its associated single cognitive motivation orientation, that single cognitive motivation orientation with which the instances of the particular n-gram represented by that particular indicator n-gram are most frequently associated.

14. The computer program product of claim 13, wherein the computer readable program code adapted to, when executed by a computer, cause the computer to apply at least one relevance filter to each indicator candidate n-gram in the set of indicator candidate n-grams to obtain a set of indicator n-grams comprises computer readable program code adapted to, when executed by a computer, cause the computer to do:

exclude from the set of indicator n-grams those indicator candidate n-grams for which there is no single cognitive motivation orientation with which instances of the particular n-gram represented by that particular indicator candidate n-gram are most frequently associated in the training corpus;

and further comprises computer readable program code adapted to, when executed by a computer, cause the computer to do at least one of:

(a) excluding from the set of indicator n-grams those indicator candidate n-grams for which a predetermined minimum multiple condition is not satisfied, wherein the predetermined minimum multiple is satisfied in respect of a particular indictor candidate n-gram only if:

(A) there is a single cognitive motivation orientation with which instances of the particular n-gram represented by that particular indicator candidate n-gram are most frequently associated in the training corpus, wherein instances of the particular n-gram represented by that particular indicator candidate n-gram appear p times in the training corpus in association with the single cognitive motivation orientation with which instances of the particular n-gram represented by that particular indicator candidate n-gram are most frequently associated in the training corpus;

(B) there is at least one cognitive motivation orientation with which instances of the particular n-gram represented by that particular indicator candidate n-gram are second-most frequently associated in the training corpus, wherein instances of the particular n-gram represented by that particular indicator candidate n-gram appear q times in the training corpus in association with the at least one cognitive motivation orientation with which instances of the particular n-gram represented by that particular indicator candidate n-gram are second-most frequently associated in the training corpus; and (C) p exceeds the value resulting from multiplying q by a predetermine multiplier value r;

(b) excluding from the set of indicator n-grams those indicator candidate n-grams for which p is less than a predetermined minimum number; and (c) excluding from the set of indicator n-grams those indicator candidate n-grams for which a calculated percentage is less than a predetermined minimum percentage, the calculated percentage being the value obtained by:
  dividing p by a total number of appearances in the training corpus of instances of the particular n-gram represented by that indicator candidate n-gram; and
  multiplying the resulting quotient by 100.

15. The computer program product of claim 13, further comprising computer readable program code adapted to, when executed by a computer, cause the computer to assign a confidence weight to each indicator n-gram.

16. The computer program product of claim 15, wherein the computer readable program code adapted to, when executed by a computer, cause the computer to assign a confidence weight to each indicator n-gram comprises computer readable program code adapted to, when executed by a computer, cause the computer to assign to each indicator n-gram a confidence weight equal to p
  divided by a total number of appearances in the training corpus of instances of the particular n-gram represented by that particular indicator n-gram;
  where instances of the particular n-gram represented by that particular indicator n-gram appear p times in the training corpus in association with the single cognitive motivation orientation with which instances of the particular n-gram represented by that particular indicator n-gram are most frequently associated in the training corpus.

17. The computer program product of claim 15, further comprising computer readable program code adapted to, when executed by a computer, cause the computer to build a respective normalized dominance threshold associated with each of the cognitive motivation orientations.

18. The computer program product of claim 17, wherein the computer readable program code adapted to, when executed by a computer, cause the computer to build a respective normalized dominance threshold associated with each of the cognitive motivation orientations comprises:
  computer readable program code adapted to, when executed by a computer, cause the computer to receive a tuning corpus of tuning documents, wherein:
    each tuning document comprises a plurality of meaningfully arranged words;
    each tuning document being annotated with a respective document-level annotation, wherein the respective document-level annotation identifies a dominant cognitive motivation orientation set assigned to the particular tuning document annotated by that particular document-level annotation;
  computer readable program code adapted to, when executed by a computer, cause the computer to obtain, for each tuning document, document raw confidence weight scores associated with every cognitive motivation orientation expressed in that particular tuning document by, for each tuning document:
    for each indicator n-gram:
      identifying each instance of a matching n-gram appearing in that particular tuning document, wherein the matching n-gram matches the particular indicator n-gram; and
    for each instance of a matching n-gram, incrementing a document raw confidence weight score associated with the cognitive motivation orientation that is associated with that particular indicator n-gram matched by the matching n-gram, wherein the incrementing is according to the confidence weight assigned to that particular n-gram;
  computer readable program code adapted to, when executed by a computer, cause the computer to, for each tuning document, normalize the document raw confidence weight scores associated with each cognitive motivation orientation expressed in that particular tuning document by:
    dividing the raw confidence weight scores associated with each cognitive motivation orientation by a number of tokens in that particular tuning document to assign, normalized document confidence weight scores to each cognitive motivation orientation expressed in that particular tuning document; and
  computer readable program code adapted to, when executed by a computer, cause the computer to select, for each cognitive motivation orientation, a normalized dominance threshold, wherein the normalized dominance threshold minimizes a number of incorrectly classified tuning documents, wherein:
    incorrect classification of a given tuning document with respect to a particular cognitive motivation orientation is a condition selected from the group consisting of:
      (a) the normalized document confidence weight score for that cognitive motivation orientation with respect to that particular tuning document, exceeds the normalized dominance threshold but that cognitive motivation orientation is absent from the document-level annotation annotating that particular tuning document; and
      (b) the normalized document confidence weight score associated with that cognitive motivation orientation with respect to that particular tuning document is less than or equal to the normalized dominance threshold but that cognitive motivation orientation is present in the document-level annotation annotating that particular tuning document.

\* \* \* \* \*